US010907371B2

(12) United States Patent
Gorny et al.

(10) Patent No.: US 10,907,371 B2
(45) Date of Patent: Feb. 2, 2021

(54) LARGE FORMAT THEATER DESIGN

(71) Applicant: DOLBY LABORATORIES LICENSING CORPORATION, San Francisco, CA (US)

(72) Inventors: Douglas J. Gorny, Pacifica, CA (US); Wilhelm Oehl, San Francisco, CA (US); Vincent Voron, Menlo Park, CA (US); David Herman, Oakland, CA (US); Donald Burlock, San Bruno, CA (US); Pascal Sijen, La Quinta, CA (US); Christopher Roy Kukshtel, Sonoma, CA (US); C. Matthew Cuson, Los Altos, CA (US); Charles Q. Robinson, Piedmont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/529,924

(22) PCT Filed: Nov. 30, 2015

(86) PCT No.: PCT/US2015/063054
§ 371 (c)(1),
(2) Date: May 25, 2017

(87) PCT Pub. No.: WO2016/086235
PCT Pub. Date: Jun. 2, 2016

(65) Prior Publication Data
US 2018/0155944 A1 Jun. 7, 2018

Related U.S. Application Data

(63) Continuation of application No. 14/556,178, filed on Nov. 30, 2014, now Pat. No. 9,551,161.
(Continued)

(51) Int. Cl.
E04H 3/12 (2006.01)
E04H 3/22 (2006.01)
(Continued)

(52) U.S. Cl.
CPC ............... *E04H 3/22* (2013.01); *E04F 19/02* (2013.01); *E04H 3/00* (2013.01); *E04H 3/10* (2013.01);
(Continued)

(58) Field of Classification Search
CPC .... E04H 3/00; E04H 3/10; E04H 3/12; E04H 3/22; E04H 3/24; E04H 3/30; E04F 19/02; G03B 21/56
(Continued)

(56) References Cited

U.S. PATENT DOCUMENTS 1,096,826 A * 5/1914 Clement ................... A63B 9/00
472/136
1,226,783 A * 5/1917 Ley ........................... A01K 1/00
119/449
(Continued)

FOREIGN PATENT DOCUMENTS

| CA | 2432238 A1 * | 12/2004 | ............. G03B 21/56 |
| CN | 1407392 | 4/2003 | |

(Continued)

OTHER PUBLICATIONS 40 page PDF of Technical Specifications of the Dr. Phillips Center for the Performing Arts. (Year: 2014).*
(Continued)

*Primary Examiner* — Robert Canfield

(57) ABSTRACT

Theater designs including social media, and theater entrances configured to draw patrons into a main area of the theater including an entrance having a curved wall and curved walkway having a horizon drop-off for display of
(Continued)

content related to a motion picture or other feature to be shown in the theater. The content may be interactive or otherwise linked to patrons passing a hallway including the curved wall. Spatialized sound corresponding to the video "moves" with objects in the video and with patrons as they traverse walkway.

21 Claims, 69 Drawing Sheets

Related U.S. Application Data

(60) Provisional application No. 62/085,611, filed on Nov. 30, 2014, provisional application No. 62/174,505, filed on Jun. 11, 2015.

(51) Int. Cl.
  *E04F 19/02* (2006.01)
  *G03B 21/56* (2006.01)
  *E04H 3/00* (2006.01)
  *E04H 3/10* (2006.01)
  *E04H 3/30* (2006.01)

(52) U.S. Cl.
  CPC ............ *E04H 3/12* (2013.01); *E04H 3/30* (2013.01); *G03B 21/56* (2013.01)

(58) Field of Classification Search
  USPC .......... 52/6, 174; 472/75, 92, 136; 359/443, 359/449, 451; 353/79, 94
  See application file for complete search history.

(56) References Cited

U.S. PATENT DOCUMENTS

| | | | |
|---|---|---|---|
| 1,437,946 A * | 12/1922 | Miller | E04H 3/22 52/8 |
| 1,896,652 A * | 2/1933 | Vitolo | E04H 3/28 472/75 |
| 1,957,947 A | 5/1934 | Dreyfuss | |
| 2,102,718 A * | 12/1937 | Josserand | E04H 3/10 52/6 |
| 2,259,646 A * | 10/1941 | Liehburg | E04H 3/22 52/6 |
| 2,831,217 A * | 4/1958 | Lombardo | E04H 3/10 472/92 |
| 3,192,827 A * | 7/1965 | Nagy | G03B 23/00 353/30 |
| 3,210,895 A * | 10/1965 | Herbert Graf | E04H 3/22 52/6 |
| 3,293,807 A | 12/1966 | Ramsell | |
| 3,313,068 A * | 4/1967 | Pinto | E04H 3/10 352/134 |
| 3,487,595 A * | 1/1970 | Schumann | E04H 3/10 52/236.2 |
| 3,823,517 A | 7/1974 | Penaloza | |
| 4,686,799 A * | 8/1987 | Kwake | E04H 3/22 52/6 |
| 4,885,878 A * | 12/1989 | Wuu | E04H 3/126 52/6 |
| 4,962,420 A | 10/1990 | Judenich | |
| 5,469,669 A | 11/1995 | Alter | |
| 5,611,174 A | 3/1997 | Hayashi | |
| 5,765,314 A * | 6/1998 | Giglio | E04H 3/126 472/75 |
| 5,822,928 A | 10/1998 | Maxwell | |
| 5,964,064 A * | 10/1999 | Goddard | A63J 5/021 352/43 |
| 5,988,817 A * | 11/1999 | Mizushima | G09F 19/18 352/133 |
| 5,993,335 A * | 11/1999 | Eden | A63C 19/10 472/89 |
| 6,074,307 A * | 6/2000 | Hettema | A63J 1/028 472/74 |
| 6,118,433 A * | 9/2000 | Jenkin | G06F 3/0488 345/1.3 |
| 6,164,018 A * | 12/2000 | Runge | E04H 3/22 52/174 |
| 6,407,798 B2 * | 6/2002 | Graves | G03B 21/56 352/69 |
| 6,462,769 B1 * | 10/2002 | Trowbridge | A63G 31/16 348/51 |
| 6,795,556 B1 | 9/2004 | Sibbald | |
| 6,824,271 B2 * | 11/2004 | Ishii | G01J 3/51 348/383 |
| 6,865,830 B2 | 3/2005 | Gravitt | |
| 7,095,865 B2 | 8/2006 | Katayama | |
| 7,634,093 B2 | 12/2009 | McGrath | |
| 7,720,240 B2 | 5/2010 | Wang | |
| 7,756,281 B2 | 7/2010 | Goldstein | |
| 8,027,477 B2 | 9/2011 | Wang | |
| 8,116,081 B2 | 2/2012 | Crick, Jr. | |
| 8,374,365 B2 | 2/2013 | Goodwin | |
| 8,503,682 B2 | 8/2013 | Fukui | |
| 8,520,871 B2 | 8/2013 | Breebaart | |
| 8,638,946 B1 | 1/2014 | Mahabub | |
| 8,645,991 B2 | 2/2014 | McIntire | |
| 8,666,528 B2 | 3/2014 | Harkness | |
| 8,714,746 B2 * | 5/2014 | Choi | A47C 3/18 353/30 |
| 8,763,060 B2 | 6/2014 | Jerremy | |
| 8,831,231 B2 | 9/2014 | Fukui | |
| 8,873,761 B2 | 10/2014 | Fukui | |
| D774,207 S * | 12/2016 | Oehl | D25/1 |
| 9,551,161 B2 * | 1/2017 | Oehl | E04H 3/22 |
| 9,764,246 B2 * | 9/2017 | Fox | E04H 3/26 |
| 10,099,149 B2 * | 10/2018 | Boyle | A63G 1/02 |
| 10,372,402 B1 * | 8/2019 | Fitzgerald | H04N 5/4403 |
| 2002/0139072 A1 * | 10/2002 | Laskowski | E04B 2/7457 52/245 |
| 2002/0186956 A1 * | 12/2002 | Lowry | G09F 9/305 385/147 |
| 2003/0002689 A1 | 1/2003 | Folio | |
| 2003/0005439 A1 * | 1/2003 | Rovira | H04N 21/4314 725/37 |
| 2003/0131537 A1 | 7/2003 | Krikorian | |
| 2003/0223113 A1 * | 12/2003 | Starkweather | G03B 21/62 359/451 |
| 2004/0010981 A1 * | 1/2004 | Kennedy | B32B 3/02 52/6 |
| 2004/0135160 A1 * | 7/2004 | Cok | C23C 14/042 257/88 |
| 2005/0033835 A1 * | 2/2005 | Kinjo | G08C 17/00 709/223 |
| 2005/0038749 A1 | 2/2005 | Fitch | |
| 2005/0052623 A1 * | 3/2005 | Hsiung | H04N 13/332 353/94 |
| 2005/0110960 A1 * | 5/2005 | Mao | G09F 19/22 353/100 |
| 2006/0095360 A1 * | 5/2006 | Apple | G06Q 40/04 705/35 |
| 2007/0000185 A1 * | 1/2007 | DeLine | E04H 3/04 52/33 |
| 2007/0193123 A1 * | 8/2007 | Magpuri | E04H 3/22 52/8 |
| 2008/0079908 A1 | 4/2008 | Choi | |
| 2008/0252596 A1 * | 10/2008 | Bell | G06F 3/0304 345/156 |
| 2009/0046864 A1 | 2/2009 | Mahabub | |
| 2009/0051640 A1 * | 2/2009 | Tanaka | H01L 27/3276 345/92 |
| 2009/0077504 A1 * | 3/2009 | Bell | G06F 3/04812 715/863 |
| 2010/0132267 A1 * | 6/2010 | Fletcher | E04H 3/14 52/6 |
| 2011/0063503 A1 | 5/2011 | Brand | |
| 2011/0157487 A1 * | 6/2011 | Akeyama | G03B 21/005 348/759 |
| 2011/0305358 A1 | 12/2011 | Nishio | |

(56) References Cited

U.S. PATENT DOCUMENTS

| | | |
|---|---|---|
| 2012/0109645 A1 | 5/2012 | Hallam |
| 2012/0121092 A1 | 5/2012 | Chalvignac |
| 2012/0170756 A1 | 7/2012 | Kraemer |
| 2012/0188513 A1 | 7/2012 | Choi |
| 2012/0213375 A1 | 8/2012 | Mahabub |
| 2013/0111514 A1 | 5/2013 | Slavin |
| 2014/0157683 A1* | 6/2014 | Holmgren ............ E04C 2/38 52/27 |
| 2014/0219457 A1 | 8/2014 | Roth |
| 2014/0237082 A1 | 8/2014 | Chen |
| 2014/0348491 A1 | 11/2014 | Redmann |
| 2015/0003798 A1 | 1/2015 | Walker |
| 2015/0074534 A1 | 3/2015 | Didomenico |
| 2015/0077573 A1* | 3/2015 | Ishikawa ............ G06T 3/005 348/189 |
| 2015/0159390 A1* | 6/2015 | Magpuri ............ E04H 3/22 52/10 |
| 2016/0021348 A1* | 1/2016 | Watanabe ............ G03B 37/04 348/745 |
| 2016/0295184 A1* | 10/2016 | Ishikawa ............ H04N 3/223 |
| 2017/0175409 A1* | 6/2017 | Canavati ............ E04H 3/02 |
| 2017/0277357 A1* | 9/2017 | Kihara ............ G06F 3/0304 |
| 2018/0367768 A1* | 12/2018 | Nobori ............ H04N 9/3194 |
| 2019/0004599 A1* | 1/2019 | Ikeda ............ G09G 5/36 |
| 2019/0121522 A1* | 4/2019 | Davis ............ G06F 3/04817 |

FOREIGN PATENT DOCUMENTS

| | | |
|---|---|---|
| CN | 201930529 | 8/2011 |
| EP | 3487595 | 5/2019 |
| FR | 2454827 | 11/1980 |
| FR | 2637312 | 4/1990 |
| JP | 58117613 | 7/1983 |
| JP | 10308108 | 11/1998 |
| JP | 2001282133 A * | 10/2001 |
| JP | 2008010376 | 1/2008 |
| JP | 2014145164 | 8/2014 |
| KR | 10-0912425 | 8/2009 |
| KR | 101304052 | 9/2013 |
| RU | 70283 U1 * | 2/2007 |
| RU | 70283 | 1/2008 |
| RU | 117029 | 6/2012 |
| WO | 02/054149 | 7/2002 |
| WO | 2006/111659 | 10/2006 |
| WO | 2008/006401 | 1/2008 |
| WO | 2012/092247 | 7/2012 |
| WO | 2013/142653 | 9/2013 |
| WO | 2013/175152 | 11/2013 |
| WO | 2014/164549 | 10/2014 |
| WO | 2014/178796 | 11/2014 |
| WO | 2015/038186 | 3/2015 |

OTHER PUBLICATIONS 7 page PDF of a Sixteen:Nine Article titled Cineplex rolls out multi-screen Lobby Show in its cinemas, Oct. 20, 2011. (Year: 2011).*

11 page PDF Dolby Theatre, Hollywood—Historic Theatre Photography, opened in Nov. 2001, photo dates vary. (Year: 2020).*

7 page PDF by Mankin Media titled LED Walls vs. Projectors, 2014. (Year: 2014).*

26 page PDF Let's Sneak into California's most Beautiful Art Deco Cinemas by Messy Nessy, May 14, 2014. (Year: 2014).*

1 page photo of the corridor of The Light Cinema of Stockport England. Photo is undated but downloaded May 21, 2020. (Year: 2020).*

Anonymous: "Illuminated designs: Cinema Architecture that Sparkles, Shimmers and Shines" Film Journal International, Sep. 23, 2014.

Zhang W., "Measurement and modelling of head-related transfer function for spatial audio synthesis", B.E. (Xidian University, China) M.E. (Hons 1) (The Australian National University, Australia, Aug. 2010.

Cheng C. et al., "Moving Sound Source Synthesis for Binaural Electroacoustic Music Using Interpolated Head-Related Transfer Functions (HRTFs)", Computer Music Journal, vol. 25, Issue: 4, pp. 57-80, 2001.

Geronazzo M. et al., "Mixed structural modeling of head-related transfer functions for customized binaural audio delivery", IEEE Digital Signal Processing, Jul. 1-3, 2013, pp. 1-8.

Anonymous: "Samsung Unveils its First Curved UHD TVs and Announces its 2014 UHD TV Roster—Samsung Global Newsroom", Jan. 7, 2014.

Gibbs, Samuel "Are Curved TVs Just a Marketing Gimmick?" The Guardian, Jan. 10, 2014,pp. 1-6.

* cited by examiner

LARGE FORMAT THEATER DESIGN

CROSS REFERENCE TO RELATED APPLICATIONS

This application claims priority to U.S. patent application Ser. No. 14/556,178, filed on Nov. 30, 2014, U.S. Provisional Patent Application No. 62/174,505, filed on Jun. 12, 2015 and U.S. Provisional Patent Application No. 62/085,611, filed on Nov. 30, 2014, each of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to movie theaters, cineplexes, theme parks, auditoriums, and other venues.

Description of Related Art

Theaters and the like have many entrance styles, and include many common designs for Opera houses, stages, and screening of cinema via projections or display of images.

SUMMARY OF THE INVENTION

The present inventors have realized the need to provide more dramatic and compelling theater design including consistent highlighting, appealing entrances, sound, and video that draws rather guide or funnel patrons into an establishment or other venue. The present inventions bring the art of theater design to a new level creating visual and sound pathways that draw patrons into a venue and set a mood or vibe matching or setting the patrons expectations and/or the mood, vibe, or setting consistent with a theatrical, cinema, or other event scheduled to occur at the venue. The present inventions include theater interior improvement including layout, visuals, speaker arrangements and coverings, and better seating arrangements including individually oriented seats such that each seat in a row has an optimal or at least a minimum sightline and corresponding viewing experience on par with most other seats in the theater.

In general the sound and lighting, including visual displays and the like, match a theme provided by promotional materials distributed for the event. For example, in one embodiment, at a movie theater, the visuals, lighting and sound will be recognizable from and "match" a movie poster or trailer presented on television, online streaming (e.g., YouTube), or other delivery system.

The present inventions, in various embodiments, include a curved theater entrance walkway comprising a video wall displaying scenes (or an environment) from a movie to be screen inside the theater. The curved entrance is curved such that a patron upon entering the curved walkway cannot see the end of the curved wall because it forms a "horizon" before the end which is "below" the horizon.

The present invention, in various embodiments, includes consistent highlighting that begins at a theater entrance, continues through the theater entrance, and then into the main theater and auditorium. In one embodiment, the highlighting is unbroken from entrance to the display area (such as movie screen. In one embodiment the highlighting begins outside the theater and continues to the display area. In yet another embodiment, the highlighting begins outside the premises of the theater and begins guiding patrons to the theater and then to the display area. In yet another embodiment, the consistent highlighting matches searchlights announcing the premier, showing, or other event at the theater.

The highlighting may include, for example, foot level based highlighting, which may comprise, for example, a recessed area in walls at foot level (e.g., floor to approximately 12 inches in height). The foot level highlighting provides a bright rim at foot level and may also provide additional illumination on walkways adjacent the wall. The foot level highlighting is provided, for example, on exterior walls, in the curved pathway entrance, and along walled walkways on one or more sides of the theater.

The highlighting may include "head level" lighting directly above (and matching in design) the foot level lighting. The "head level" lighting may be, for example, at or above an average adult head level, or simply above a contour or other feature along a wall or in a room. In one embodiment, the highlighting should provide the majority if not all of the lighting within the theater area proper (e.g., curved pathway & theater auditorium itself), but additional lighting may be provided by overhead lamps (e.g., ceiling lamps), that may also be programmable and attuned to action or other features described herein with respect to the highlight lighting. In embodiments including the video wall, the video wall itself provides additional lighting.

On pathways with stairs, the highlighting may include, for example, hand rail illumination matching the color, intensity, and possibly the theme of the foot level or other highlighting.

Further drawing participants into the theater, in these same or in other embodiments, include "moving" audio that, for example, draws patrons down or along paths to the theater, auditorium, or main screening area. The "moving" audio may match video on the video wall and move with a scene provided on the video wall. For example, a car racing along a pathway presented on the video wall will include matching moving audio such that as the car moves down the path the sound of its tailpipe, tires, etc. moves down the path with the car. Preferably, the moving sound itself is a spatially distributed sound such as Dolby Atmos (Trademark Dolby Laboratories, Inc.). The direction of the moving audio and/or objects in video on the video wall are preferably moving toward the theater auditorium and display area.

In various embodiments, the highlighting may include accent lights above and below the video wall (e.g., foot level and head level lighting. Such light may, for example, emanate from light sources that may be located behind or even under the video wall—e.g., video wall held out from the wall a few centimeters, for example). The highlighting is, for example programmable LED (or other switchable light sources) lighting. The highlighting may be programmed, for example, such that the lighting turns on/off, flickers, and/or changes in synchronicity with moving audio and/or moving images on the video wall.

Preferably, the video wall displays images in High Dynamic Range (HDR) and/or Wide Color Gamut (WCG), from video data encoded in an advanced HDR WCG format such as Dolby Vision (Trademark Dolby Laboratories, Inc.). In one embodiment, the video wall is projected using dual modulated HDR laser projectors. The wall may be, for example, a curved painted (and therefore easily maintained) surface. In one embodiment, the video wall is a screen illuminated from behind the wall in a rear projection configuration.

The invention includes every feasible combination of the above and/or other features described in more detail herein, as will be appreciated by the skilled artisan upon review of such features as described herein. The present invention includes methods and architectures of enticing patrons to enter a theater by illuminating the path such that the patrons want to enter the theater rather than be funneled by overbearing lights or huge monitors. The present invention includes interior designs of a theater including cocoon like enclosures (e.g., geometric fabrics) that remove references points for speaker locations, and provide acoustical properties that allow precise location of spatial sound objects as placed into the theater from a soundtrack or other audio source through the speakers.

The present invention(s) include(s) various theater designs and components thereof, including theater seating of specific sight angles and curvatures shown, ambiance features such as lighting moving with a video wall into a theater, and spatialized and moving sound objects, "moving" synchronously with one or more moving image objects displayed in the video wall. Such sound movements are, for example, spatialized from the perspective of a patron walking along the video wall such that either the sound and/or virtual object are sharing the walkway or such that the sound emanates from the corresponding (or related) object in the video wall. In one embodiment, at least one set of speakers are embedded in or placed behind the video wall. In one embodiment, sound from the video wall emanates in part from a matrix of speakers embedded in or placed behind the video wall, the sound emanating being a video wall server constructed sound spatialized such that objects (or partial objects) are created by mixing various portions of the sound to emanate from a plurality of the speakers in/behind the wall. Preferably, speakers in the ceiling, opposing wall, (and, in some embodiments, the floor) are also mixed at the server and contribute to the realization of sound objects presented in the walkway.

In one embodiment, the video wall is a 3D video wall and the spatialized sound is "placed" at a location "within" the video wall such that the user hears a sound caused by an object a specified distance "into" the video wall. For example, footsteps a "person" walking in the video wall alongside the patron as s/he traverses an entrance hallway equipped with the video wall.

The present invention includes the use of motion detection at one or more locations in the walkway that is input to a server or other mechanism to activate or control, or provide relevant patron location information utilized for the activation or control of the video wall, any objects, scenes, or activities on or "in" the video wall, and any associated sound(s). Further, the present invention may include floor rumblers design to add any of knocks, jolts or vibration to the walkway (e.g., vibrators, solenoid or mechanical arms configured to move the floor on command from a server or other electronic controlling device). Such motion being designed to enhance and/or simulate effects from action occurring on the video wall and/or within the sound being presented (and synchronously with the sound and/or video). Such effects, especially in theater entrances are intended to be subtle, and not cause patron balance issues or to make the motion/vibration a feature that distracts patrons from the mood of the setting. In theme parks, such as a theme park ride entrance, such effects would be intensified significantly.

Portions of the invention may be conveniently implemented in programming on a general purpose computer, or networked computers, and the results may be displayed on an output device connected to any of the general purpose, networked computers, or transmitted to a remote device for output or display. For example, the spatialized sound track (e.g., a Dolby ATMOS mixed soundtrack) and HDR video may be fed through a network (e.g., satellite, Internet, LAN, WAN) to the theater to a spatialized sound equipped cinema server and then projected (HDR video) and played through the speakers (ATMOS or other spatialized soundtrack). In addition, components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

FIG. 28 is a digital image corresponding to FIG. 21 illustrating a non-illuminated screen with highlighting turned on;

FIG. 58 is an image of a theater seating area corresponding to FIG. 56 with an illuminated screen and highlighting on;

FIG. 59 is an image of a theater seating area corresponding to FIG. 56 with an illuminated screen and partial highlighting on;

DESCRIPTION OF THE PREFERRED EMBODIMENTS

Figure 1:
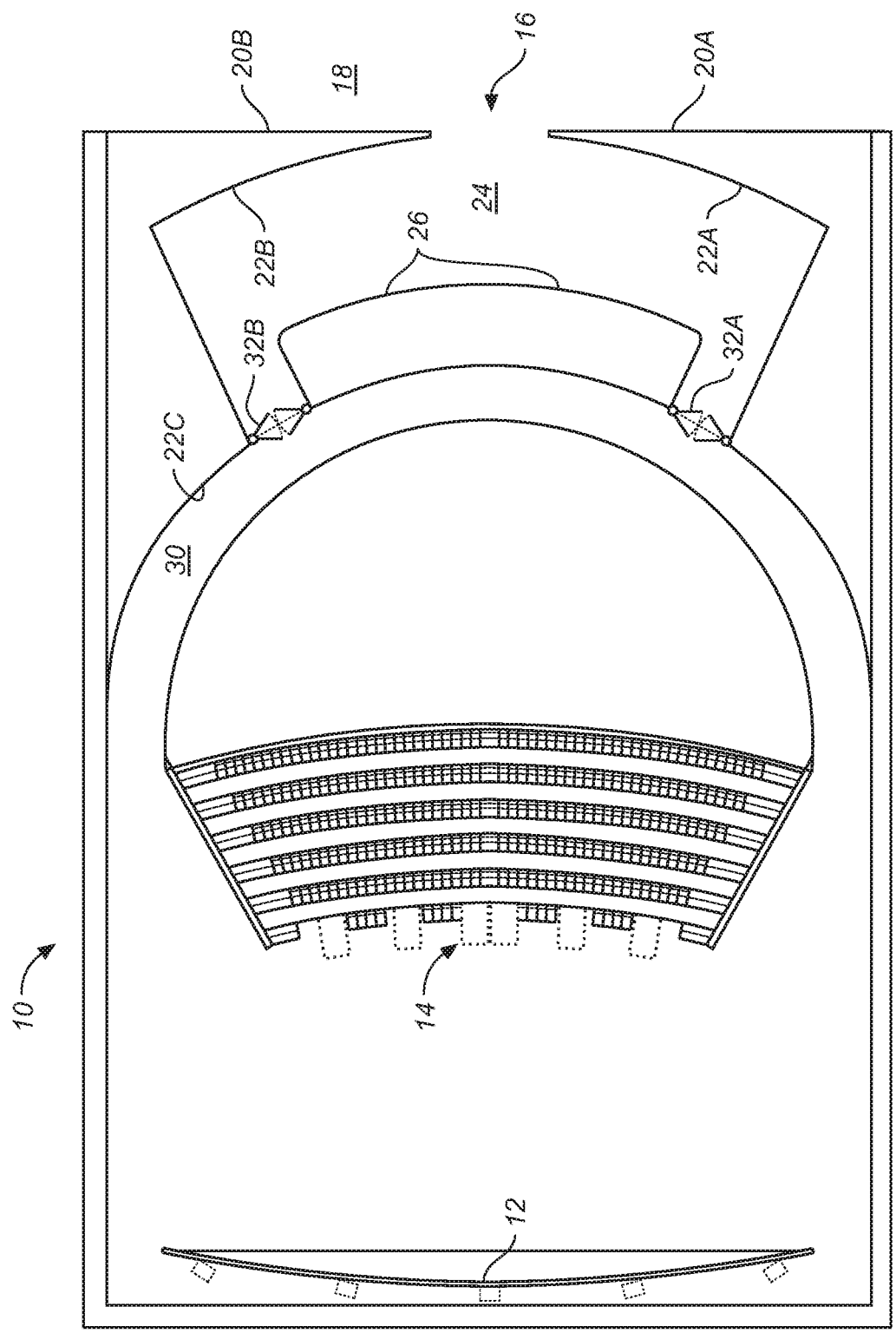
FIG. 1 is a top schematic view of a motion picture theater with an entrance.

Referring to FIG. 1, a motion picture theater having a novel entrance design is indicated generally by reference numeral 10. Theater 10 includes a screen 12 and a viewing area 14 for audience members (e.g., patrons). The viewing area may include seats, benches, handrails, stairs, or floor space so that the audience may stand or sit in the viewing area. Seating in the viewing area may be arranged in stadium-style, staggered rows, or any other orientation that comfortably allows audience members to view screen 12.

The theater 10 has an entryway 16, centrally located in this example, where audience members may enter and exit the theater. The entryway 16 is oriented so that the audience members walk from a lobby 18 and pass through the entryway 16 on their way to the viewing area 14. The opening of entryway 16 is defined by outer walls 20A/20B.

Inside entryway 16 is a vestibule 24 where the audience members can gather or pass through on their way to the viewing area 14. The vestibule 24 has inner walls 22A/22B, which may be curved.

On one side of vestibule 24 is an image projection wall 26 positioned opposite entryway 16, so that image projection wall 26 is visible within vestibule 24 as well as outside entryway 16 and in lobby 18. The image projection wall 26 may be convexly curved similarly to the shape of vestibule 24 so that it remains visible from nearly every position within vestibule 24.

After passing through the vestibule 24, audience members can walk along walkway 30 to the viewing area 14. Walkway 30 may have one or more doorways 32A/32B located at opposing ends of vestibule 24 that serve to block the sounds originating in the lobby 18 and vestibule 24 from being heard within the viewing area 14.

Figure 2:
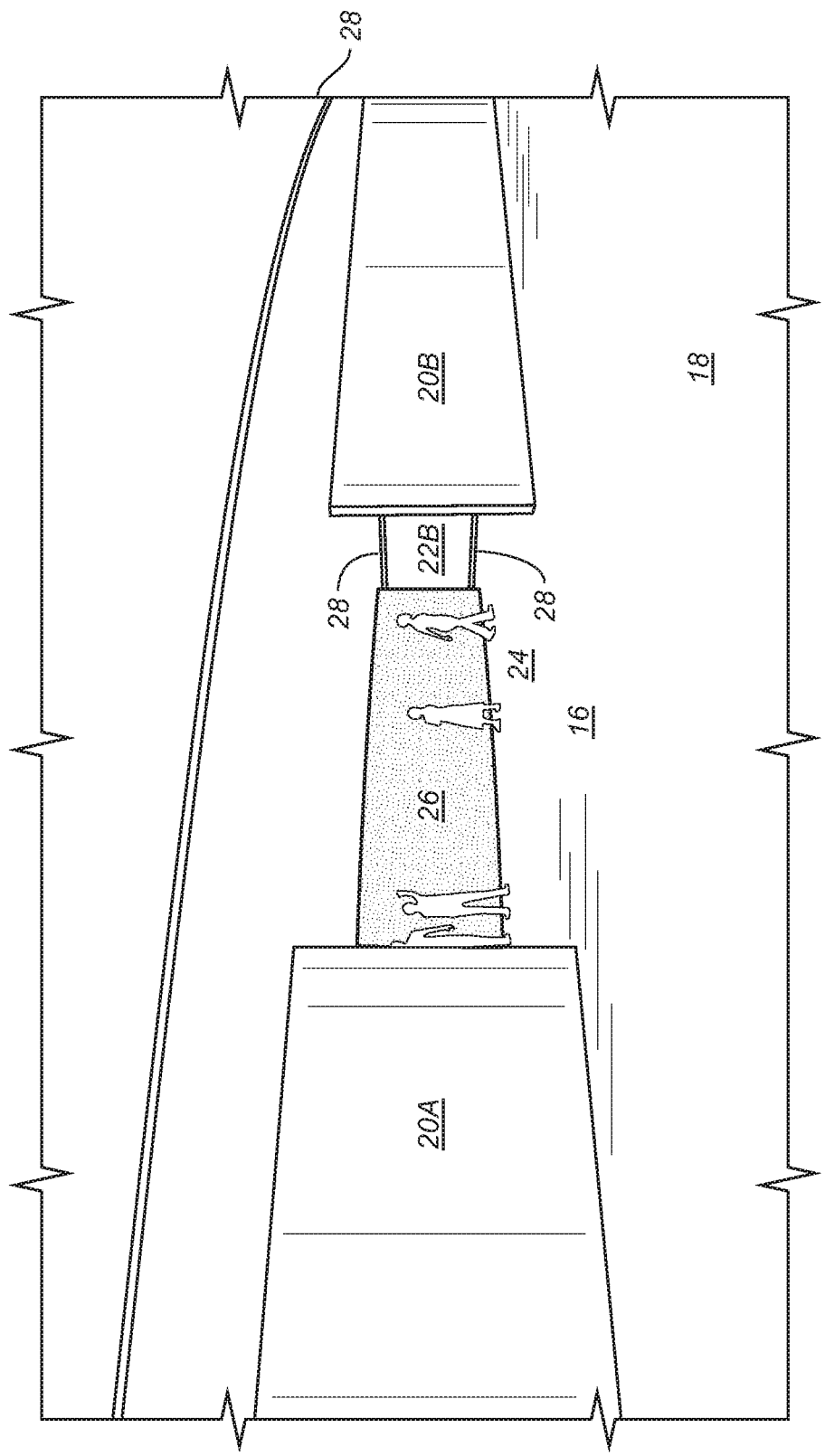
FIG. 2 is a front perspective view of the theater entrance shown in FIG. 1.

FIG. 2 illustrates a perspective view of entryway 16 that may be substantially centered between the two outer walls 20A and 20B. Outer walls 20A and 20B may be substantially planar so that they provide a distinctive and uniform division between lobby 18 and vestibule 24.

As shown also in FIGS. 3, 4 and 5, to further enhance the distinctiveness of entryway 16, border lighting 28 may be provided either above and/or below inner walls 22A/22B and/or image projection wall 26. Border lighting 28 consists of a light source (e.g., an LED strip) that is concealed in a wall recess located behind the top edge 29 and/or bottom edge 31 of image projection wall 26. Because the light source is positioned within the wall recess and angled so that light extends along the adjacent wall, the light source itself remains hidden within the recess while providing a smooth and continuous border lighting 28 along the adjacent walls regardless of whether or not the walls are flat or curved. The border lighting 28 can be one solid color, multicolored, and may also have special behaviors such as, but not limited to, blinking, chasing, fading, or color-changing effects.

The image projection wall 26 is directly opposite the entryway 16 as shown in FIG. 2 and extends substantially between the floor 27 to the ceiling 25 of the vestibule 24.

Figure 3:
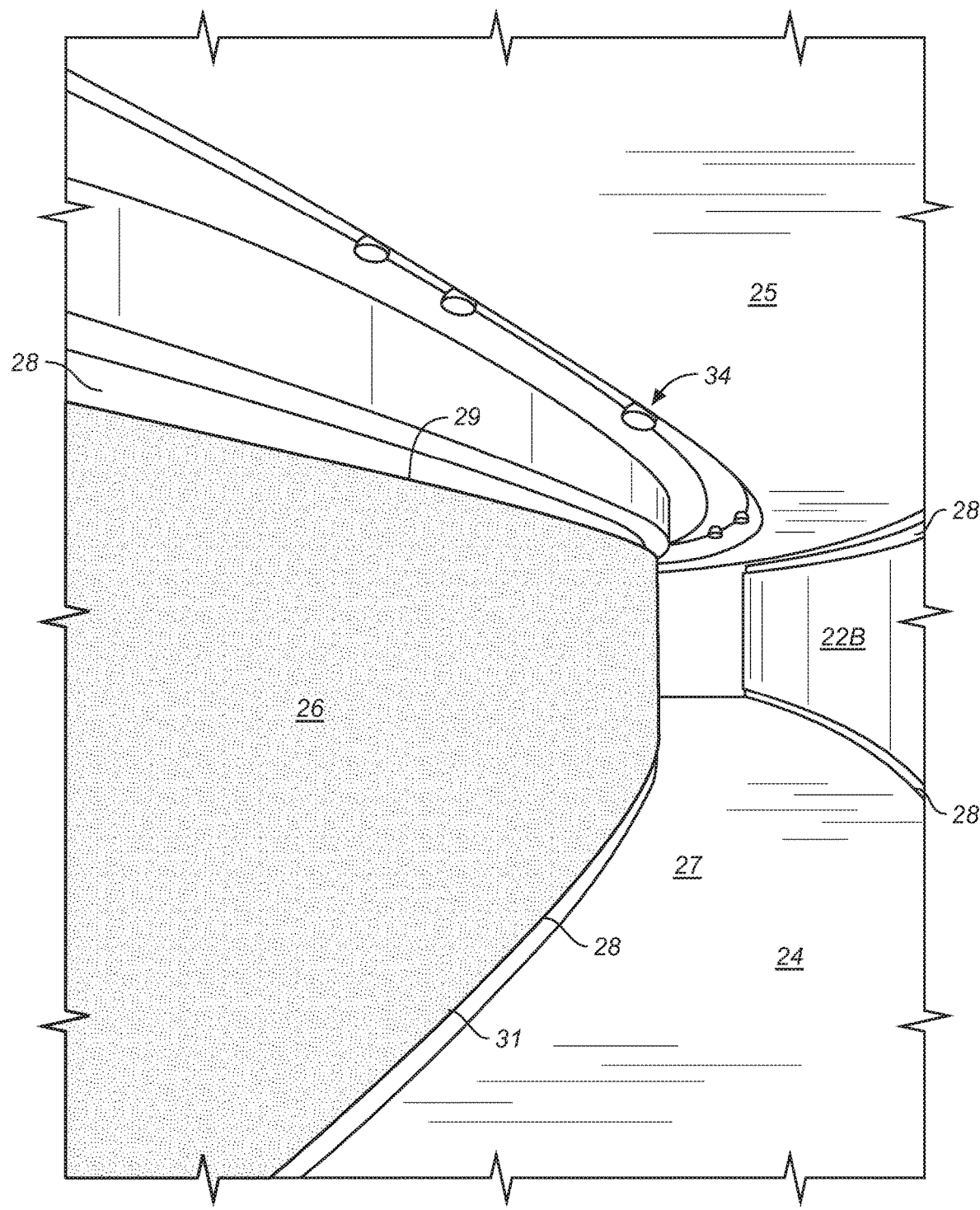
FIG. 3 is another front perspective view of the theater entrance, from a position in the vestibule.

Alternatively, as shown in FIG. 3, image projection wall 26 may extend less than the full height between the floor and the ceiling of vestibule 24. In such a case, border lighting 28 may be placed between the ceiling 25 of vestibule 24 and the top edge 29 of image projection wall 26, or between the floor 27 of vestibule 24 and the bottom edge 31 of image projection wall 26, or at both the top and bottom edges 29 and 31 of image projection wall 26. Border lighting 28 may also be placed at the top and bottom edges of inner wall 22B.

As noted above, border lighting 28 may be positioned at the top and the bottom of image projection wall 26 and also on inner wall 22, and may be placed only at the top or bottom of each wall or, alternatively, not included at all. A plurality of projectors 34 are shown positioned in a recess of ceiling 25 of vestibule 24. The projectors 34 are positioned so that the image projection wall 26 has a continuous image projected across the entire length and height of image projection wall 26.

Alternatively, a plurality of different images may be projected along different sections of the image projection wall 26. The projectors 34 are positioned within a recess of ceiling 25 so that they are partially hidden within ceiling 25 of vestibule 24. Projectors 34 are angled such that audience members can approach the image projection wall 26 without blocking the projectors and disturbing or distorting the projected image on the wall. The technology for creating such an image(s) on image projection wall 26 is commercially available from various companies, such as Christie Digital Systems USA, Inc. of Cypress, Calif.

Alternatively, the images on projection wall 26 could be achieved via individual displays or display panels, wherein the panels would be curved to conform with the shape of the vestibule 24 and controlled and synchronized to show a large-sized, continuous image across the whole surface of image projection wall 26.

Figure 4:
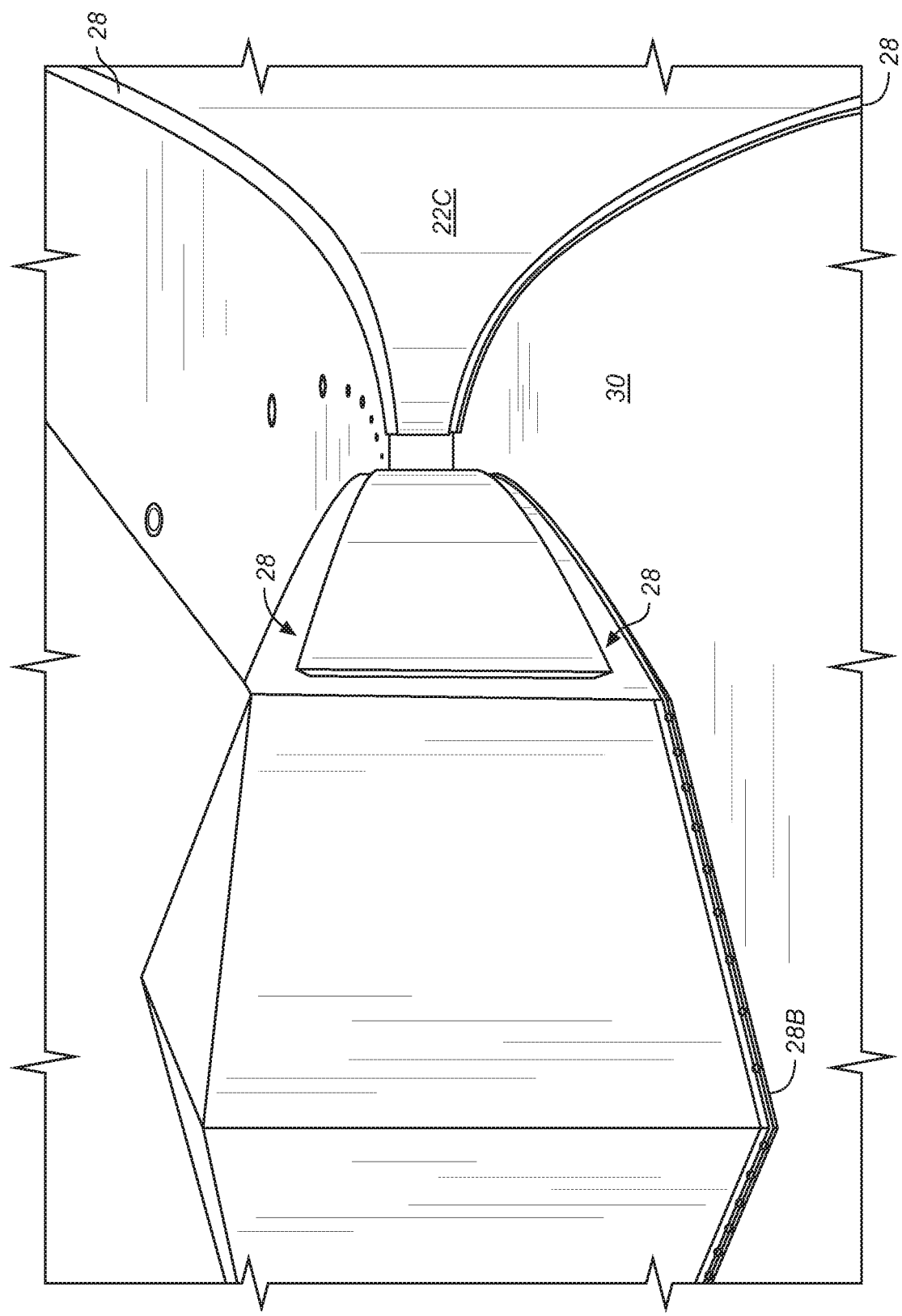
FIG. 4 is a perspective view of the walkway of the theater entrance.

FIG. 4 shows walkway 30 between vestibule 24 and viewing area 14. The walkway 30 is curved and has inner walls 22C with border lighting 28 shown at both the top and bottom edges of inner walls 22C. Alternatively, border lighting may be placed at only one edge of the inner walls 22C or be entirely absent from walkway 30. Border lighting 28 may be concealed in a wall recess located at the top edge or the bottom edge of inner walls 22C so that the light source itself remains hidden within the recess while providing a smooth and continuous border lighting 28 along the adjacent walls regardless of whether or not the walls are flat or curved. Alternatively, border lighting 28B can be placed along the top or bottom edges so that the light source is visible. The border lighting 28 and 28B can be one solid color, multicolored, and may also have special behaviors such as, but not limited to, blinking, chasing, fading, or color-changing effects.

Figure 5:
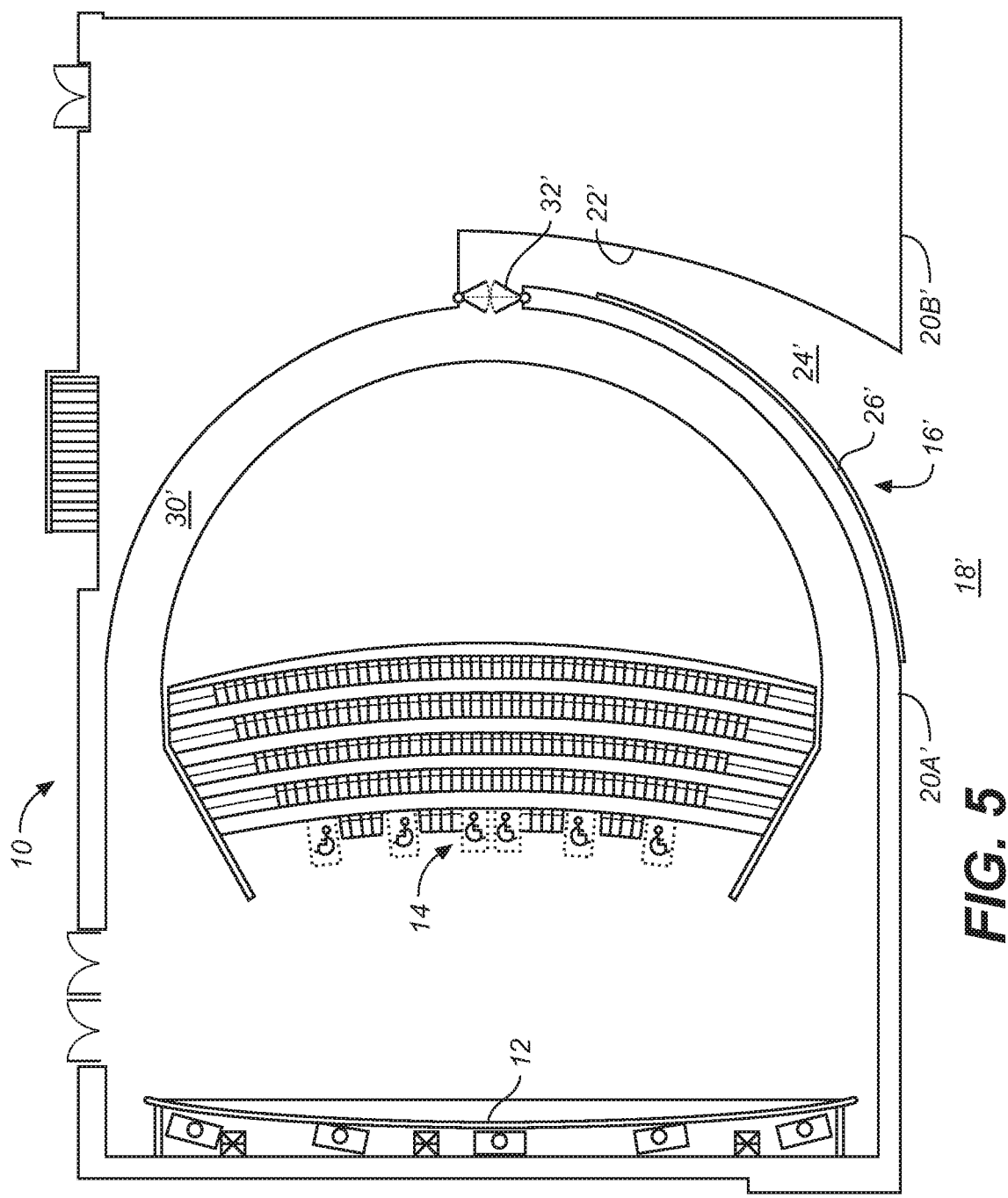
FIG. 5 is a top schematic view of an alternative design of a motion picture theater with an entrance.

FIG. 5 illustrates a plan view of an alternate design of the theater entrance wherein entryway 16', adjacent to lobby 18', is positioned at an approximate right angle relative to the position of the entryway 16 of FIG. 1. Entryway 16' is shown between two outer walls 20A' and 20B' at one end of vestibule 24' so that it is adjacent to the curved image projection wall 26'. The 20 vestibule 24' has a curved inner wall 22' that is opposite image projection wall 26'. In this design, there is one doorway 32' that connects vestibule 24' to the curved walkway 30', and doorway 32' is positioned at the far end of vestibule 24', thereby creating a centered, single doorway entrance to walkway 30' and viewing area 14. Alternatively, a substantially mirror-image layout to the design shown in FIG. 5, wherein the entryway would be on the opposite side to that 5 shown in FIG. 5, may be employed, as desired.

Figure 6:
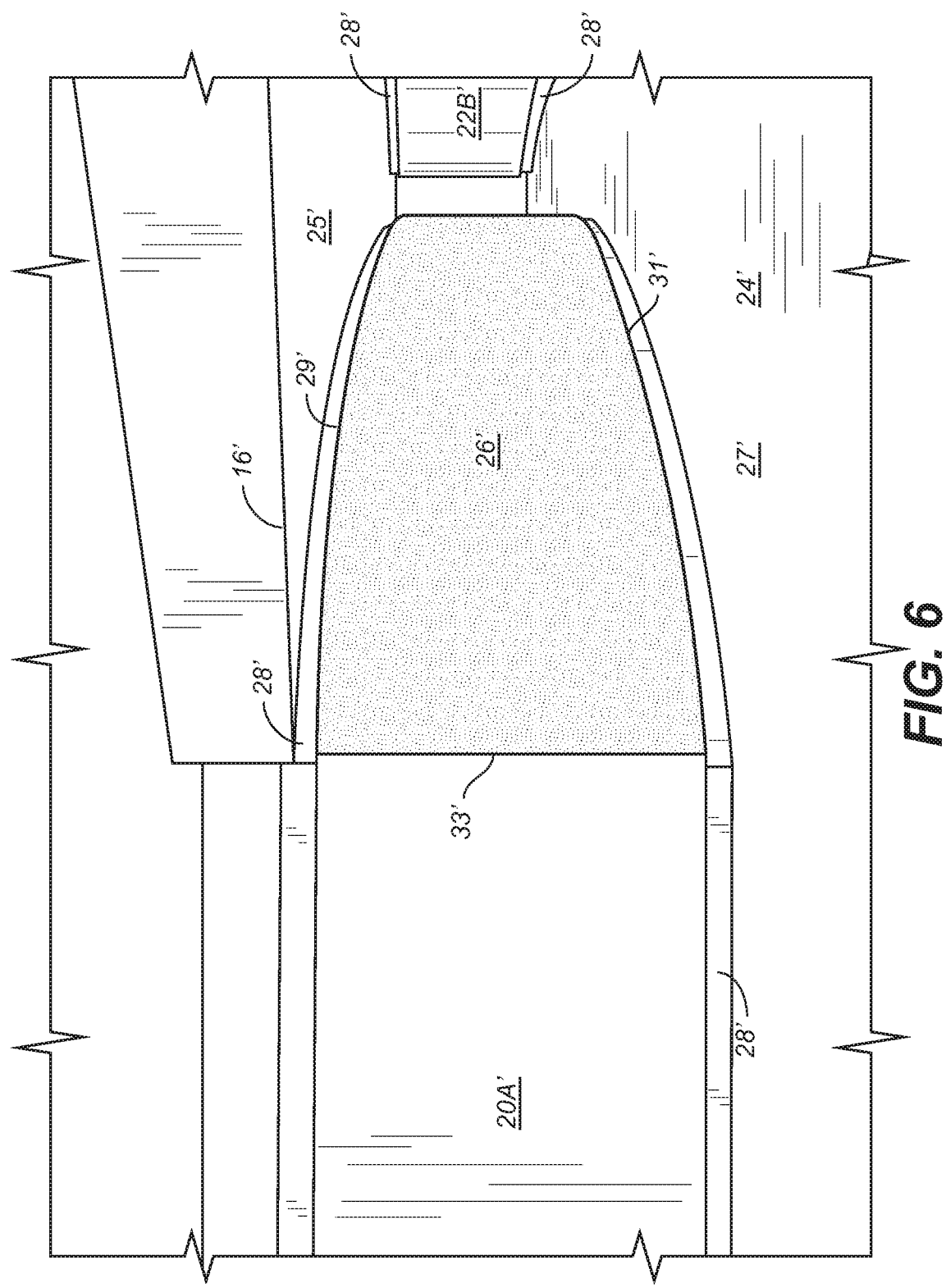
FIG. 6 is a front perspective view of the alternative design of FIG. 5.
Figure 7:
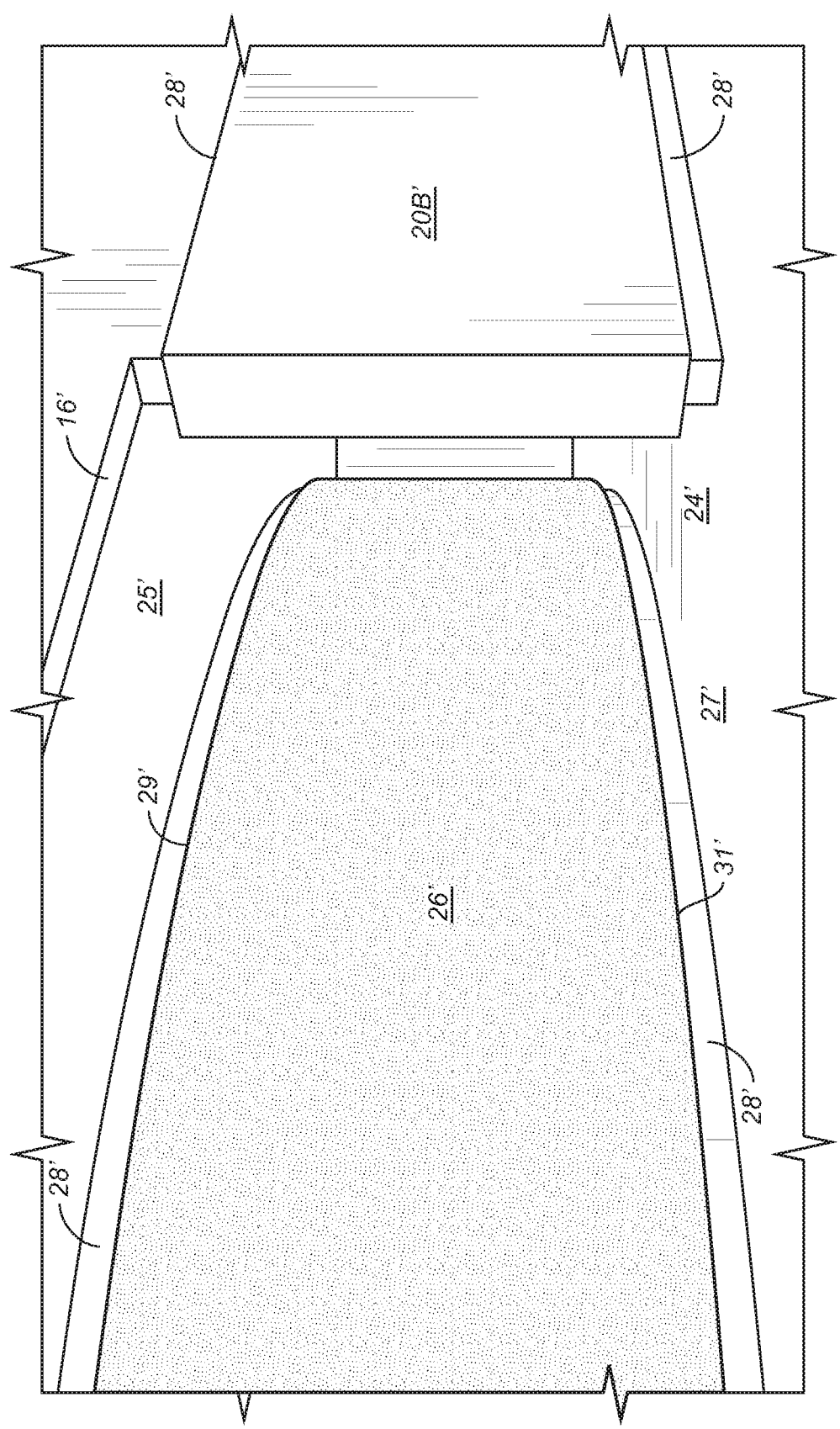
FIG. 7 is another front perspective view of the alternative design of FIG. 5.
Figure 8:
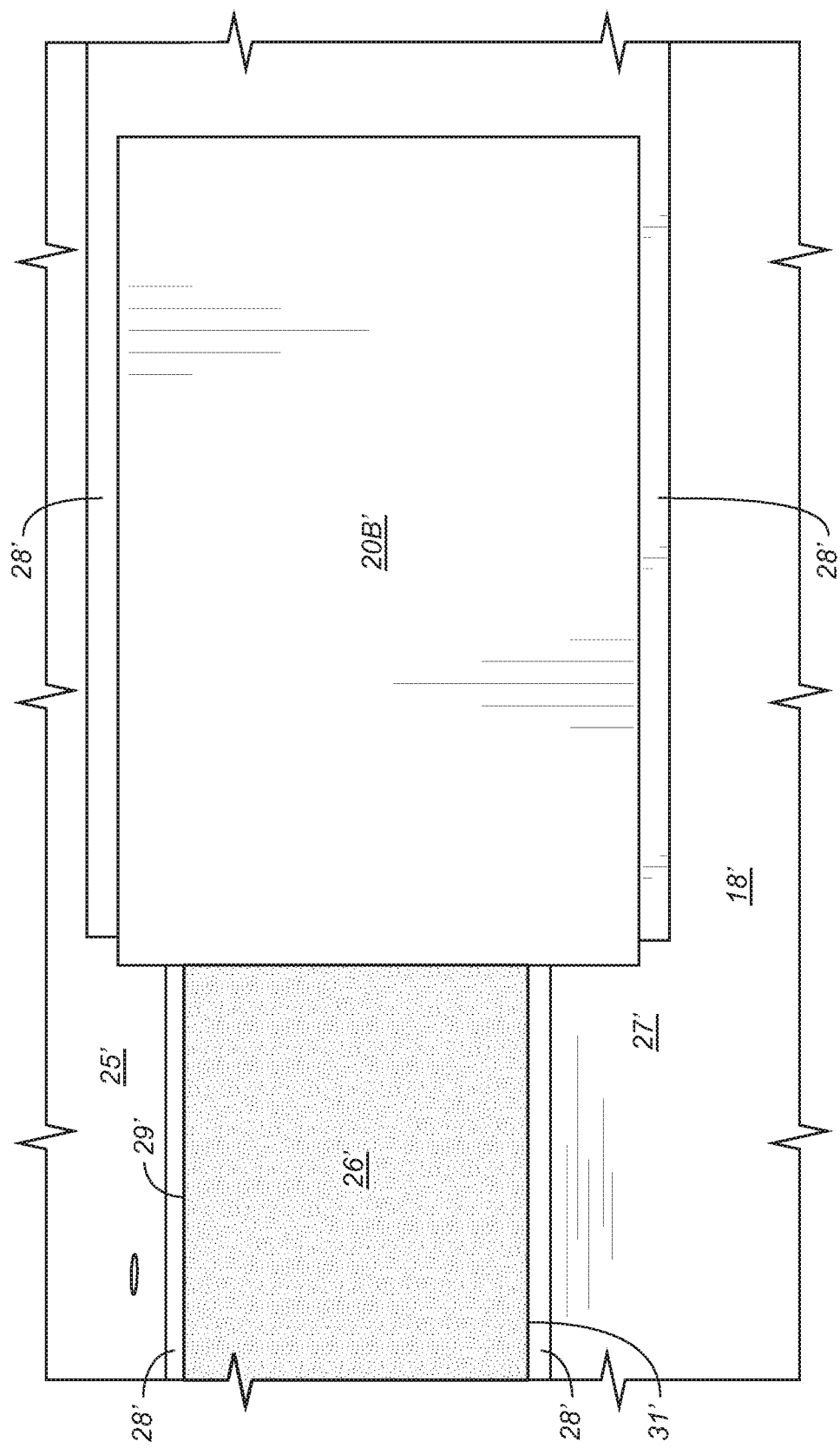
FIG. 8 is a front view of the alternative design of FIG. 5.

FIGS. 6-8 illustrate front views of the alternate design shown in FIG. 5. In this configuration, outer wall 20A' is positioned adjacent image projection wall 26'. Image projection wall 26' is shown to extend substantially between the floor 27' and the ceiling 25' of vestibule 24', but it may alternatively extend completely between floor 27' and ceiling 25'.

Entryway 16' is positioned between outer walls 20A' and 20B' adjacent the left edge 33' of image projection wall 26'. In this design, border lighting 28' is positioned at the top edge 29' and bottom edge 31' of image projection wall 26', inner wall 22B', and along the top and bottom edges of outer walls 20A' and 20B' (in a similar manner, border lighting 28 in FIGS. 2-4 may be provided at the top and/or bottom edge of outer walls 20A and/or 20B). The border lighting 28' is positioned so that it is at the same level on outer walls 20A' and 20B', inner wall 22B', and image projection wall 26' so that it appears continuous from the outer walls into and throughout vestibule 24'. However, the border lighting may be positioned at either the top or bottom edges of the walls or may be absent from one or all of the walls 20A', 20B', 22B' and 26'.

Figure 9:
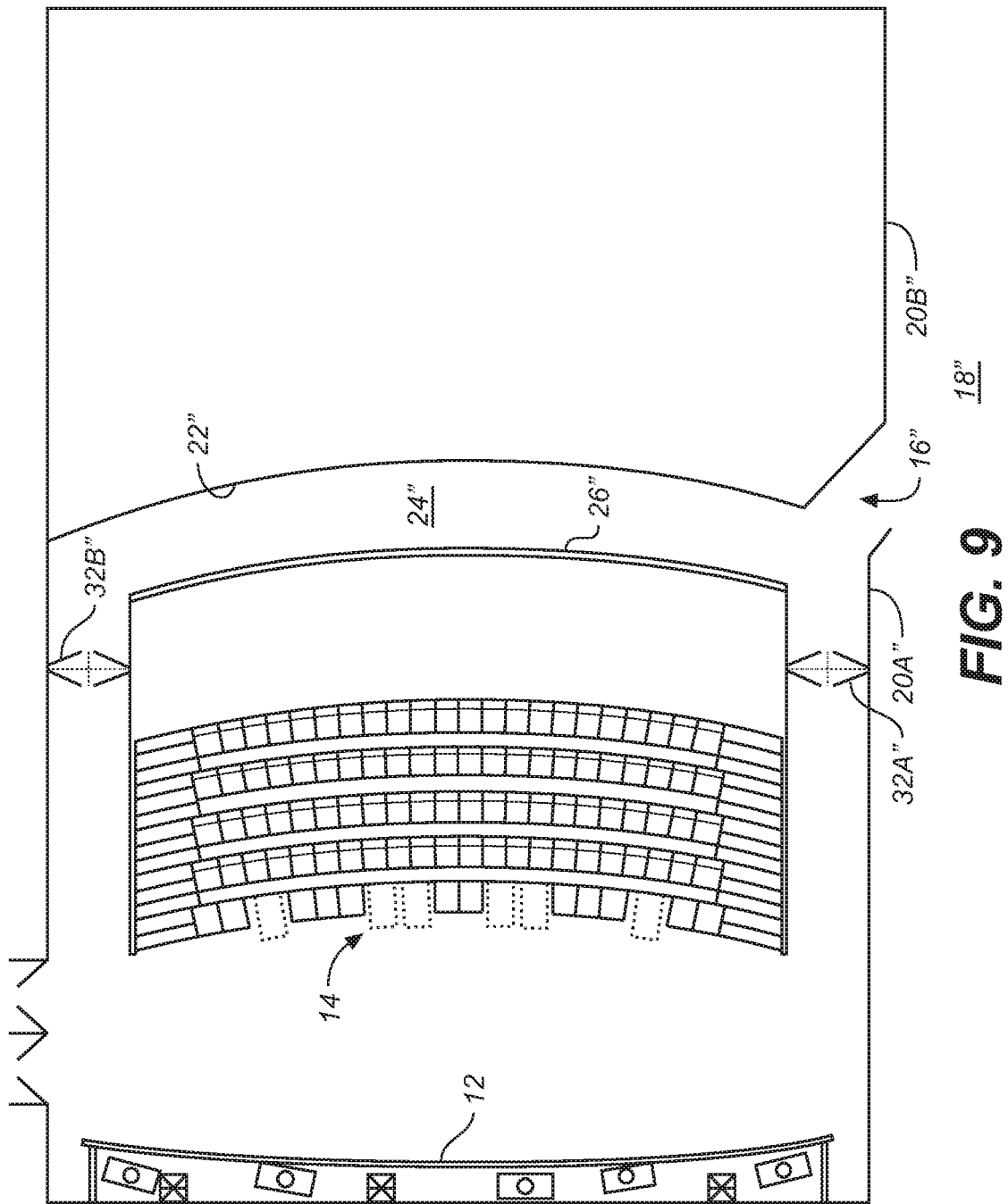
FIG. 9 is a schematic top view of a still further alternative design of a motion picture theater with an entrance.

FIG. 9 illustrates a plan view of an alternate design of the theater entrance in which an entryway 16" is positioned between two flat outer walls 20A" and 20B". Entryway 16" is positioned so that it is opposite to and at one side of the image projection wall 26". In contrast to the design of FIG. 5, the design of FIG. 9 employs two doorways 32A" and 32B" at respective ends of the vestibule 24" that lead to viewing area 14. This configuration assists in crowd control, i.e., upon exiting the theater, audience members can leave via either of the two doorways 32A" and 32B" which would aid in preventing overcrowding at one exit. The image projection wall 26" may extend along the entire length of vestibule 24", or it may extend across only a portion of the total vestibule length. Alternatively, a substantially mirror-image layout to the design shown in FIG. 9, wherein the entryway would be on the opposite side to that shown in FIG. 9, may be employed, as desired.

In one embodiment, the present invention provides a theater entrance, comprising:

a lobby; a vestibule having an entryway, an inner wall, and an end; a first outer wall that separates said vestibule from said lobby; a convexly curved image projection wall that is visible from said vestibule and said lobby; and border lighting along an edge of at least one of said inner wall and said outer wall. The invention may further include a walkway at said end of the vestibule. The invention may yet further include wherein the vestibule is connected to a viewing area by the walkway, or where the vestibule is connected to the walkway by a doorway.

Further enhancements may include, for example, a walkway between the vestibule and the viewing area that may be curved. The inner wall of the vestibule may be curved. The border lighting, among other places, may be placed at an upper edge of the inner wall. The border lighting may be placed at a lower edge of said inner wall (e.g., may be at both upper and lower edges).

The theater entrance may include a second outer wall, and the entryway may be substantially centered between said first and second outer walls. The image projection wall may be positioned opposite the entryway. The vestibule may be connected to the walkway at two locations at opposing ends of the vestibule.

The theater entrance may include where the entryway is positioned at one end of the vestibule. The image projection wall (or video wall) may be positioned adjacent to the entryway. The vestibule may be connected to the walkway at one location at an end of the vestibule that is opposite the entryway.

In another embodiment, the present invention provides a theater entrance, comprising:

a lobby; a vestibule having an entryway, a floor, and a ceiling; a first outer wall that separates said vestibule from said lobby; a convexly curved image projection wall within said vestibule, said image projection wall having both a top and bottom edge that substantially extend between said floor to said ceiling of said vestibule; and border lighting along at least one edge of said image projection wall. The border lighting may be positioned between the bottom edge of the image projection wall and the floor of the vestibule. The border lighting may be positioned between said top edge of said image projection wall and said ceiling of said vestibule. The border lighting may be positioned in two locations around the image projection wall, the first location being between the bottom edge of the image projection wall and the floor of the vestibule, and the second location being between the top edge of the image projection wall and the ceiling of the vestibule. The theater entrance may further comprise two doorways, one located at each end of the vestibule, or one doorway located at one end of the vestibule. The entryway may be centered with respect to the image projection wall. The entryway may be located at one end of the image projection wall.

Thus, in part, the present disclosure is directed to an entrance to a theater of the type used to show motion pictures. The motion picture theater entrance includes distinctive outer walls separating a vestibule from a lobby. The vestibule has a curved image projection wall located inside said vestibule and is connected to a viewing area by a curved walkway. The entrance also may include border lighting along the upper and or lower edges of the walls.

The present inventors have further realized the need to improve seating (and visibility) in theater design. In various embodiments, the present invention includes motion picture theater seating arrangement in an auditorium. The auditorium contains a stage, screen, and/or a viewing area with several rows of seats. The seating arrangement is designed in view of the auditorium dimensions so as to provide a seating arrangement that ensures a minimum viewing quality for all members of the audience regardless of their chosen seat or of the availability of the most often chose seats.

Figure 10:
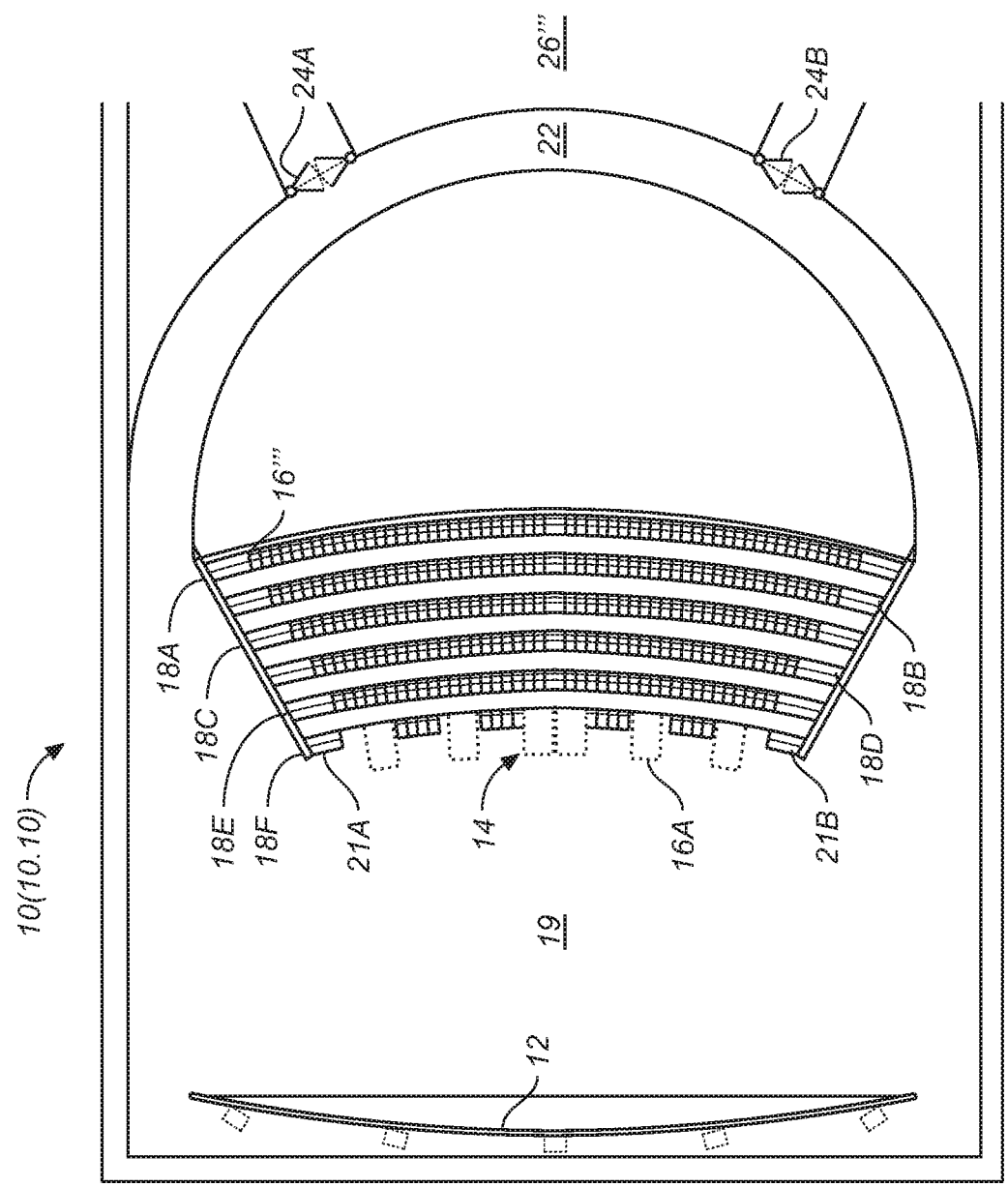
FIG. 10 is a top schematic view of a motion picture theater seating arrangement.

Referring to FIG. 10, a motion picture theater having particular seating arrangement is indicated generally by reference numeral 10.10 (referring to FIG. 10, reference numeral 10). Theater 10.10 includes a screen 2 and a viewing area 14 for audience members. The viewing area may include seats 16''' for audience members as well as wheelchair accessible seating 16A.

Seats 16 are arranged in a plurality of rows (18A-18E). In the configuration set forth in FIG. 1, rows (18A-18E) are positioned on levels above entrance level 19 while row 18F, containing the wheelchair accessible seating 16A, is at the ground level. Stairways 21A and 21B and all exit rows from the theater must be of an appropriate depth in order to comply with local building ordinances. Theater 10 also has a curved walkway 22 which has two doorways 24A and 24B.

The curved walkway 22 may include any combination of curved walkway features described elsewhere herein, including, for example, interior lighting, lighting control video wall, gaming applications, social media, etc. Doorways 24A and 24B have doors that serve to block the sounds originating in the lobby 26''' from being heard within the viewing area 14.

Figure 11:
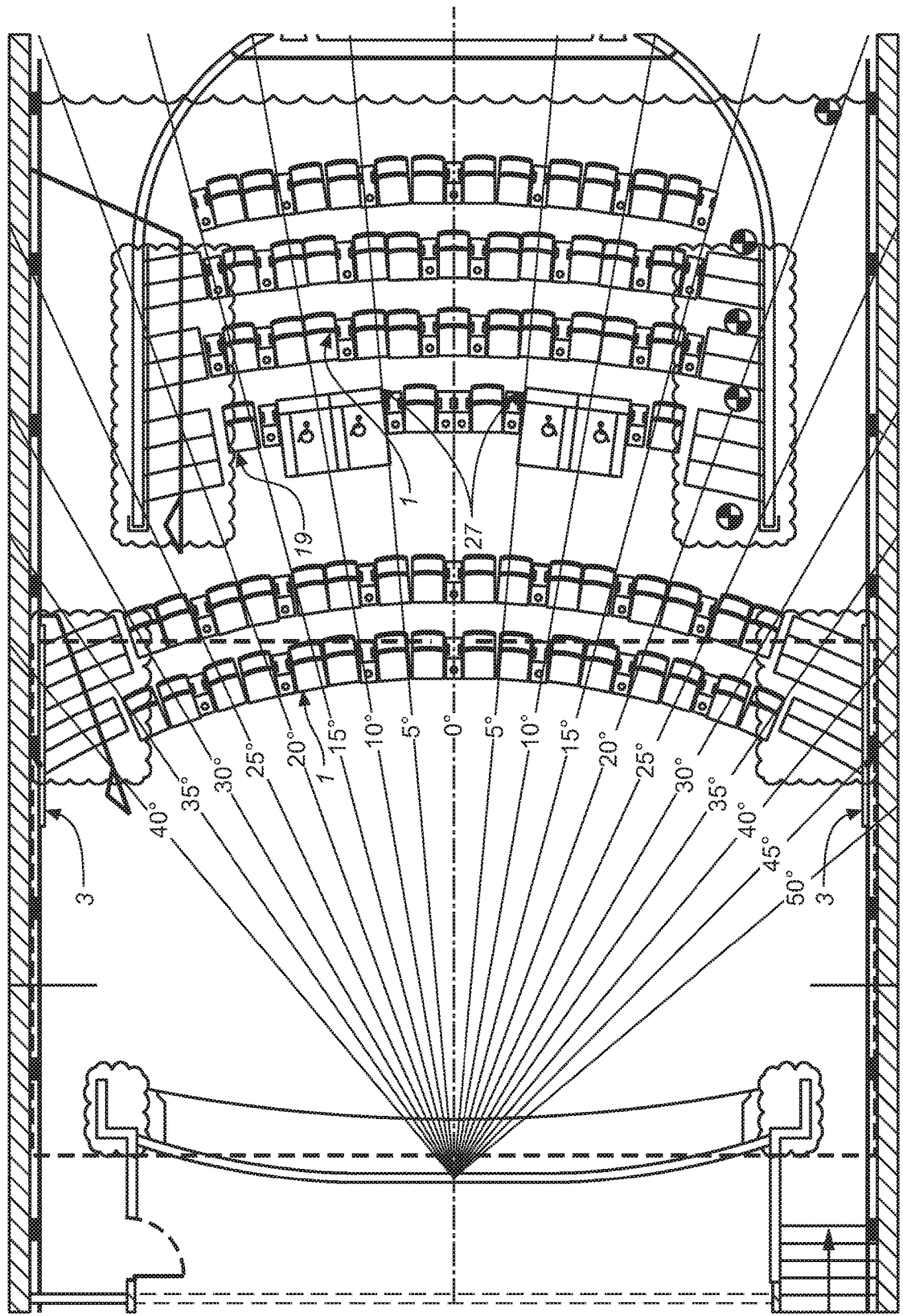
FIG. 11 is a schematic view of an alternate theater seating arrangement.

FIG. 11 (2) illustrates a plan view of an alternate design of the theater seating arrangement wherein seating rows 18A'-18C' are positioned on levels above the entrance level 19', rows 18D'-18E' are positioned on levels below the entrance level 19' and are accessible via stairways 20C' and 20D', and row 18F', containing the wheelchair accessible seating 16A', is on the same level as the entrance level 19'.

Figure 12:
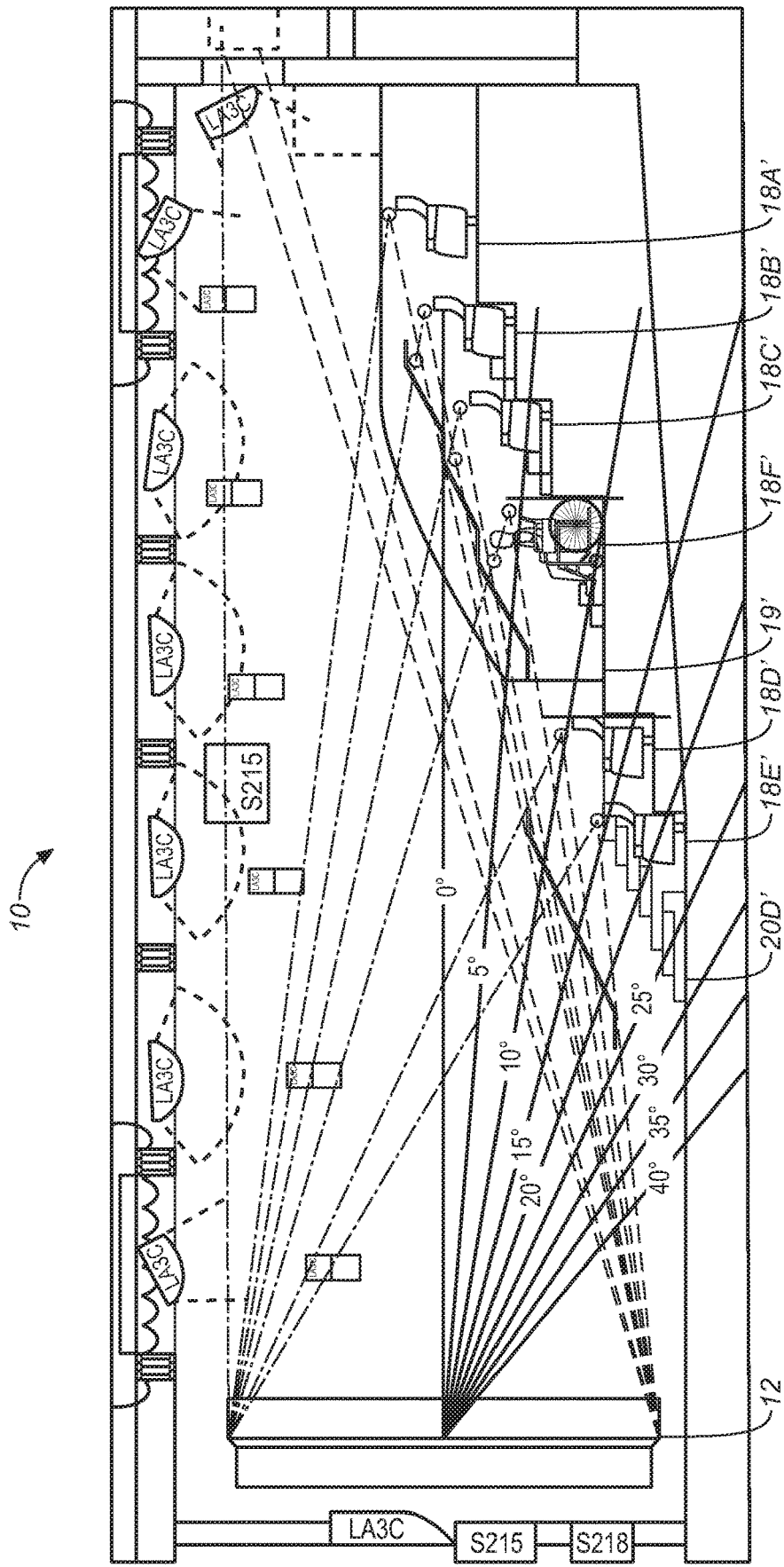
FIG. 12 is an elevation view of the alternate theater seating arrangement.

FIG. 12 (3) is an elevation view of the theater seating arrangement shown in FIG. 11 (2). The vertical viewing angles can be seen for rows 18B'-18F' and are all within the maximum vertical viewing angle requirement. The theater seating arrangement of FIG. 12 (3) also accounts for the fact that the seats used in the theater may possess a reclining feature so that the audience members (e.g., patrons), particularly those in the front rows 18D' and 18E' have the ability to adjust their seats to be more comfortable and also to get the desired line of sight.

In order to ensure that all seats in theaters 10.10 and 10' have an optimum viewing specification so that the viewing experience is satisfactory for all audience members regardless of their location in the theater, the theater is designed so that there are minimum requirements that each seat in the theater must meet.

Figure 13:
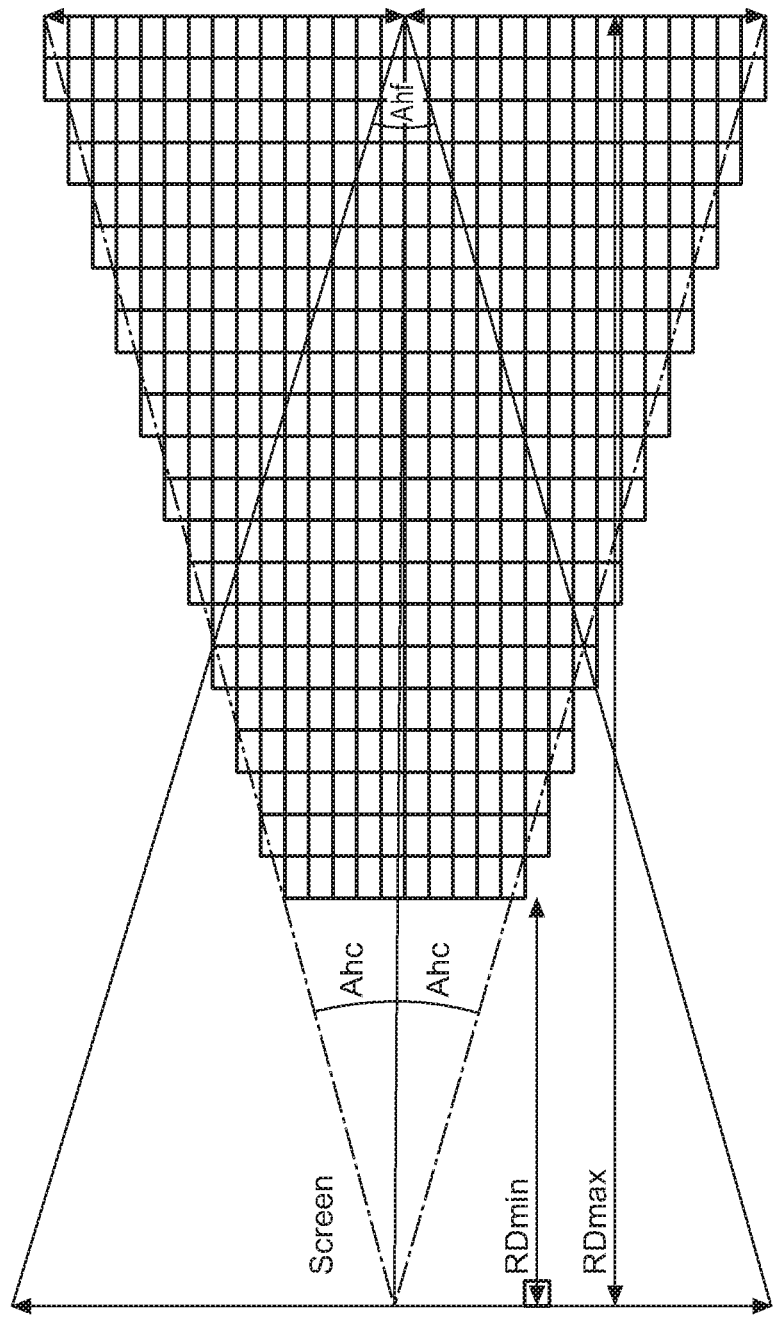
FIG. 13 is a top view of a theater showing how the horizontal viewing angle and the horizontal field of view are measured.

FIG. 13 (4) is a top view of a theater showing how a horizontal viewing angle (Ahc) and a horizontal field of view (Ahf) are measured.

Figure 14:
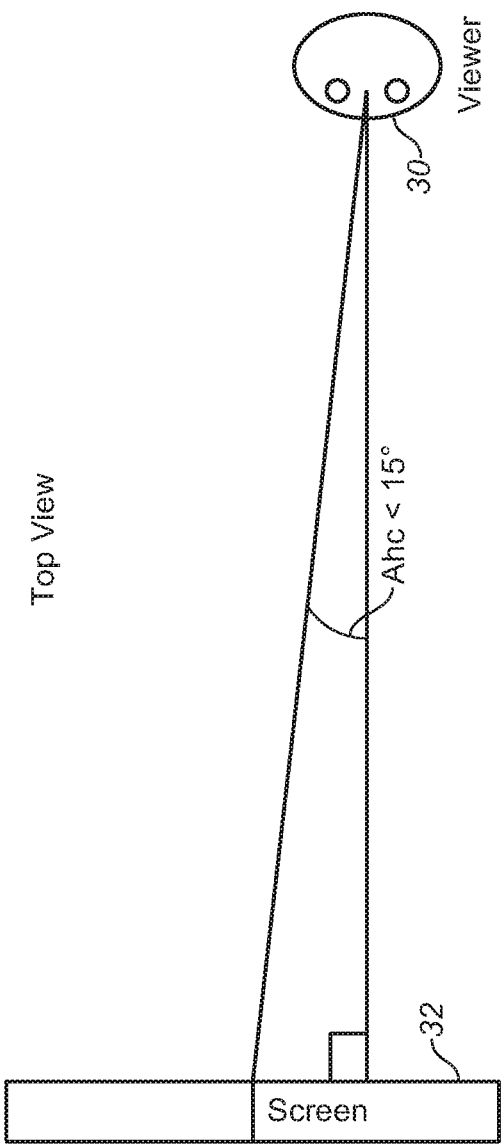
FIG. 14 is an illustration of how the horizontal viewing angle is measured.

FIG. 14 (5) is a schematic overhead view of the viewer and screen. Ahc is measured from the eye level of the viewer 14.30 to the screen 14.32. The maximum horizontal viewing angle Ahc is 15 degrees to the center of the screen. Traditionally, the worst seats in a theater arrangement are the end seats in each of the rows. In order to meet the specification for the maximum horizontal viewing angle, it is sometimes necessary to curve the rows of the theater seating arrangement closer towards the center so that the ends of the rows are curved closer to the screen (e.g., screen 10.12 or screen 14.32).

In some configurations, the theater geometry may not allow for the rows to be curved to the degree necessary to achieve this standard, so seats may also be individually angled based upon their location in the theater so that the horizontal viewing angle requirement may still be met. The present invention includes theater seating wherein each seat, or at least some seats in a row are individually angled, preferably within the Ahc and/or other requirements stated herein.

As shown in FIG. 13 (4), the horizontal field of view angle (Ahf) is measured and specified to provide an immersive experience even from the back row of the theater. Ahf is the angle subtended by a straight line from each side of the screen to the seating position and is met by not allowing the back row of the theater to be more than a distance of 187% of the screen width away from the screen (e.g., the screen illustrated in FIG. 13 (4), or 10.12, or others etc.). The minimum horizontal field of view angle is preferably 30 degrees. As shown in FIG. 11 (2), all of the seats in the theater are within the horizontal field of view angle requirement.

Figure 15:
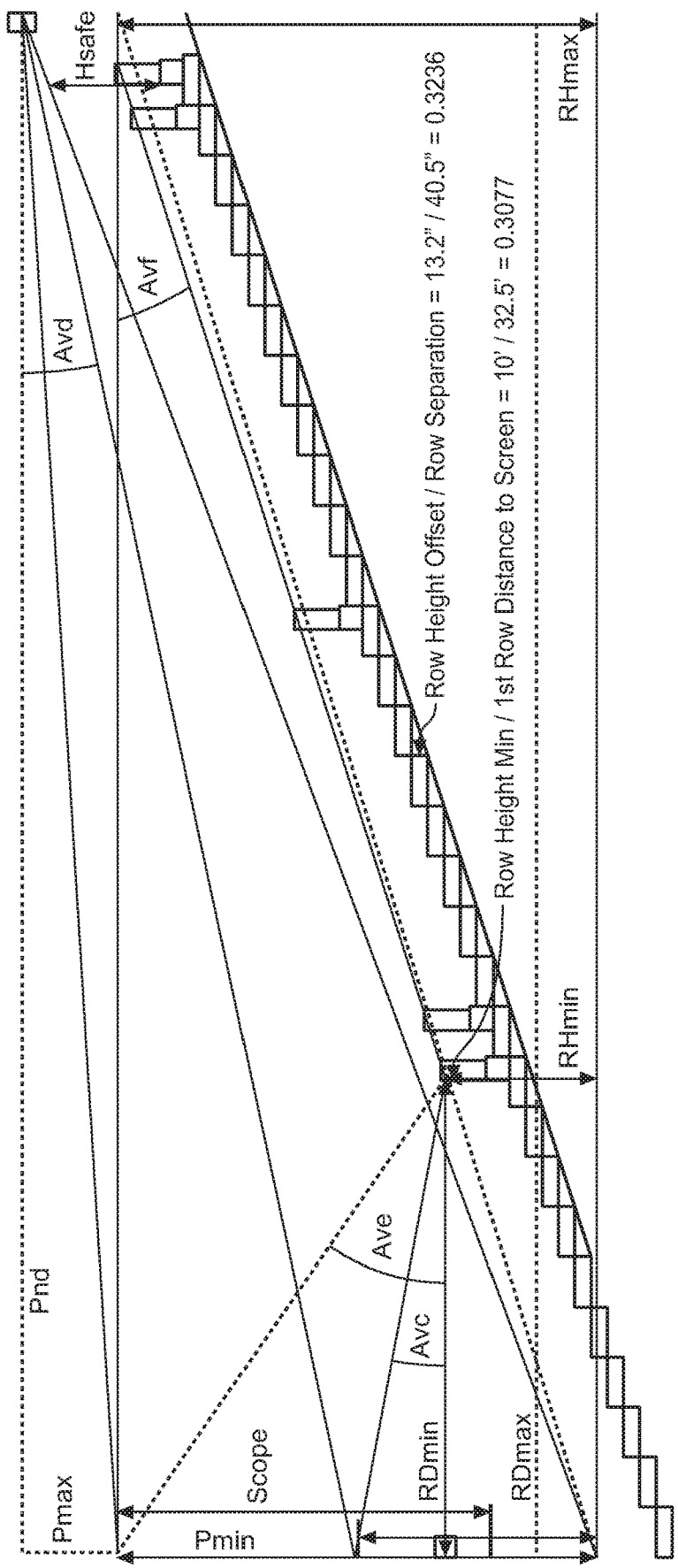
FIG. 15 is an elevation view that shows how the vertical viewing angle is measured.
Figure 16:
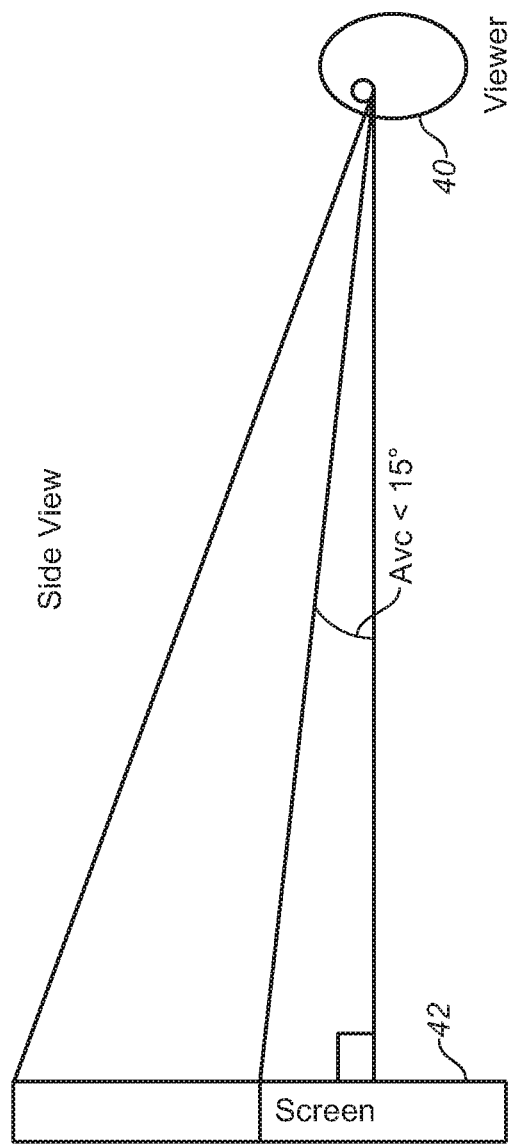
FIG. 16 is an illustration of how the vertical viewing angle is measured.

FIG. 15 (6) is an elevation view that shows the vertical viewing angle (Avc) as the angle between the viewers' eye levels and center of the screen. FIG. 16 (7) shows a side view of the viewer and the screen. Avc is measured from the eye level of viewer 16.40 to the screen 16.42.

The optimal measurement for the vertical viewing angle is that no viewer would have an angle greater than 15 degrees (or approximately 15 degrees) to the top or bottom of the screen, and optimally no more than between 12-15 degrees. Preferably, the angle is 0 degrees, but the necessities of theater design for many patrons dictates up to approximately 15 degrees may be utilized. In order to achieve this range, the seats 10.16 and 10.16' in the theater 10.10 and 10' (or other theaters such as those described herein) may be adjustable so that they may be reclined. This enables more seats to be added to the theater while still maintaining this minimum vertical viewing angle.

Figure 17:
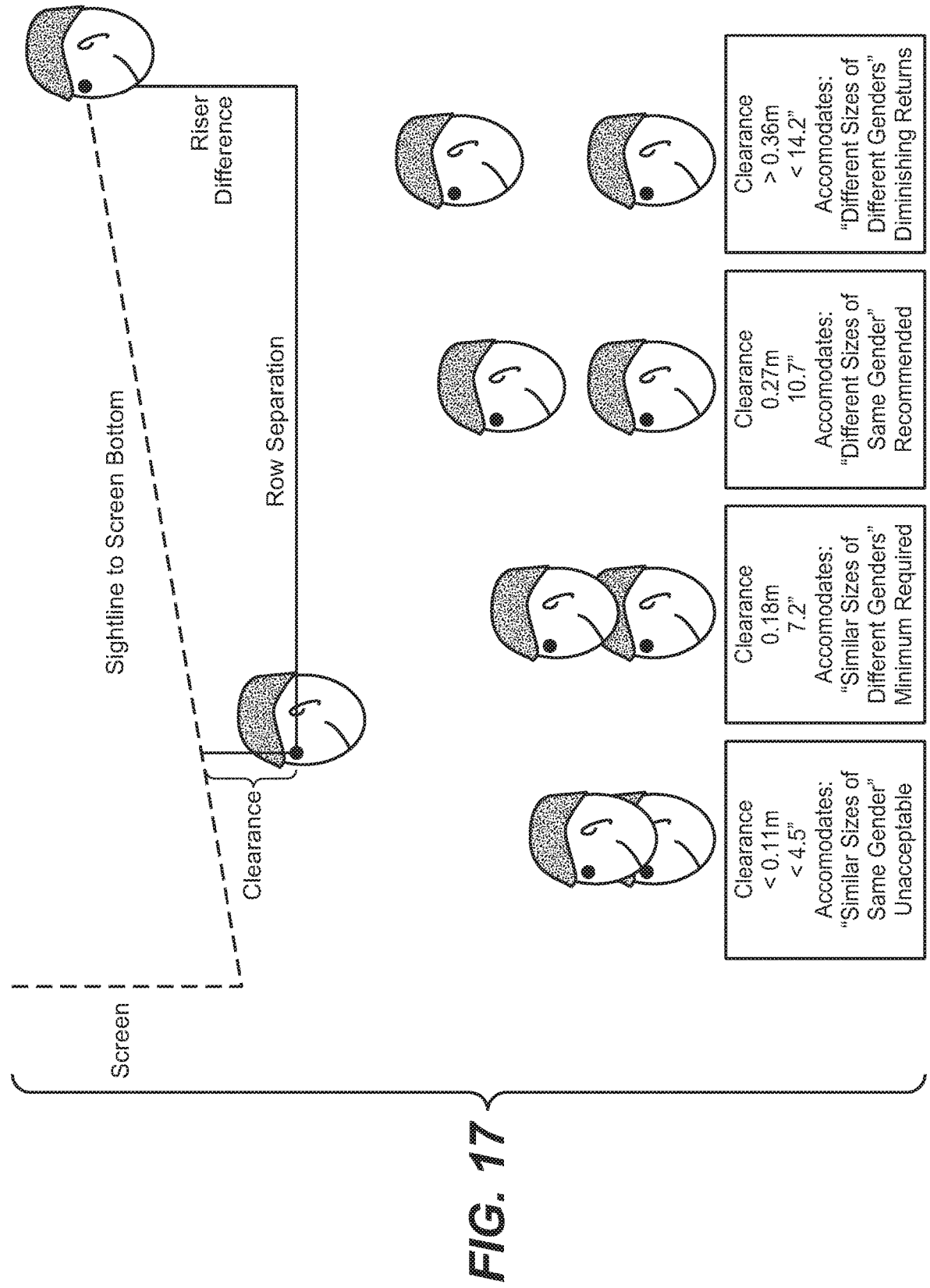
FIG. 17 is an illustration of how the sightline specification is measured.

As shown in FIG. 17 (8), sightline specifications are measured from the sightline to the bottom of the screen down to the eyes of the patron one row forward. The minimum specification is 7.2 inches. These specifications are usually met by specifying a specific riser height. However, this is not applicable to every theater due to existing theater geometry; the available height is often limited and so it is distributed as needed instead of each row getting exactly the same riser height. By varying the riser heights, one can achieve the correct compensation of rows with different depths (e.g. cross aisles). The row separation is preferably at least 45 inches (or approximately 45 inches). The ideal riser heights per row can be calculated in a parabolic fashion using these calculations:

Screen Height:Heightsightline=HeightHardwall−
Heightoff_floor−1.2 meters     [1]

Height Based Screen Width:
Widthsightline=1.85*Heightsightline     [2]

Table 1 below illustrates the maximum and minimum head vertical separation necessary to achieve preferred or ideal sightline specifications. While there may be no single ideal sightline specification (e.g., there is always someone taller that may sit in front of any particular seat), the present invention provides nearly ideal or preferred values and calculations to achieve a good result considering the range of heights and sizes of most theater patrons.

TABLE 1

| Head Vertical Separation Specification | | | | |
|---|---|---|---|---|
| Max | 14.2 | Inches | 0.36 | meters |
| Good | 10.7 | Inches | 0.27 | meters |
| Min | 7.2 | Inches | 0.18 | meters |

Table 2 provides a summary of vertical separation analysis with respect to the different male and female sizes.

TABLE 2

| Summary of Vertical Separation Analysis | | | | | Summary of Vertical Separation Analysis | | | | |
|---|---|---|---|---|---|---|---|---|---|
| In | Head to Eye Offset | | | | In | Head to Eye Offset | | | |
| Inches | F | M | M to F | Worst | Meters | F | M | M to F | Worst |
| Large | 4.7 | 4.6 | 8.3 | 12.2 | Large | 0.12 | 0.12 | 0.21 | 0.31 |
| Average | 4.1 | 4.5 | 7.2 | | Average | 0.10 | 0.11 | 0.18 | |
| Small | 3.4 | 4.4 | 7.1 | | Small | 0.09 | 0.11 | 0.18 | |

Table 3 provides an example of the sightline specification calculations for a poorly designed theater seating arrangement with fourteen rows where the row height is only 0.40. Note that all of the clearances above the next row calculations are shown to be in the minimal satisfactory ranges.

TABLE 3

| Row Number | screen | 1 | 2 | 3 | 4 | 5 | 6 | 7 | 8 |
|---|---|---|---|---|---|---|---|---|---|
| Row Height | 0.40 | 1.00 | 1.25 | 1.50 | 1.75 | 2.00 | 2.25 | 2.65 | 3.05 |
| Distance from Screen | 0 | 8.35 | 9.55 | 10.75 | 11.95 | 13.15 | 14.35 | 16.95 | 18.15 |
| Clearance Above Next Row | | | 0.14 | 0.13 | 0.11 | 0.10 | 0.10 | 0.05 | 0.22 |

| Row Number | 9 | 10 | 11 | 12 | 13 | 14 |
|---|---|---|---|---|---|---|
| Row Height | 3.45 | 3.85 | 4.25 | 4.65 | 5.05 | 5.45 |
| Distance from Screen | 19.35 | 20.55 | 21.75 | 22.95 | 24.15 | 25.35 |
| Clearance Above Next Row | 0.21 | 0.20 | 0.19 | 0.18 | 0.17 | 0.16 |

Table 4 provides an example of the sightline specification calculations for a the same theater seating arrangement disclosed in Table 3 but now with a row height of 1.40. Note that all of the clearances above the next row calculations are now shown to be in the optimal ranges.

TABLE 4

| Row Number | screen | 1 | 2 | 3 | 4 | 5 | 6 | 7 | 8 |
|---|---|---|---|---|---|---|---|---|---|
| Row Height | 1.40 | 1.00 | 1.25 | 1.50 | 1.75 | 2.00 | 2.25 | 2.65 | 3.05 |
| Distance from Screen | 0 | 8.35 | 9.55 | 10.75 | 11.95 | 13.15 | 14.35 | 16.95 | 18.15 |
| Clearance Above Next Row | | | 0.27 | 0.24 | 0.21 | 0.20 | 0.18 | 0.21 | 0.29 |

| Row Number | 9 | 10 | 11 | 12 | 13 | 14 |
|---|---|---|---|---|---|---|
| Row Height | 3.45 | 3.85 | 4.25 | 4.65 | 5.05 | 5.45 |
| Distance from Screen | 19.35 | 20.55 | 21.75 | 22.95 | 24.15 | 25.35 |
| Clearance Above Next Row | 0.27 | 0.26 | 0.24 | 0.23 | 0.22 | 0.21 |

The specifications used in the construction of the new theater seating arrangement are listed in Table 5. Several of the specifications are averages and may vary accordingly with differing theater geometry.

TABLE 5

| Parameter | Value | Unit | Notes |
|---|---|---|---|
| Vertical viewing angle | 15° | To Center | Maximum vertical viewing angle |
| Horizontal viewing angle | 15° | To Center | Maximum horizontal viewing angle |
| Horizontal field of view | 30° | Edge to Edge | Minimum horizontal field of view |
| Sightline Clearance | 7.2 | Inches | Minimum distance from sightline to screen bottom to eyes of patron in the next row |
| Last row distance to screen (max) | 186% | % screen width | Maximum distance to back row from screen |
| Screen Aspect ratio | 1.85 | :1 | Screen is flat aspect ratio |
| Throw Ratio | 1.2 | :1 | Minimum throw allowable |
| Row separation | 45 | Inches | Minimum back to back distance between seats |
| Seat width | 28 | Inches | Minimum distance between seat centers. |
| Distance celling to finish | 0.8 | Meters | Typical distance to finish from speaker mounts |
| Distance seats to side | 1 | Meters | Typical distance to seats from side walls |
| Distance seats to back | 1 | Meters | Typical distance to seats from back wall |
| Screen to front wall | 2 | Meters | Typical distance from auditorium front wall to screen |
| Screen to side wall | 1.2 | Meters | Typical distance from screen to side walls |
| Screen to ceiling | 1.2 | Meters | Typical distance from screen to ceiling |
| Screen to floor | 0.4 | Meters | Minimum distance from screen to floor |
| Booth power | 102 | Kilowatts | Typical total booth power loading |
| Booth ventilation | 3,800 | CFM | Typical total booth ventilation *Local codes may require additional 5,000 CFM for refrigerant purging |
| Booth Size | 20 × 20 × 8 | W × D × H in feet | Typical booth footprint |
| Booth Weight | 6,200 | Lbs | Typical booth weight loading |

The seats (e.g., seats of FIGS. 10, 11, or others described or illustrated herein) used in the theater seating arrangements have a minimum width of, for example, at least 23 inches, although the recommended width is 25 inches (the minimum width may be 25 or approximately 25 inches or more). Preferably, the seat height shall be less than 44 inches, but may be, for example, less than 44 inches, or is approximately 44 inches or less. The distance between the armrests are preferably greater than 21 inches in order to comfortably accommodate theater patrons of average size.

With respect to the screen 10.12, there is no absolute screen size limitation. A screen will be proportioned so that it meets the specifications of the particular auditorium in which it will be installed. One of the limiting specifications regarding the screen size is the target screen gain. Gain is a property of a projection screen, defined by how much brightness is visible from the screen's center when the viewer is looking at that point on axis to the center. For example, a gain of 1.0 means the amount of light that is projected on the screen returns to the viewer at the same brightness: none is absorbed and all is reradiated with perfect uniformity from all viewing angles. Such ideals may be strived for, and while it is known that ideality is not achieved, the gain, a screen (with >1.0 gain) will focus the light toward the center and way from the walls. The ideal or preferred range to target for screen gain is 1.8-2.4 provided that it meets speckle and half gain viewing angle specifications. For screens without physical speckle mitigation, the screen gain will be (or approximately in the range of) 1.0-1.4 in order to provide acceptable performance. The theater seating arrangement design as disclosed in FIGS. 11-12 (2-3) favors a maximum screen size of 70 feet with a 1.8 gain screen, however, larger screens can be utilized if there is a higher gain screen or if additional projectors are used, or if higher power (higher brightness) projectors (e.g., the Dolby-Christie, Dolby Vision enabled laser projector) are utilized.

Screen curvature assists in providing uniformity of illumination and focus and is used to create a more immersive experience. The curvature of the screen in the present design should be approximately 20:1 width to depth. However, the screen curvature is dependent upon the throw ratio and seat geometry. The minimum half gain viewing angle should be 30 degrees although 40 or more degrees is preferred. With respect to the materials of the screen, the perimeter of the screen is formed of a material that reduces light reflectivity. The screen itself should be a high quality white screen (which includes polarization preserving "silver" screens) in order to provide quality reflections, maintain brightness, reduce ghosting, etc., particularly on high brightness 3D projections. Like the seating designs, the various screen designs or features may be utilized in any of the theater designs, including theaters having any of the theater entrances and related features, discussed herein.

Preferably, the aspect ratio of the screen is 1.85-1 or Flat. Projector heads for 2-dimensional (2D) or 3-dimensional (3D) will require precise alignment across the entire screen.

Anamorphic lenses are not preferable as it would require Duo Mirror system mounts where each anaphoric lens would attach. The use of the Duo Mirror system for alignment will restrict the throw ratio to a minimum of 1.2:1. However, there will not be a need to adjust the zoom between Scope and Flat presentations; this results in reducing operational complexities. The screen will appear to be "floating" without any physical masking. Flat aspect screens allow flat and scope presentations to fill the entire screen so that it fills the auditorium wall-to-wall. With respect to scope presentations, there will not be a need for any physical masking.

Physical top/bottom masking is required for scope aspect ratio images projected onto on a flat aspect ratio screen, except in the present invention where projectors with very high contrast may be utilized. The masking becomes unnecessary because the contrast ratio is high enough that the unmasked areas of the screen, and for which the projected image is black, does not result in banding or bars about the images that are annoying to patrons/viewers. One commercially available cinema projector is capable of such contrast ratios, namely the Dolby-Christie dual modulation laser projection system (preferably Dolby Vision enabled). Preferably, content to be projected is Dolby-Vision encoded which allows the theater presentation to take full advantage of the projector's capabilities. The contrast ration is approximately 1,000,000:1 in typical cinematic scenes. The most significant degradation of the contrast ratio is reflections from patrons in the theater back to the screen and is something that should be limited if possible. However with a flat screen horizontal masking is not required. In the various embodiments of the present invention, absent other factors that might require a scope or other aspect ratio screen, flat aspect ratio screens are preferred.

Figure 18:
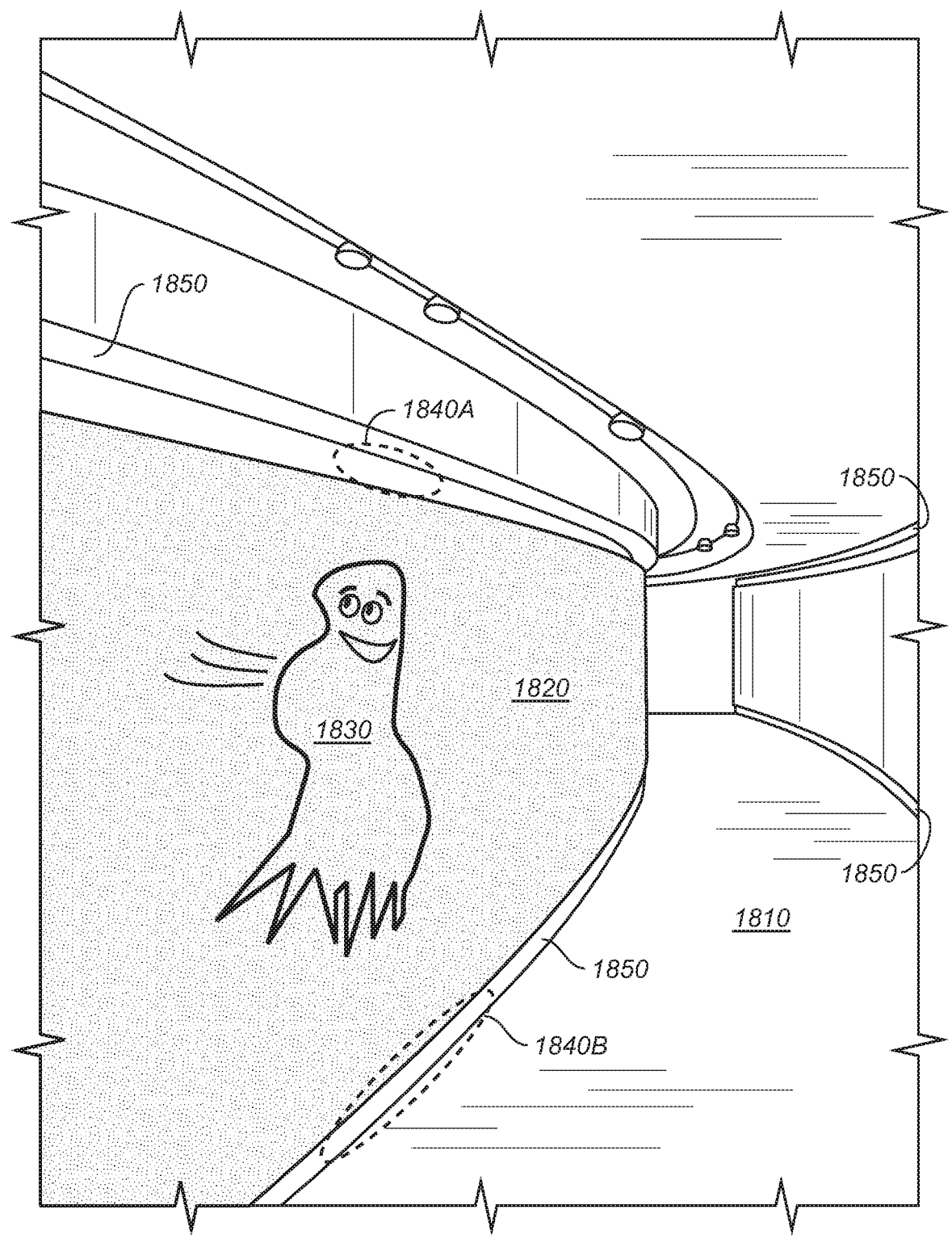
FIG. 18 is a drawing illustrating an example theater entrance video wall and example presentation related video thereon, highlighting matching a motif of the theater, and an example of changing highlighting related to motion on the video wall.

As described elsewhere herein, a theater according to various embodiments of the present invention includes consistent highlighting that may vary according to a motif of a theater and/or a movie or other presentation to be shown in the auditorium/main screening area of the theater. For example, consider a movie house presenting a screening of a movie called "Crazy Ghost" (e.g., see FIGS. 18-20) where the crazy ghost has a white-purplish-green appearance and the theater has a highlighting motif that is, for example, blue (e.g., the theater highlighting at foot and head levels (and/or around the screen, at handrails, etc., for example). The crazy ghost 1830 appears on video wall 1820 at an entrance of the theater and upon entrance of a patron to a walkway 1810. Both the crazy ghost 1820 and sound associated with the crazy ghost (and special ghost highlighting which is turned/ turned on at locations corresponding to the ghost, e.g., 1840A/B) move down the video wall and walkway together (e.g., down a corridor including the video wall). The theater includes a blue highlighting motif (e.g., 1850), including, for example, head and foot lighting highlighting above and below the video wall 1820. At locations corresponding to the crazy ghost's locations however, the theater motif is changed from the standard blue motif to the crazy ghosts trademark colors of a white-purplish-green, and then back to the standard blue motif as the ghost exits that location (e.g., see turned highlighting 1840A and 1840B). The turned highlighting can cover different amounts of space (length in this example) which shows an example of how the highlighting is programmed to match content displayed on the video wall. In this example, the foot lighting that is turned is larger than the head lighting that is turned because the crazy ghost 1830 being displayed is larger near the foot highlighting (see 1840B) compared to at the head highlighting.

Figure 19:
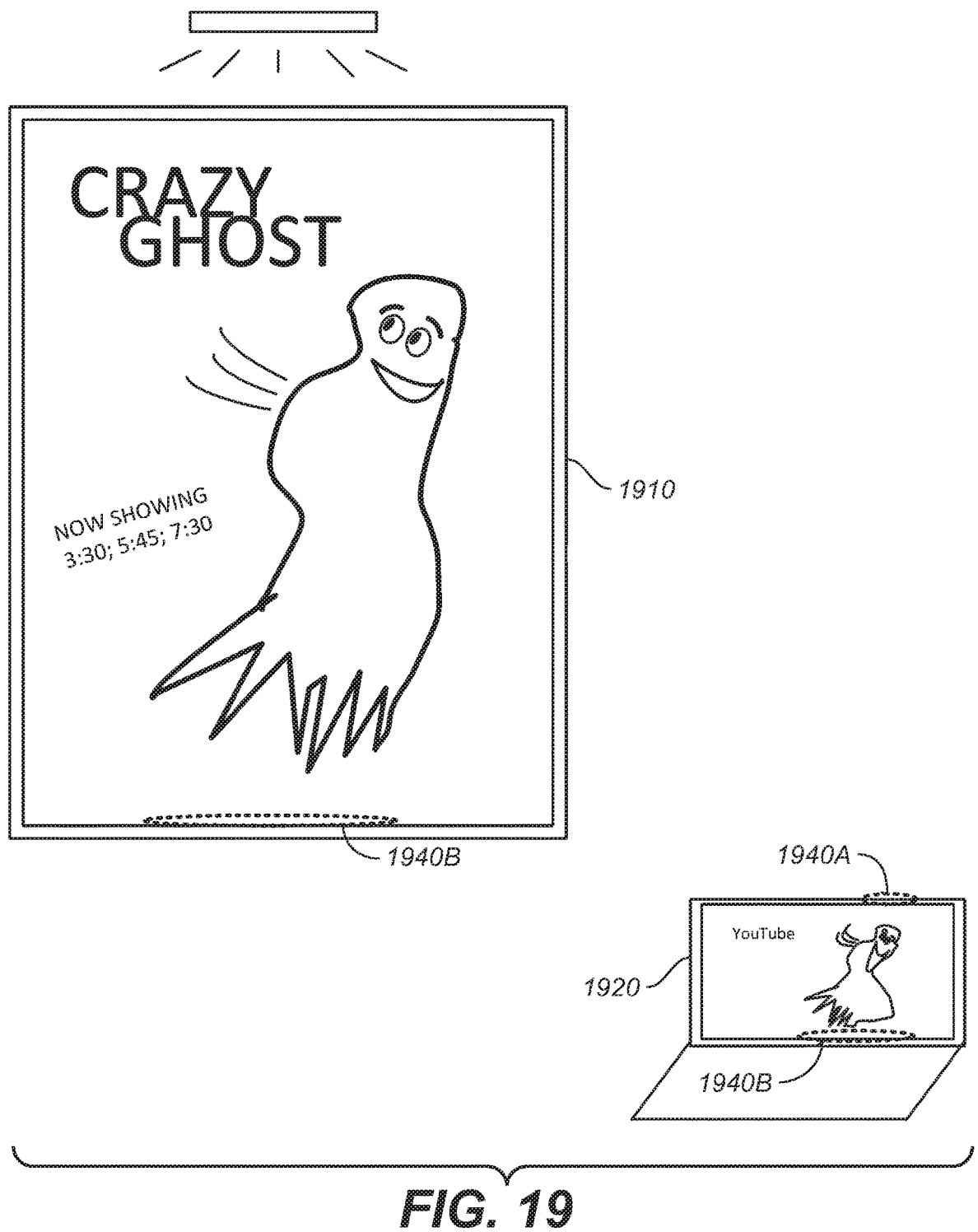
FIG. 19 is a drawing of various promotional materials include trailer 9on You Tube, movie poster, and application, each having a similar theme related to the movie "Crazy Ghost;"

In one embodiment, the present invention comprises "moving" audio synchronized with a video further synchronized with highlighting, synchronized individually to each other or together as a group. As shown in FIG. 19, this type of theme (and associated highlighting e.g., 1940A/B) may be carried out in movie trailers broadcast on television or streamed (e.g. YouTube) and fixed images (e.g., posters 1910) promoting the film. When the theme is extended to the exterior of the theater premises or even beyond the premises of the theater (leading patrons to the theater), the theme is very recognizable.

Although the present invention is described herein mainly with reference to theater operations in, for example, a movie theater setting, the devices and processes of the present invention may be applied to other settings and venues such as, for example, convention halls, sporting events, concert venues, television, streaming, cable, mobile device apps, meeting houses, trade shows, casinos, water parks, theme parks, laser tag, climbing walls, amusement parks, and other public and private venues of any type.

Inside the auditorium or main area of the theater, seating is arranged for optimal viewing angles and unobstructed views. The seating arrangements described may be utilized with any of the entrance or video wall designs described or otherwise illustrated herein. Lighting highlighting the entrance way and/or video wall, is preferably consistent throughout the entrance and theater and is illustrated, for example in various of drawings provided herein. Highlighting starts, for example, at the entrance and moves into the main theater area and also surrounding (highlighting) the main screen where the feature presentation will, for example, be shown. Entrance and walkway highlighting is, for example, recessed lighting, and the highlighting of the screen is, for example around/behind the screen (e.g., with the screen hung out from the front wall of the main theater area).

Figure 20:
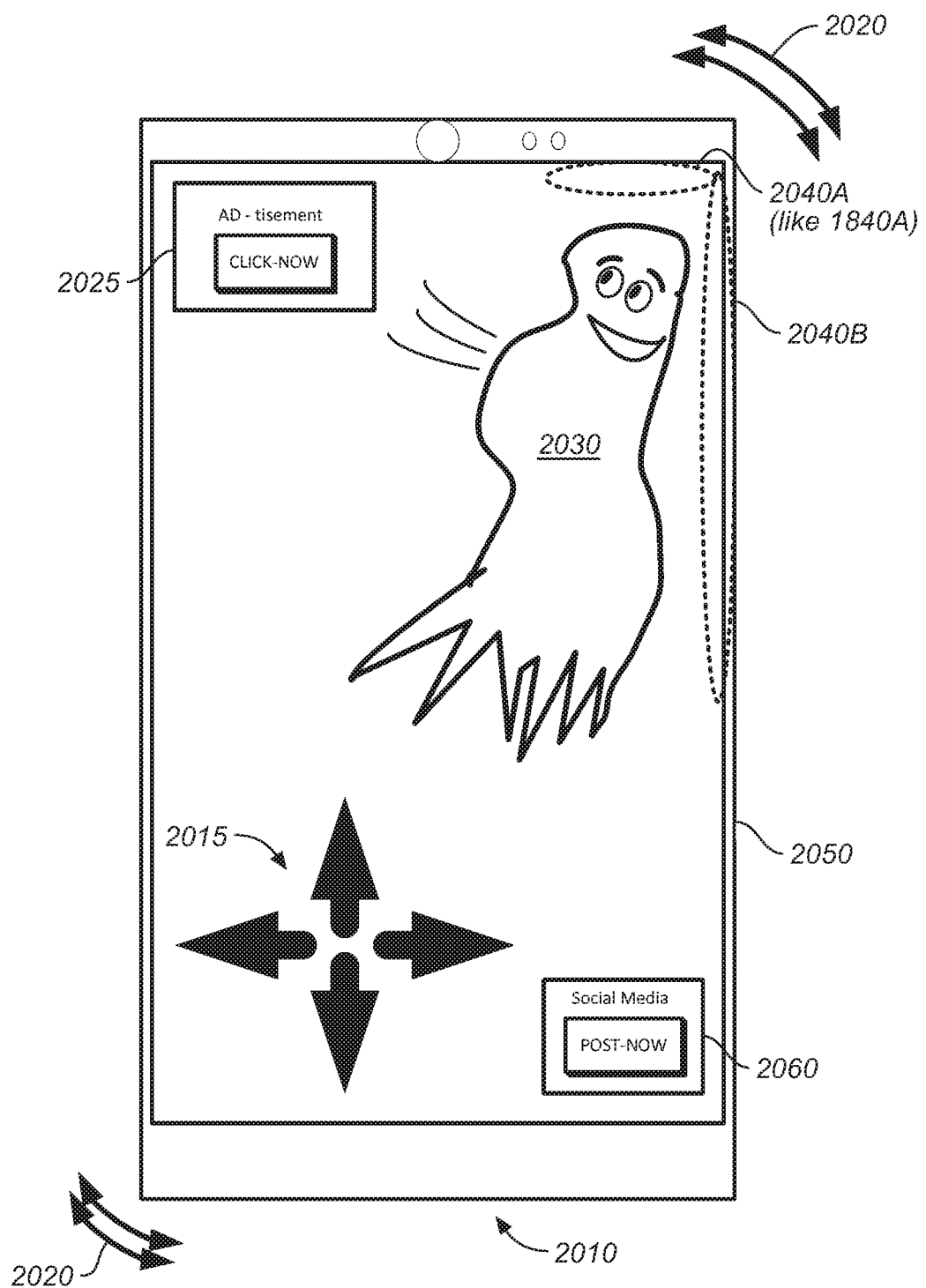
FIG. 20 is an illustration of a app using up/down left/right controls for interacting with a video wall according to an example embodiment of the present invention (such interactions may also include video and be realized (or supplemented) via any of orientation and/or inertial sensors.
Figure 21:
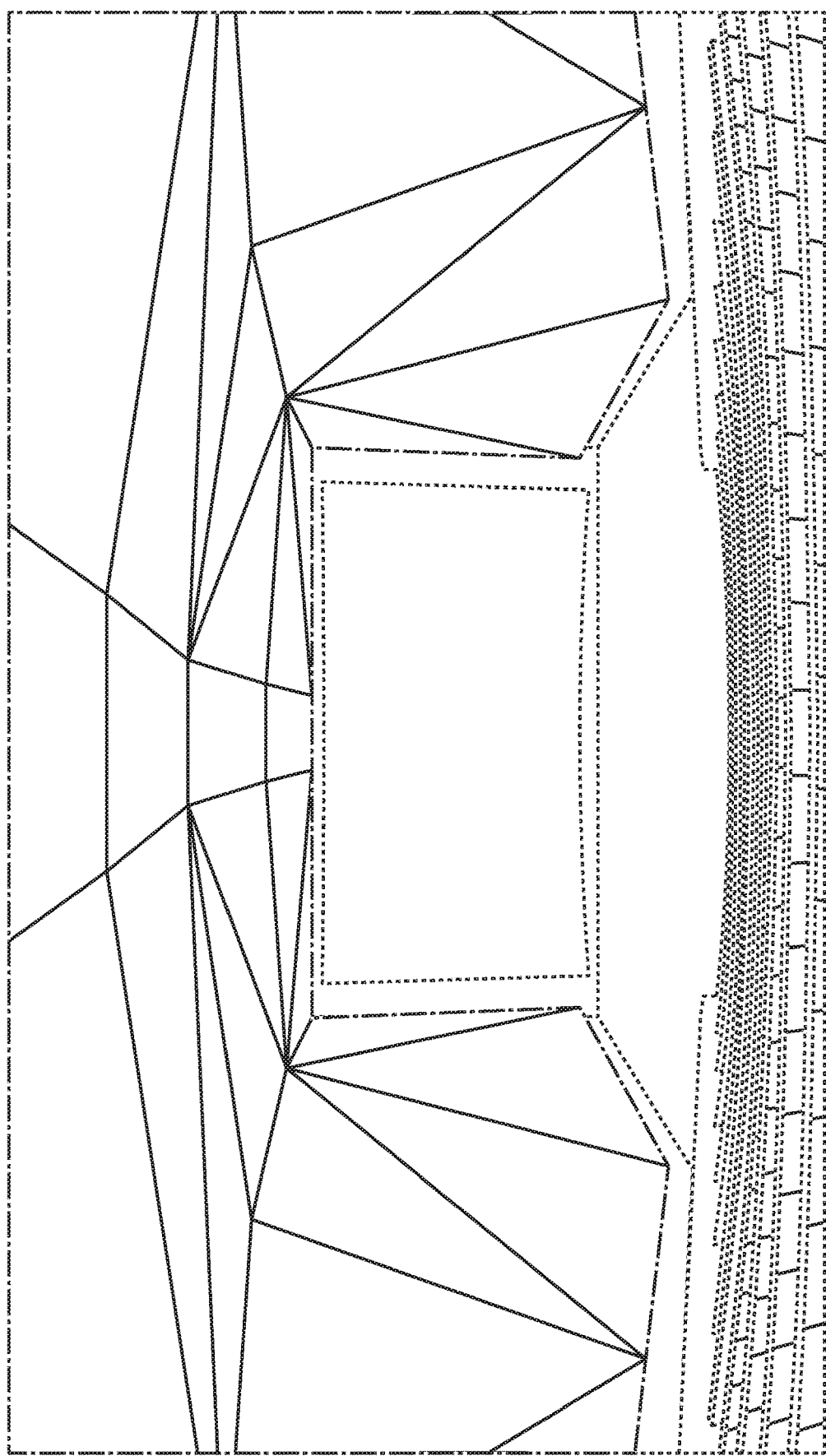
FIG. 21 is a front perspective view of a theater showing a design.
Figure 22:
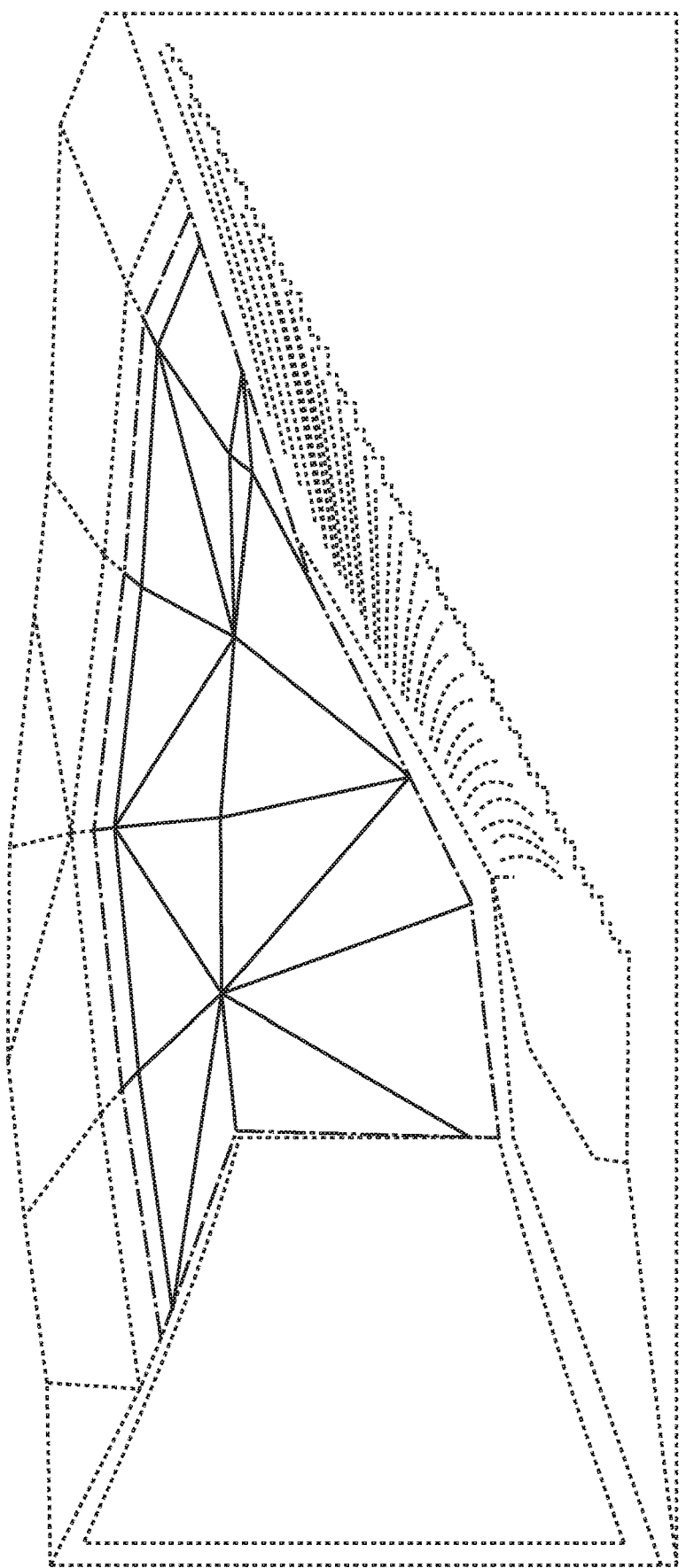
FIG. 22 is a side perspective view thereof, the opposite side perspective view being a mirror image thereof.
Figure 23:
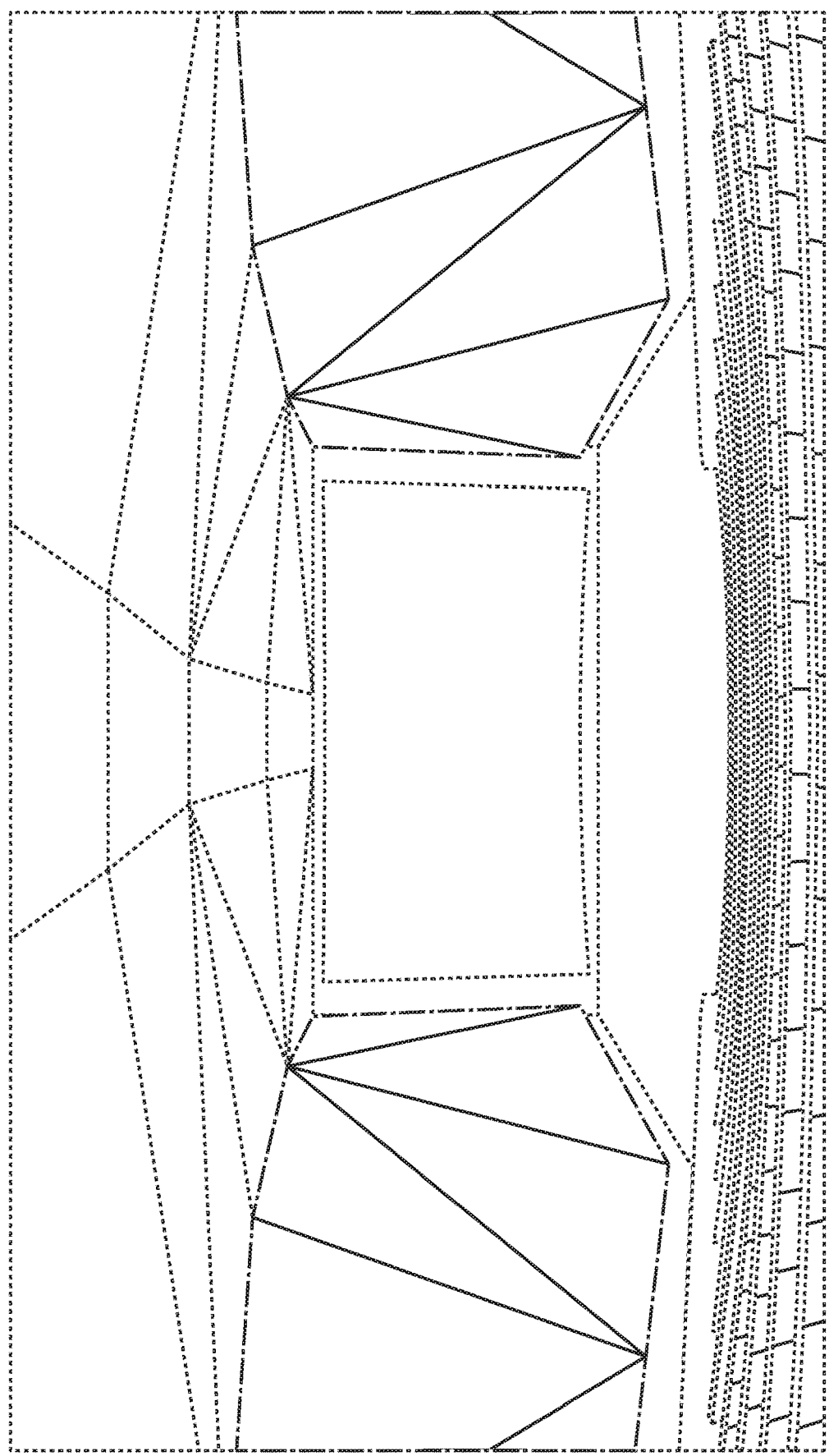
FIG. 23 is a front perspective view of a second embodiment thereof.
Figure 24:
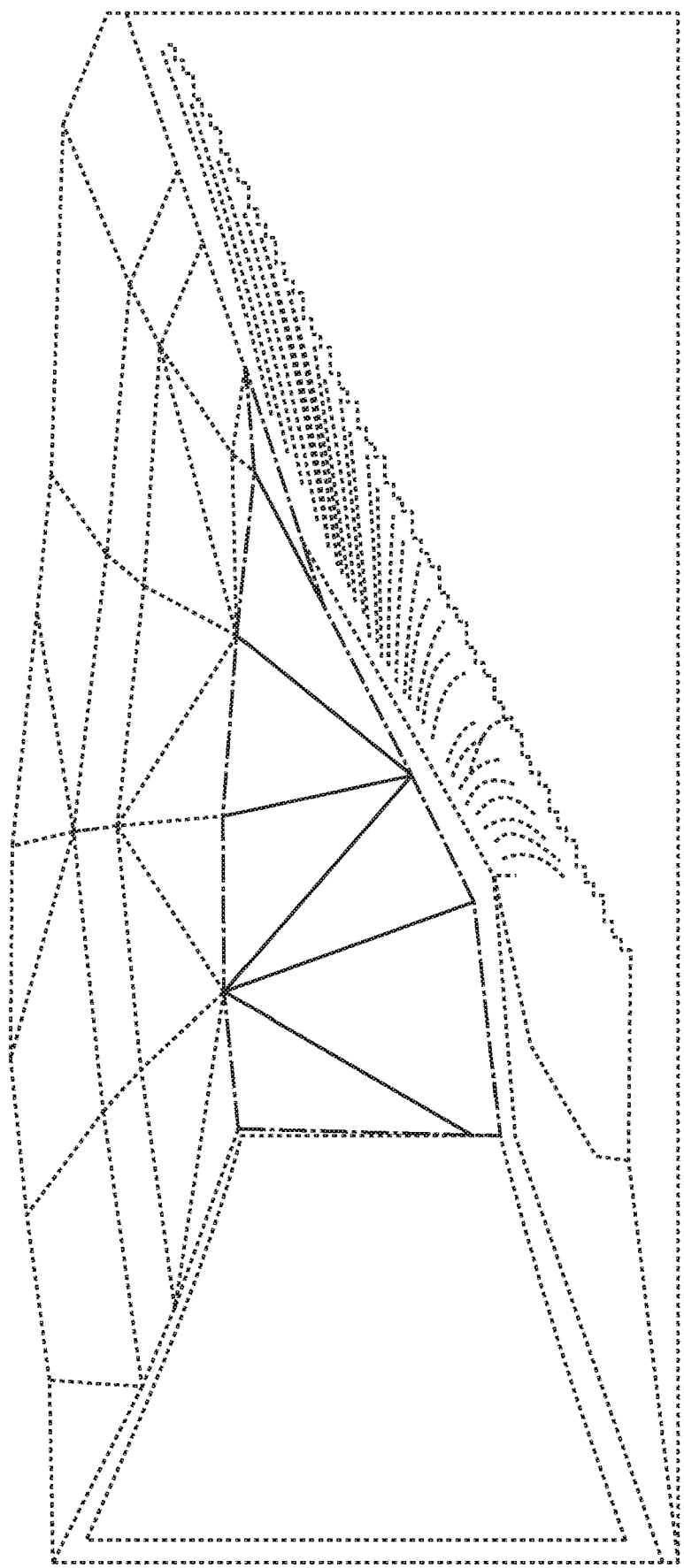
FIG. 24 is a side perspective view thereof, the opposite side perspective view being a mirror image thereof.
Figure 25:
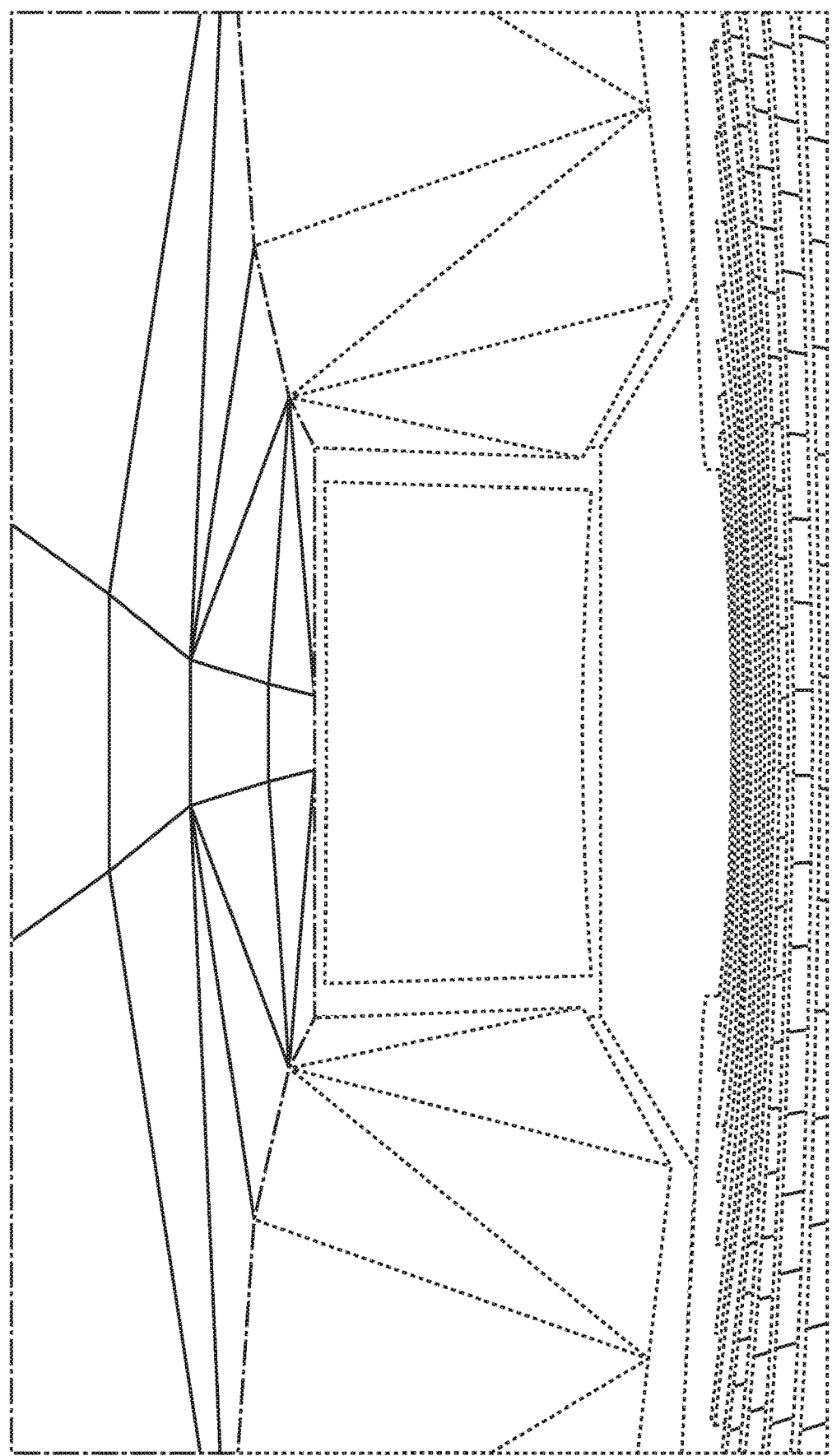
FIG. 25 is a front perspective view of a third embodiment thereof.
Figure 26:
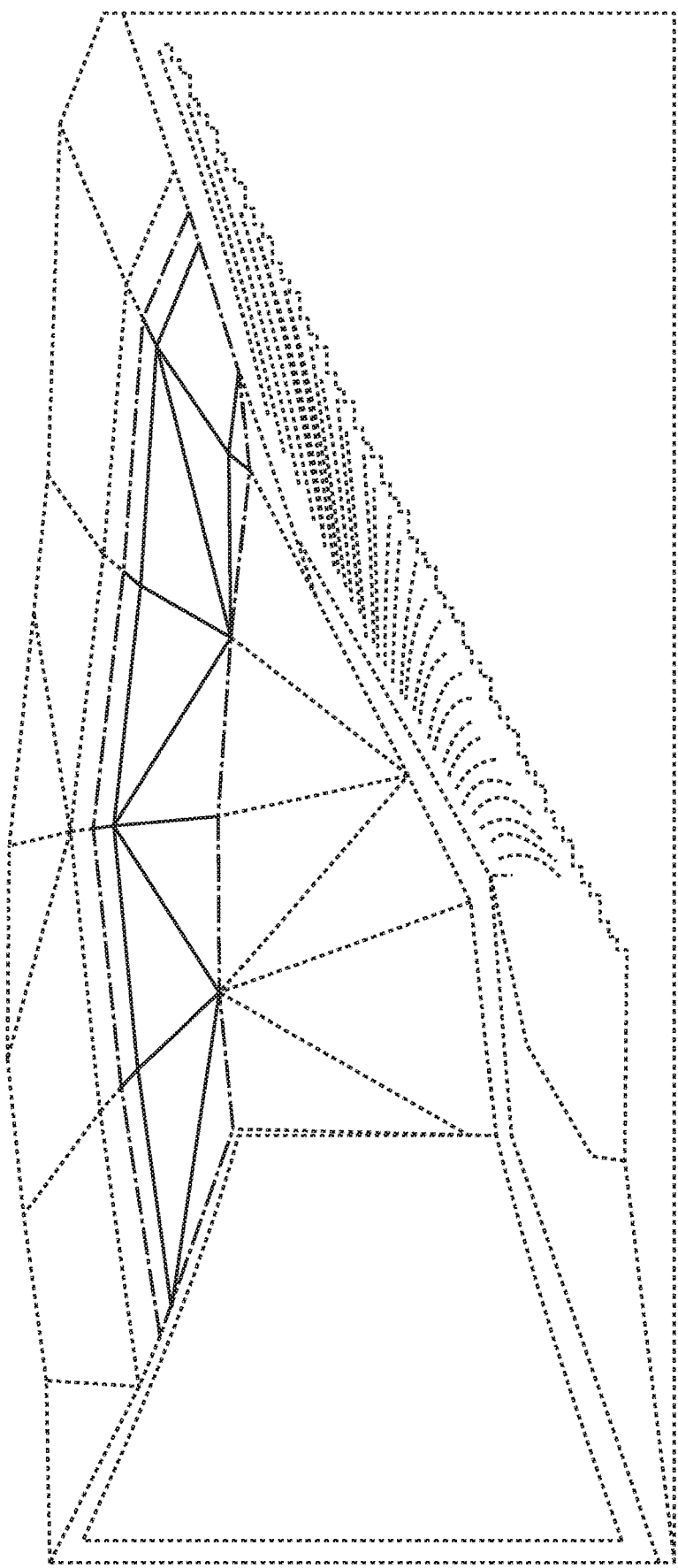
FIG. 26 is a side perspective view thereof, the opposite side perspective view being a mirror image thereof.
Figure 27:
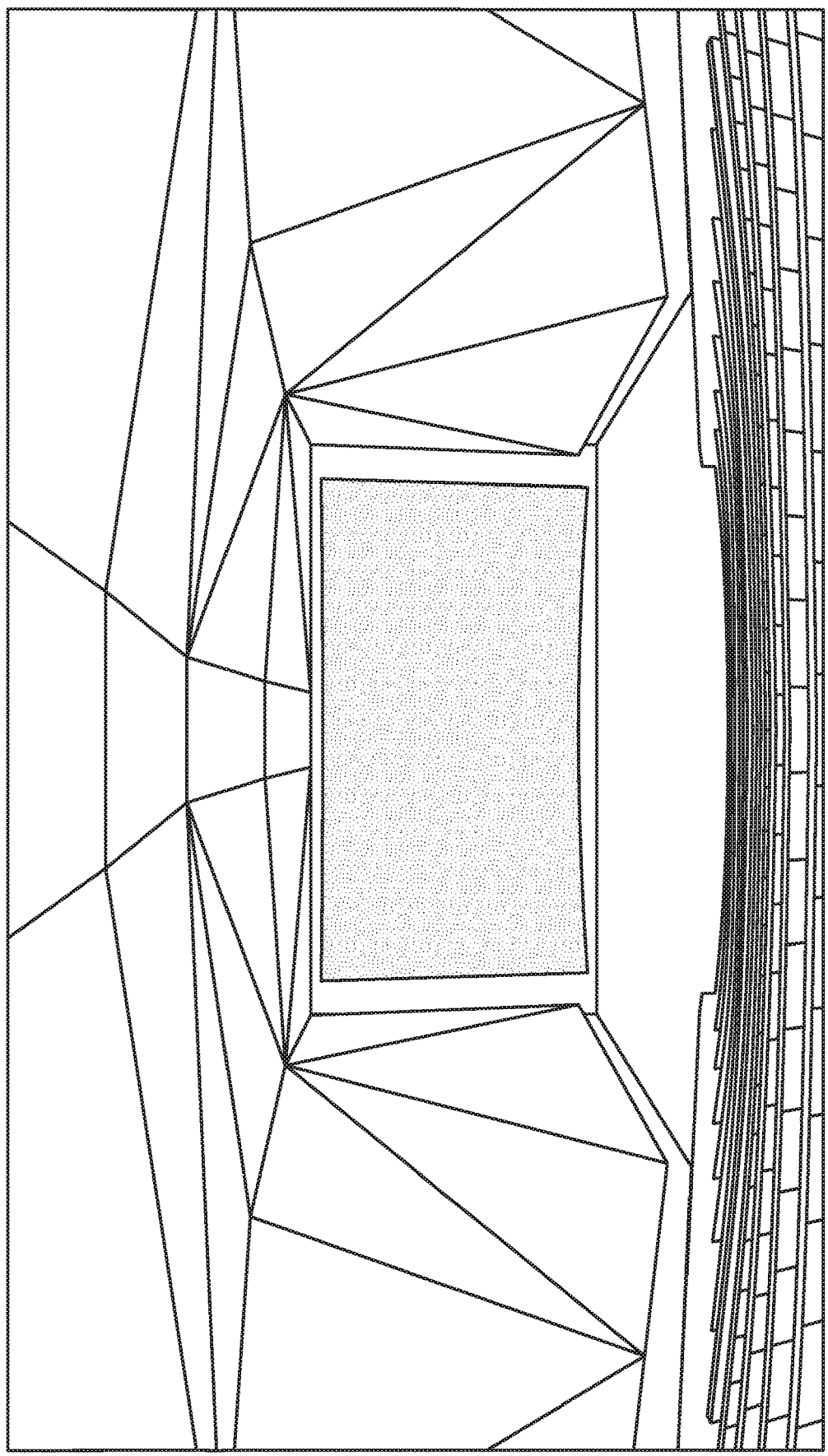
FIG. 27 is a digital image corresponding to FIG. 21 illustrating an illuminated screen and highlighting turned off.
Figure 28:
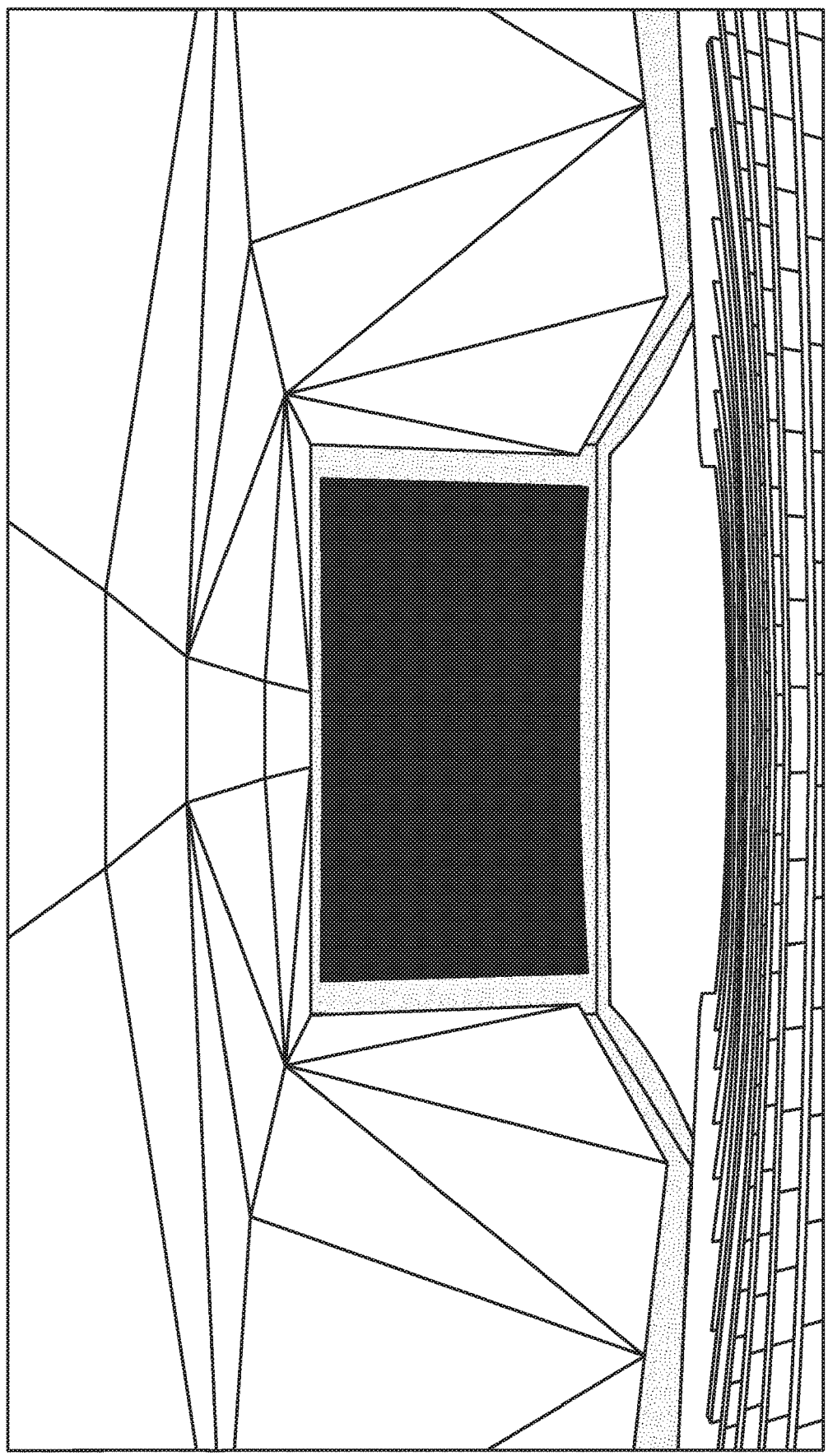
Figure 29:
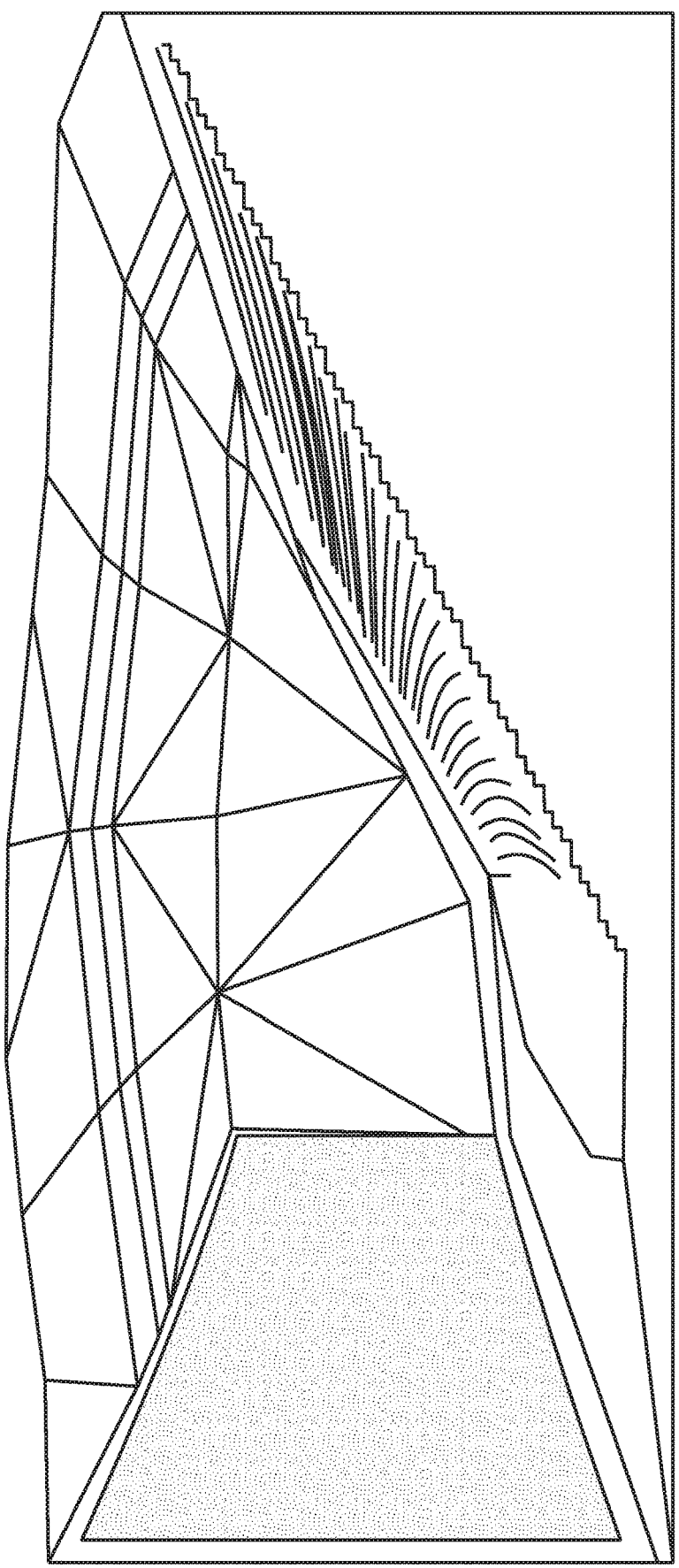
FIG. 29 is a digital image corresponding to FIG. 22 illustrating an illuminated screen and highlighting turned off.
Figure 30:
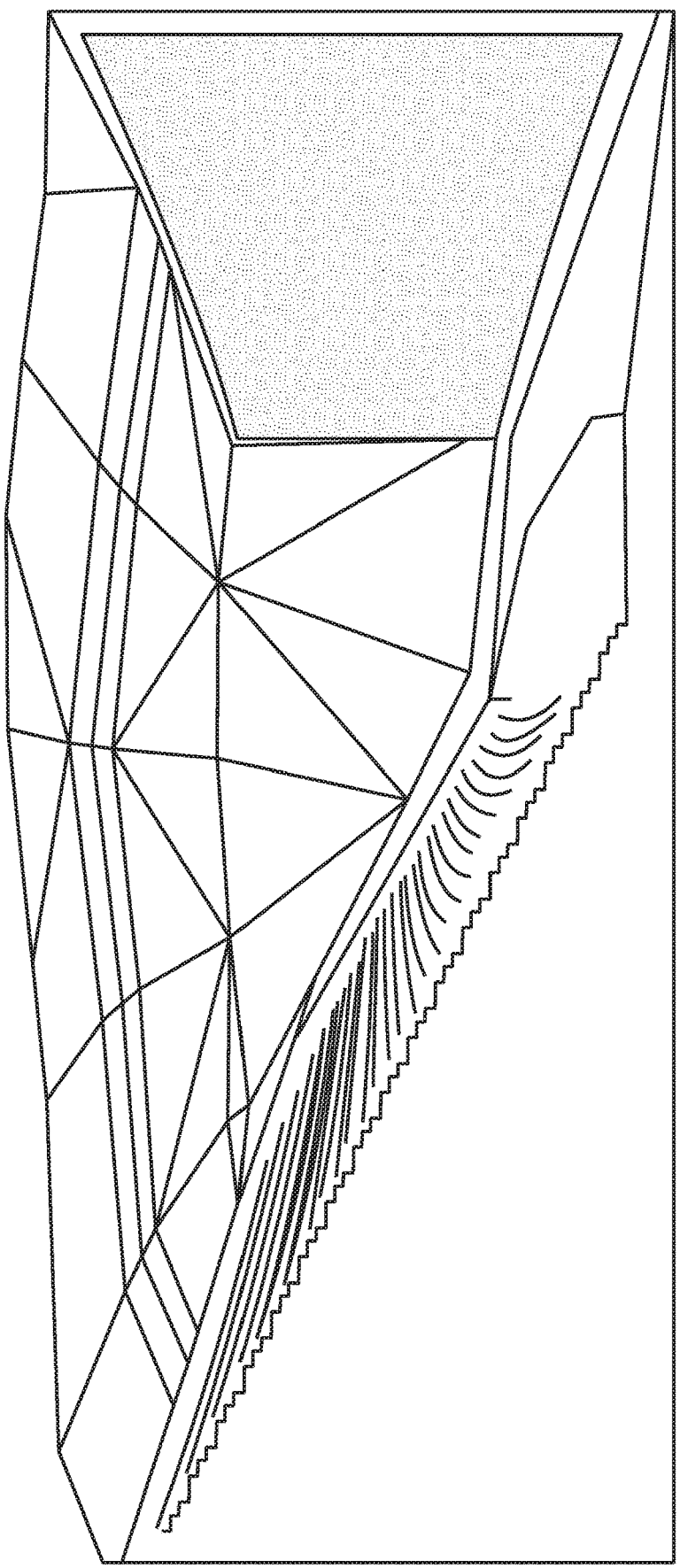
FIG. 30 is a digital image corresponding to an opposite side mirror image illustrating an illuminated screen with highlighting turned off.
Figure 31:
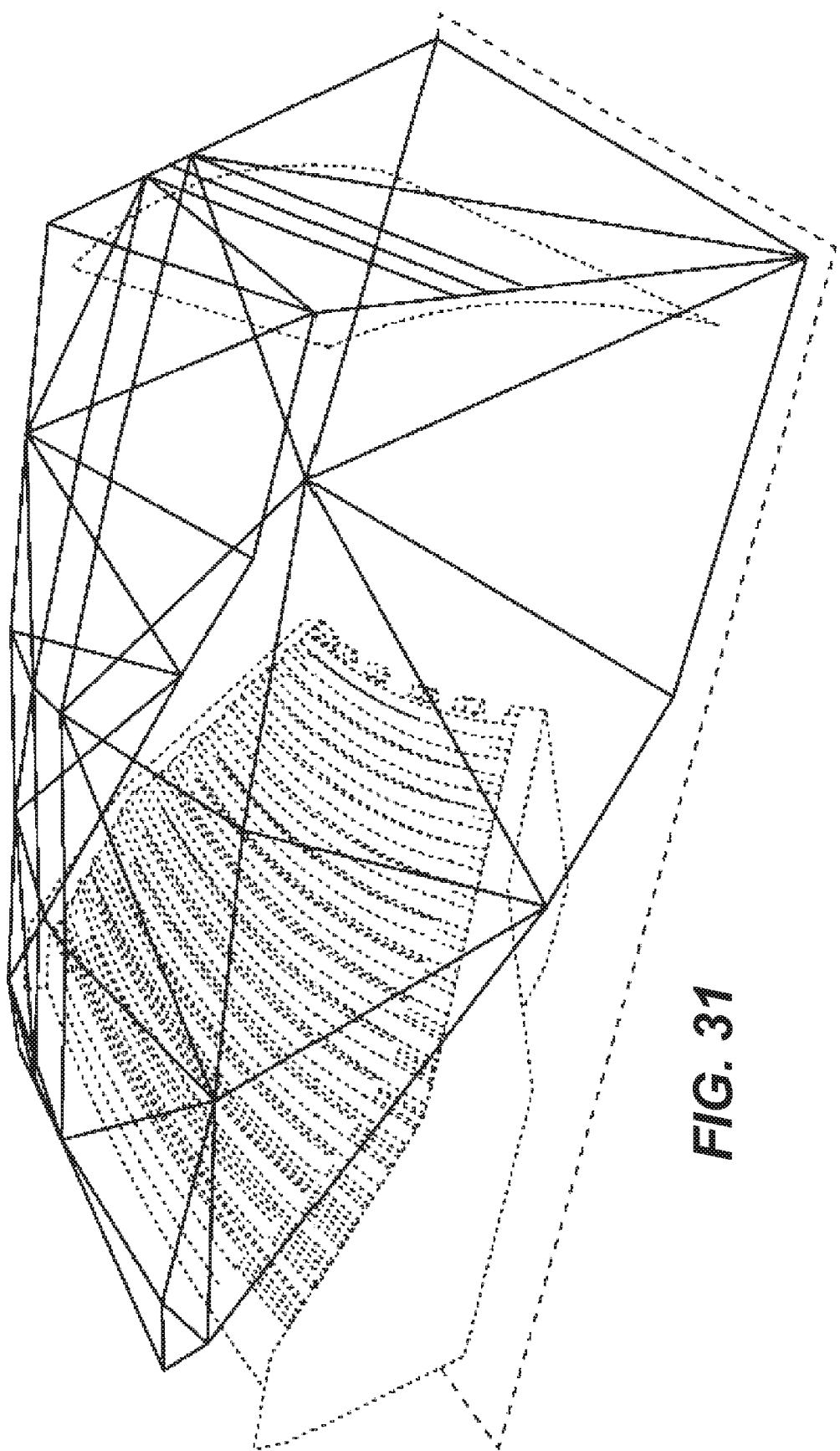
FIG. 31 is a perspective view showing panels "capping" a theater seating area.
Figure 32:
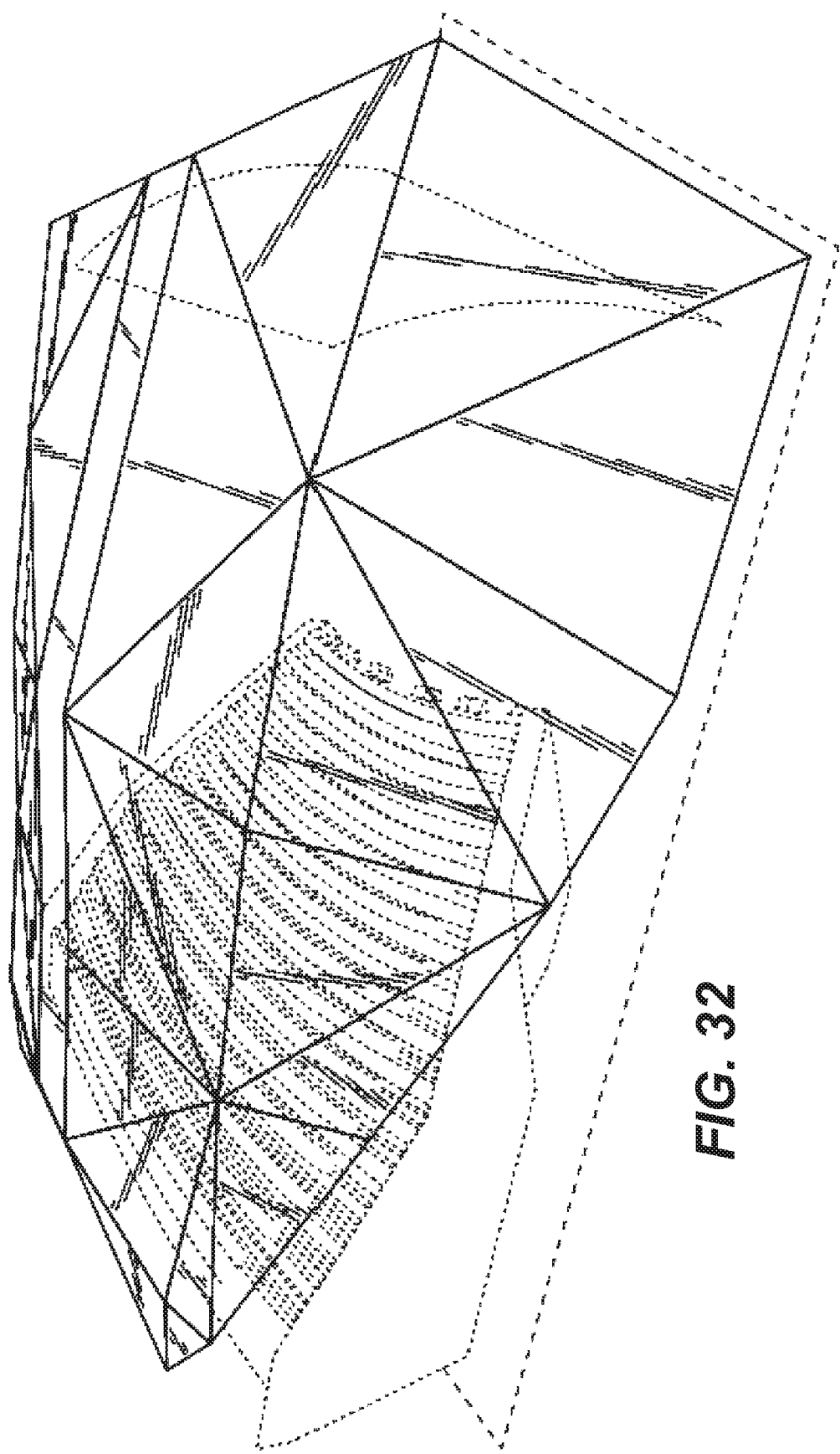
FIG. 32 is a perspective view illustrating panels over a theater seating area.
Figure 33:
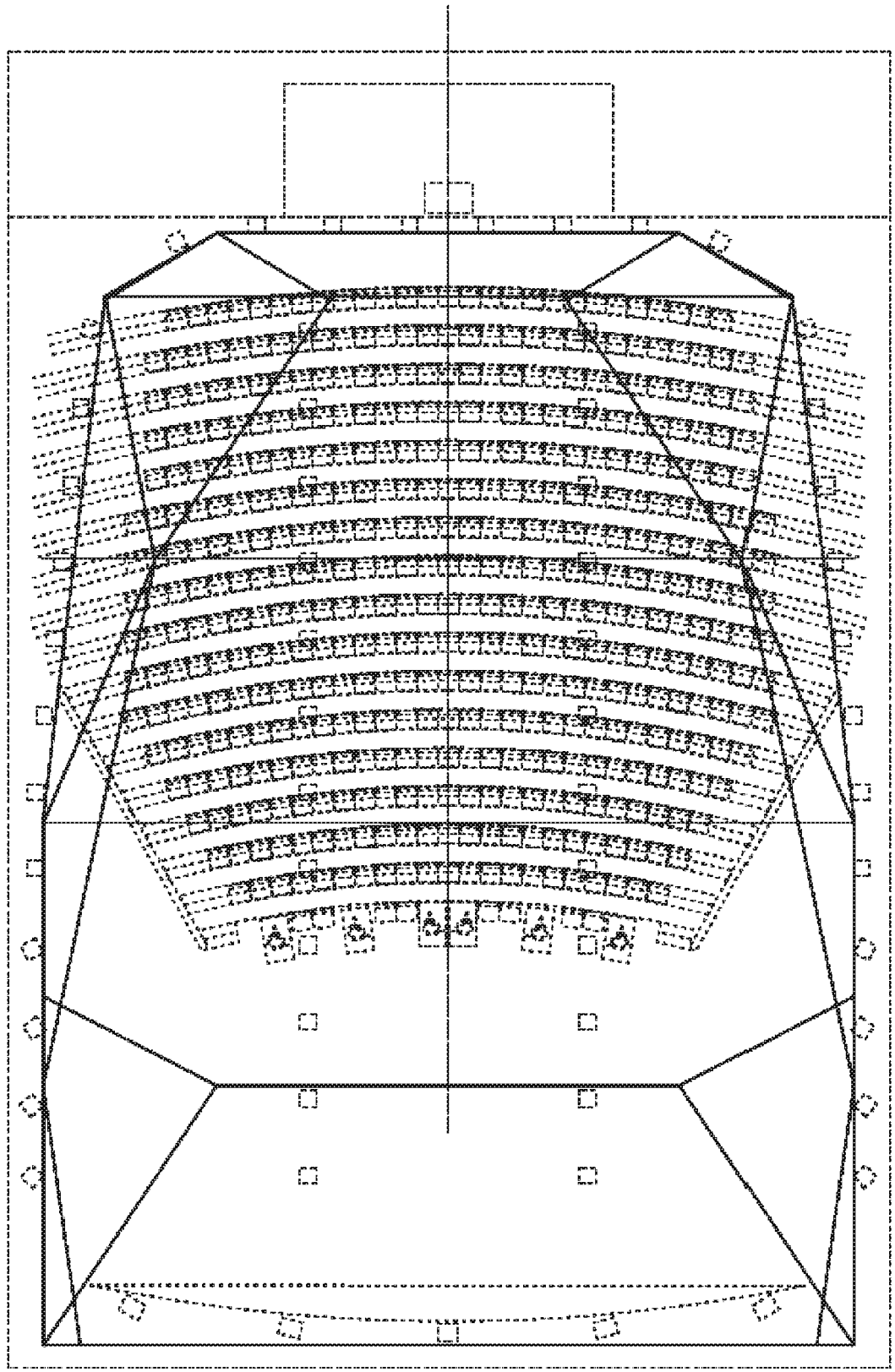
FIG. 33 is a top view illustrating panels "capping" a theater seating area and placement of overhead and side overhead speaker arrays.
Figure 34:
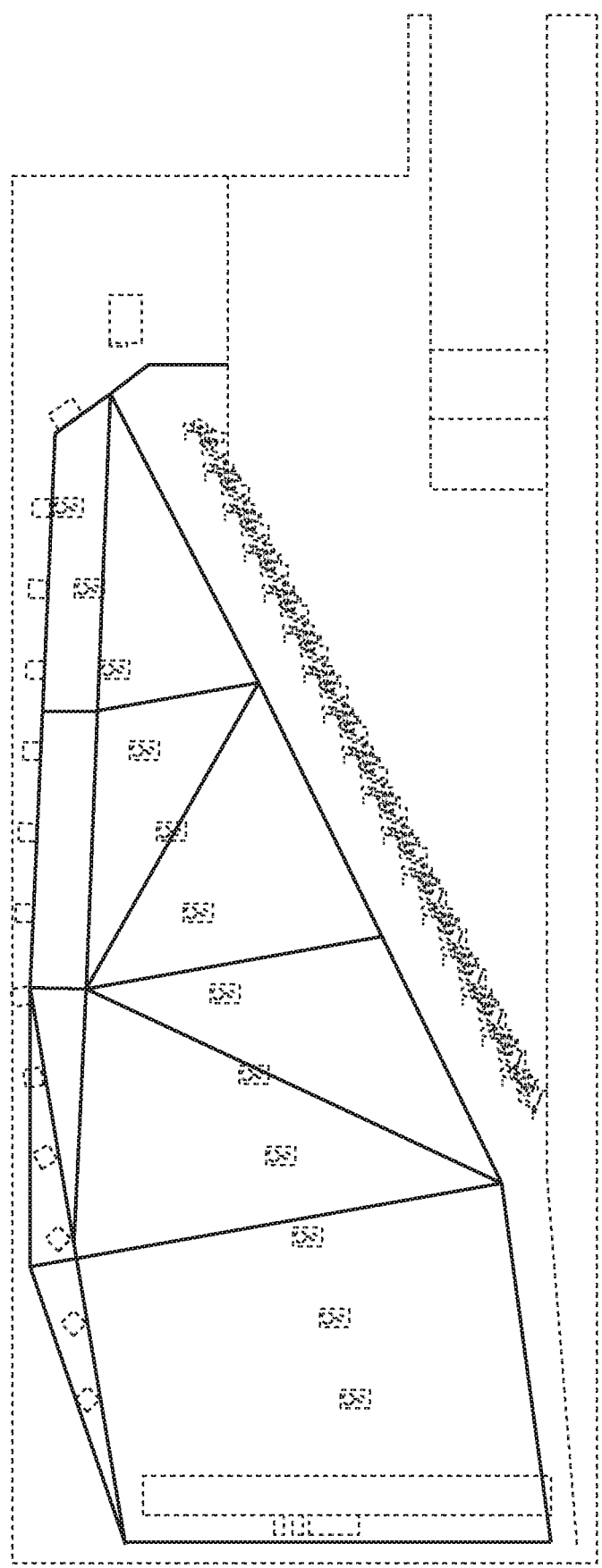
FIG. 34 is a side view illustrating panels "capping" a theater seating area and placement of speakers.

In one embodiment, the present invention includes the use of an application (app, for example, as shown in FIG. 20, mobile app 2050) running on a patrons mobile device 2010. The app is, for example, synchronized to the patron's location and the show to be viewed. The app may be synchronized to the video wall (e.g., 1820), and/or sound objects, and/or the user's (patron's) location (e.g., via GPS in the user's mobile device 2010). The app provides, for example, written explanations, or supplemental material to the read or viewed as the patron proceeds along the walkway.

In one embodiment, in a movie having an automobile feature or theme, as a car on the video wall roars past a user, the app can display "1963 Corvette Stingray" to identify the make and model of the car that just zoomed by. Such notifications on the patron's mobile device may include advertising such as "Joe's Chevrolet, 3 blocks away." Revenue for the venue or its licensor may be generated for each ad shown and/or click-trough's associated with the ad.

In one embodiment, the app may include feedback sent back to the video wall (or rather to a controller controlling the video wall, e.g., video wall server) that affects the video being displayed (or sound emanating from, for example, speakers that may be hidden from view). In one embodiment, a mobile app includes positional related data as feedback to the server. For example, in one embodiment the app may include, for example, a steering wheel that is oriented according to inertial data from movement of the mobile device (e.g., left and right turning of the mobile device or steering wheel) that is fed back to the video wall server and translates to corresponding changes in direction or route of, for example, a car, boat, plane, rocket, or other vehicle on the video wall. In one embodiment, such changes in route or direction are, for example, limited to route changes ultimately guiding a patron down the walkway to the main attraction. In one embodiment, although the route changes, the scene also rotates keeping the user on track down the walkway to the main attraction.

In one embodiment, the video wall and app interaction take the form of a game played on the video wall and controlled by the mobile device and application. Points or other accomplishments awarded or earned while playing the game may be automatically posted or updated on Facebook or other social media. Such games may include time limited functions and scene changes such that a patron/user/game player needs to traverse the hallway or other walkway or loose points or otherwise end the game. This is intended to keep the patron moving forward toward the main screening room or auditorium. In one embodiment, the timing of such movement, or the existence of the game at all, may be prefaced on sensors that indicate a number of patrons traversing the wall and/or an amount of time before the main show attraction begins (e.g., near show time or more crowded may amount to less gaming time). The hall or corridor may include connect-like video cameras that detect patron action as input to the game and capture "replay footage" that may be an option or automatically included in the patron's social media posts (e.g., after the video wall connects to the patron's mobile device).

In one embodiment, the highlighting is also programmed to operate in synchronicity with the game being played. In one embodiment, a main motion of the video wall is toward the main screening area, and motion of the highlighting may highlight contra-motion (such as enemy fire directed at the gamer or object on the video wall).

Preferably, such programming and game playing is in a motif or otherwise associated with the main attraction, building the ambience and anticipation of the movie or other event scheduled in the main screening area.

FIG. 20 illustrates another embodiment related to the Crazy Ghost example. The users mobile device controls motion of the Crazy ghost via, for example, inertial movement 2020 which tend to move the ghost in the direction the device is rotated. Such inertial movements may include rotating, up/down, forward and back (e.g., in and out of the page of FIG. 20). Alternatively a set of directional keys 2015 are provided. Advertising with click-through 2025 may be provided, preferably related to the theme of the movie. Highlighting 2040A and 2040B around edges of the mobile device display can, similar to the video wall, provide Crazy Ghost (movie motif) along with theater motif in other areas around the display of the app (not shown). In one embodiment, the present invention includes tying a video wall display at a theater (or other establishment entrance) to an app on a patron's mobile device. Variations on that theme including game play (exhibited in whole or in part on the video wall and/or mobile device, and preferably a combination of the video wall and mobile device.

A post to social media button may also be provided and may include a pull down selection of quick posts or simply pass through to a user's account for a more detailed personalized post. The social media click through is set-up to post directly to a user's pre-selected social media account (or accounts) that may be set-up in the app. Such post may include, excellent movie!; Wowed by this incredible theater!, Earned 12,000 points on the ghost board before movie and scored a free drink!, etc. Such posts may be set up to earn discounts on movie related items (tickets, souvenirs, etc.) or free food/beverages at the theater.

In several examples, combinations of concepts may be claimed according to any of the above. Example enumerated embodiments are now described:

1. A cinema venue, comprising:
an auditorium comprising large format screen, a projection booth, and stadium style seating;
an entrance area comprising a narrow corridor walkway leading from an entrance hall, entrance corridor, or lobby of the venue to the auditorium;
wherein the narrow corridor walkway is curved such that a patron entering the auditorium traverses a portion of a circular like path from the entrance hall or the like to the auditorium.

1A. Wherein the narrow corridor walkway comprises a smoothly curved wall.

1B. Wherein the narrow corridor walkway comprises a smoothly curved wall on both sides of the narrow walkway.

At least one of the smoothly curved walls may comprise lighting providing highlighting of a structure of the corridor. The auditorium may comprise lighting providing highlighting of structures of the auditorium. The auditorium structure highlighting may comprise a uniform and continual highlighting of a walkway from the narrow corridor, along at least one side of an interior of the auditorium, to the large format screen. The lighting and highlighting of the smoothly curved walls may match the auditorium highlighting.

The highlighting is configured to lead the patron from the entrance, through the narrow corridor, down the auditorium walkway, and to the screen. The smoothly curved walls lead, for example, to a back area of the auditorium comprising a second curved area leading to the auditorium walkway.

The lighting and highlighting may comprise, for example, foot area highlighting near floor level of the smoothly curved walls and auditorium walkway. The lighting and highlighting may comprise foot area highlighting near floor level of the smoothly curved walls and auditorium walkway.

A brightness of the lighting and highlighting may vary in different locations within the venue. Such variation may be based on metadata or instructions provided with content displayed within the walkway or other locations of the venue.

The lighting and highlighting within the auditorium may comprise a continuous loop of highlighting from and around the screen, along the walkways, and across a back of the theater. The lighting and highlighting within the auditorium may comprise a continuous loop of highlighting from and around the screen, along the walkways, and across a back of the theater and adjacent to the smoothly curved walls such that a patron naturally follows through the area of the curved walls onto the walkway, into the theater/auditorium and toward the screen into the area comprising stadium seating. The lighting and highlighting may be connected to highlighting leading patrons to the auditorium.

In one embodiment, at least one of the curved walls may be configured to display images.

At least one of the curved walls may be configured to display images in a continuous manner such that the images bend until out of sight due to a curvature of the wall. The images and the wall comprise a video wall. The images may, for example, comprise images related to a motion picture to be exhibited in the auditorium and on the screen.

The images may comprise images corresponding to at least one of a scene, characters, environment, location, or setting of a motion picture to be exhibited in the auditorium.

The images may comprise images of a setting of a motion picture to be exhibited in the auditorium. The images may comprise a video, or an interactive video linked to a mobile app or other patron device. The images may comprise a video related to a motion picture to be exhibited in the auditorium.

The stadium seating may comprise, for example, a plurality of rows of seating each elevated over rows closer to the screen and wherein each row is curved and subsequent rows further from the screen have more seats that a prior row.

2. A cinema complex, comprising:

a theater comprising a screen for displaying motion pictures;

an entrance to the theater comprising a walkway from a rear of the theater to a front seating row; and continuous highlighting from the rear of the theater along the walkway and to the screen.

Wherein any one or more of:
the highlighting surrounds the screen;
the highlighting extends in a loop around a back of the theater;
the highlighting comprises foot level lighting illuminating the walkway;
the highlighting comprises above eye level wall lighting; and the highlight lighting is projected from and in a recessed contour above and below a wall and around the screen.

The entrance may comprise, for example, a continuously curved entrance corridor that extends from behind the theater to the theater entrance and walkway. The entrance may further comprise a curved video wall connected to the theater entrance and a hall entrance.

The hall entrance may be located, for example, adjacent to an apex of the curved video wall and connected to the theater entrance at an end of the curved wall. The video wall is configured, for example, to display images related to a motion picture to be exhibited at the theater. The displayed images may comprise, for example, a setting of the motion picture. The displayed images may comprise a video related to the motion picture to be exhibited.

3. A movie theater comprising a prelude space comprising a curved video wall configured to display images from or related to a motion picture to be exhibited at the theater, and wherein the prelude area comprises a walkway similarly curved as the video wall leading from an entrance of the prelude area to an exhibition area of the theater.

The prelude space (or area) may comprise recessed foot and overhead lighting and highlighting that leads through the prelude area to the exhibition area. The exhibition area may include recessed lighting and highlighting surrounding the exhibition area and matching the prelude area. The exhibition area may include recessed lighting and highlighting matching the prelude area lighting and highlighting, surrounding a screen in an exhibition and seating area of the theater, and surrounding the exhibition and seating area. The exhibition area lighting and highlighting comprises a continual loop around the exhibition area and around the screen. The curved video wall comprises overhead lighting and highlighting above the video wall and foot level lighting below the video wall.

In various embodiments, a pathway adjacent to the video wall is illuminated by matching recessed lighting above and below the video wall and on a wall opposing the video wall.

The prelude space may be connected to a hall via non-doored opening. The prelude space may, for example, exit to a walkway leading to and through an exhibition area of the theater including a motion picture screen and seating via a door. The curved video wall is, for example, curved sufficiently such that upon entrance to the prelude area the video wall vanishes (e.g., vanishes at a horizon of the video wall) due to curvature of the wall.

The video wall is set-up, for example, to display images related to a mood or setting of the motion picture to be exhibited at the theater. And, as noted above, the seating is arranged for optimal viewing angles and unobstructed views.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, as illustrated in the figures, a theater entrance and/or a video is illustrated have specific curvature(s), and, although the illustrated curvature(s) are deemed a best curvature for that design, variations of such curvatures are possible and likely based on the present disclosure and that any and all such variations would fall within the spirit and scope of the present invention unless specifically claimed otherwise. Furthermore, the inventors recognize that newly developed technologies not now known may be substituted for the described parts and still not depart from the scope of the present invention. All other described items should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data. Content for the present invention may include streaming data displayed on the video wall or provided for projection onto a main movie screen at any venue. Such streaming includes, for example, standardized video content with enhancement data for boosting the dynamic range and/or color gamut of the standardized video data. Preferably, the enhanced (boosted) dynamic range comprises high dynamic range (HDR) video, which will be higher than, for example 800-1000 or 1500:1 contrast ratio. Especially, Dolby Vision content on a display capable of a true 1,000,000:1 or greater contrast ratio is preferred. Such contrast ratios may be achieved, for example, by the Dolby-Christie dual modulation laser projection system (and is preferably used to illuminate the main screen for feature presentations). A smaller projector of high contrast is preferred for illuminating the video wall.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, preparing any of sound objects for a specific speaker configuration of the video wall (including screen, wall, ceiling (and/or floor) embedded speakers, vibration, and lighting. Receiving any of stored (e.g., hard disk drive), streaming, or other forms of video content and processing such data sound and/or video based on metadata, and the projection and/or display of the video on the video wall and/or main screen. Receiving any data related to highlighting (e.g., extracting lighting related metadata from streamed data or otherwise stored along with video and/or sound data) and operating lighting according thereto. Communicating via Wi-Fi, cell networks, or other means with mobile devices and translating inputs from the mobile devices into actions taken on displays, including video walls (e.g., via a video wall server). Preparing graphics and other renderings placed on top of movie backgrounds or other images representing a motion picture and maintaining a common theme or motif of the motion picture, and the display, storage, or communication of results according to the processes of the present invention.

The present invention may suitably comprise, consist of, or consist essentially of, any of element (the various parts or features of the invention, e.g., curved walkways, walls, video walls; highlighting around video walls, along walkways, into a theater and around a main viewing screen of the theater; spatialized audio; spatialized audio synched to variably moving action, icons, characters, and other renderings; spatialized audio synchronized with icons or characters controlled based on input from a patrons mobile device; posting or transmitting messages to social media, web pages, email, or other communications based on content generated, documenting, or otherwise related to the motion picture or activities associated with the motion picture, and their equivalents or as otherwise described herein. Further, the present invention illustratively disclosed herein may be practiced in the absence of any element, whether or not specifically disclosed herein. By way of further examples, in various embodiments, the invention comprises, and may be embodied, as, for example:

A theater, comprising an auditorium having a screen, seating, and an entrance; a corridor connecting said auditorium to said entrance; wherein said corridor is curved whereby a patron entering the auditorium traverses a curved path from said entrance to said auditorium.

The theater may further comprise one or more of the following: stadium style seating, the screen comprises a large format screen, the corridor comprises at least one smoothly curved wall, the corridor comprises first and second side walls, each of which are curved, the smoothly curved wall includes accent lighting for highlighting said corridor, the accent lighting comprises upper and lower accent lighting, first accent lighting for highlighting the interior of the auditorium, the first accent lighting comprises upper and lower accent lighting, at least one walkway connecting said corridor to said auditorium, and wherein said auditorium comprises at least one side wall, the first accent lighting comprises a substantially uniform and continuous highlighting of said walkway along said side wall to said screen, said corridor includes a curved wall that includes second accent lighting, the first and second accent lighting substantially match each other, the second accent lighting comprises upper and lower accent lighting, the entrance includes third accent lighting that substantially matches said first and second accent lighting, whereby a patron entering the theater is guided by said highlighting of said first, second and third accent lighting from said entrance, through said corridor, to said auditorium, and said screen, the auditorium includes a front area and a curved rear wall, and further comprising a walkway connecting said curved rear wall to said front area, the auditorium, said corridor, and said walkway include accent lighting for highlighting the areas thereof, the accent lighting comprises foot area highlighting near the floor, the brightness of said highlighting varies in said auditorium, said corridor, said entrance, and said walkway, the accent lighting comprises substantially continuous highlighting around said screen along said walkway and across said rear curved wall, the corridor comprises curved walls, and said accent lighting comprises substantially continuous highlighting around said screen along said walkway along said rear curved wall and along said curved walls of said corridor, whereby a patron would be naturally led by said highlighting through said corridor, said walkway, said screen, and to said seating, the entrance includes an entryway and a curved wall for displaying images, the curved wall of said entrance is curved in such a manner that the distal end of said wall is not visible to a patron at said entryway, the images are video images, the video images are related to the subject matter being projected onto said screen, the images correspond to one or more selected from the group consisting of a scene, characters, the environment, location, and setting, all related to the subject matter being projected onto said screen, the images comprise a setting related to the subject matter being projected onto said screen, the seating comprises stadium seating having a plurality of rows of seats, each of said rows being curved and elevated over rows closer to said screen, and each of said rows further from said screen have more seats than rows closer to said screen.

In yet another example:

A theater, comprising:

an auditorium having a screen for displaying motion pictures, a rear portion, walls, seating with a plurality of rows of seats, and an entrance;

a pathway extending from said entrance to said auditorium, said pathway including a walkway between said rear portion of said auditorium to the front row of said seats; and substantially continuous accent lighting from said rear portion along said walkway to said screen to provide highlighting of same.

The theater may further include any one or more of accent lighting surrounding the screen, the accent lighting extends in a substantially continuous band of highlighting around said rear portion of said auditorium, the accent lighting comprising foot level lighting for illuminating said walkway, the accent lighting further comprises above eye level lighting, the accent lighting projects said highlighting from recessed areas both above and below said walls and around said screen, the pathway further includes a curved corridor extending between said entrance and said walkway, the curved corridor is substantially continuously curved, the entrance further comprises a curved video wall, the entrance further comprises an entryway, said video wall visible from said entryway, the entryway is positioned opposite the central portion of said curved video wall, the pathway further includes a curved corridor extending between said entrance and said walkway, and said curved video wall is located between said entrance and said curved corridor, the curved video wall displays video images that are related to the subject matter being projected onto said screen, the curved video wall displays images that correspond to one or more selected from the group consisting of a scene, characters, the environment, location, and setting, all related to the subject matter being projected onto said screen, and the video wall displays images that comprise a setting related to the subject matter being projected onto said screen.

In still yet another example:

A theater, comprising:

an auditorium, a prelude space having an entryway, said prelude space leading to said auditorium and including a curved video wall that displays images related to the subject matter being shown in the theater; and a corridor connecting said prelude space to said auditorium, said corridor being curved substantially similarly to said curved video wall.

The theater may include any one or more of, where the prelude space further includes accent lighting extending from said prelude space through said corridor to said auditorium, the accent lighting includes recessed lighting both at foot level and overhead level, the auditorium includes additional accent lighting that substantially matches said accent lighting in said prelude space and said corridor, the additional accent lighting includes recessed lighting both at foot level and overhead level, the auditorium further includes a screen and seating and said additional accent lighting surrounds said screen and said seating, the additional accent lighting extends in a substantially continuous band of lighting around the auditorium and the screen, the accent lighting is located both above and below said curved video wall, the prelude space further includes a second curved wall opposite to said curved video wall, the second curved wall being illuminated by more accent lighting that matches said accent lighting above and below said curved video wall, the accent lighting and said more accent lighting is recessed both above and below said curved video wall and said second curved wall, the prelude space and said corridor are connected through at least one opening having no door, the theater further comprising a second opening having no door, the at least one opening and said second opening are located on opposite ends of said curved video wall, the prelude space and said corridor are connected through at least one opening having a door, a second opening having a door, the at least one opening and said second opening are located on opposite ends of said curved video wall, the curved video wall is curved in such a manner that a distal end of said wall is not visible to a patron at said entryway, the curved video wall displays images that correspond to one or more selected from the group consisting of a scene, characters, the environment, location, and setting, all related to the subject matter being projected onto said screen, and the video wall displays images that capture a mood related to the subject matter being projected onto said screen.

FIGS. 21-66 include various theater designs that stand alone and may be utilized in combination with any of the embodiments described above. Some of the figures are digital images that may include shading, reflections, shadows, logos, trademarks, screen displays and representations of people (e.g., patrons, movie goers, users, etc.) which may form part of the claimed design, may be considered generic (i.e., a Dolby logo may be considered as disclosing any logo), or may be absent from any design depending upon how the same is chosen to be claimed as the figures should not be considered as limiting any particular claim or requiring any specific element. Any claim may contain any individual part of any figure without necessarily including any other particular part individually or combined. The digital images may include white and color shading which represent lighting effects, which again may form part of any claimed design or which may be excluded from any claimed design. The inventors and the Applicant reserve the right to amend FIGS. 1-66, including but not limited to color, texture and surface contour and/or depth, or any of the attached FIGS. 1-66 based on the present disclosure.

Figure 66:
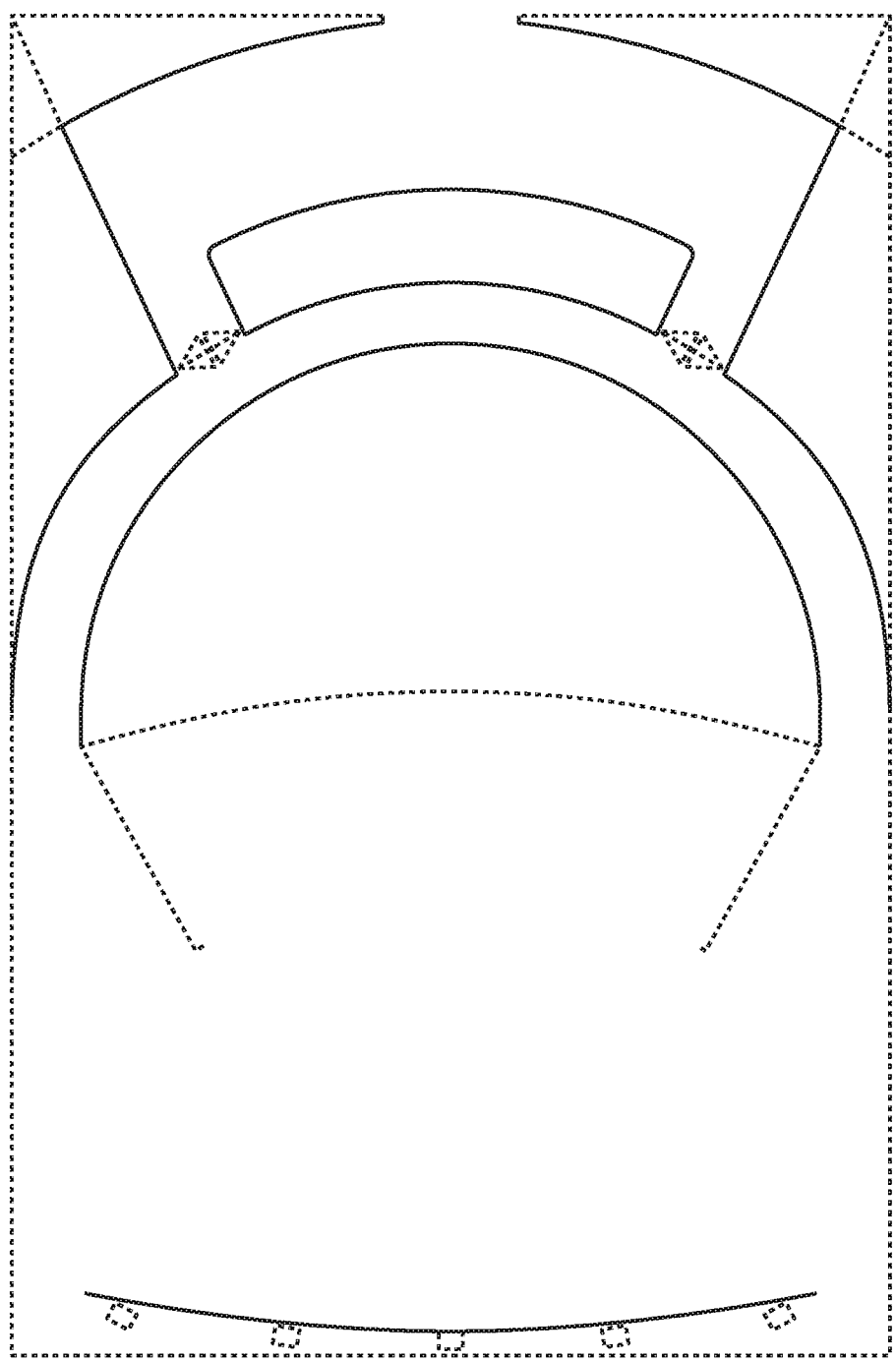
FIG. 66 is a top view of an embodiment of a theater layout.

The inventors hereby describe and possess the overall appearance shown in FIGS. 1-66, all structural and function features described therein, and any and all parts and/or portions thereof and/or combinations thereof. The inventors hereby claim all structural and all functional features or elements shown in the figures individually and in any combination. Further, the inventors and the Applicant regard the disclosed design(s) as the overall appearance shown in claimed FIGS. 1-66, and any and all parts and/or portions thereof and/or combinations thereof. As such, the inventors and the Applicant reserve the right to separately claim, including by inserting a boundary around, any part, portion, element and/or combination of the disclosed design(s), and also reserve the right to replace any solid line in any current or future line drawings with a broken line to disclaim any part, portion, element or combination thereof of the disclosed design (and/or corresponding features thereof including structural and functional features) or to replace any broken line in any current or future line drawings with a solid line to claim any part, portion, element or combination thereof of the disclosed design and inventions. The inventor and the Applicant also reserve the right to create line drawings from any of the figures, and to amend the title, for example to theater; theater structure; theater panel; theater panel structure; architectural structure; architectural panel; architectural panel structure; acoustic structure; acoustic panel; acoustic panel structure; theater layout; theater plan; theater entrance; theater lighting; theater lighting effect and/or seating structure.

Of particular note, consider Figures which illustrate darkened areas around main screen in a theater. These same areas are illuminated with highlighting in other figures. And, the highlighting continues down walkways on one or both sides of the theater as illustrated in various other figures.

Figure 35:
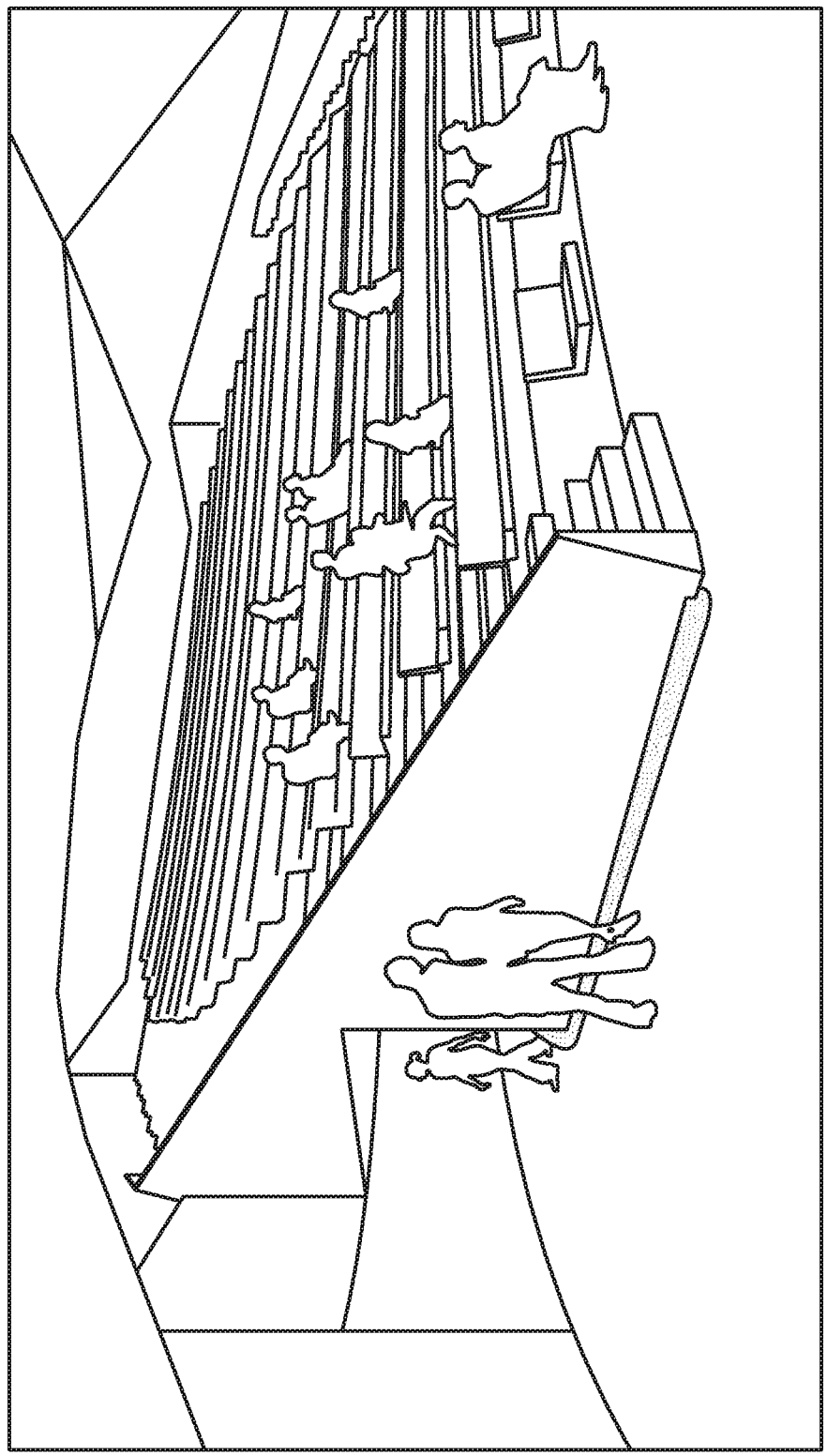
FIG. 35 is an image illustrating an embodiment of a theater seating area entrance area and highlighting around a back area of the theater seating area.
Figure 36:
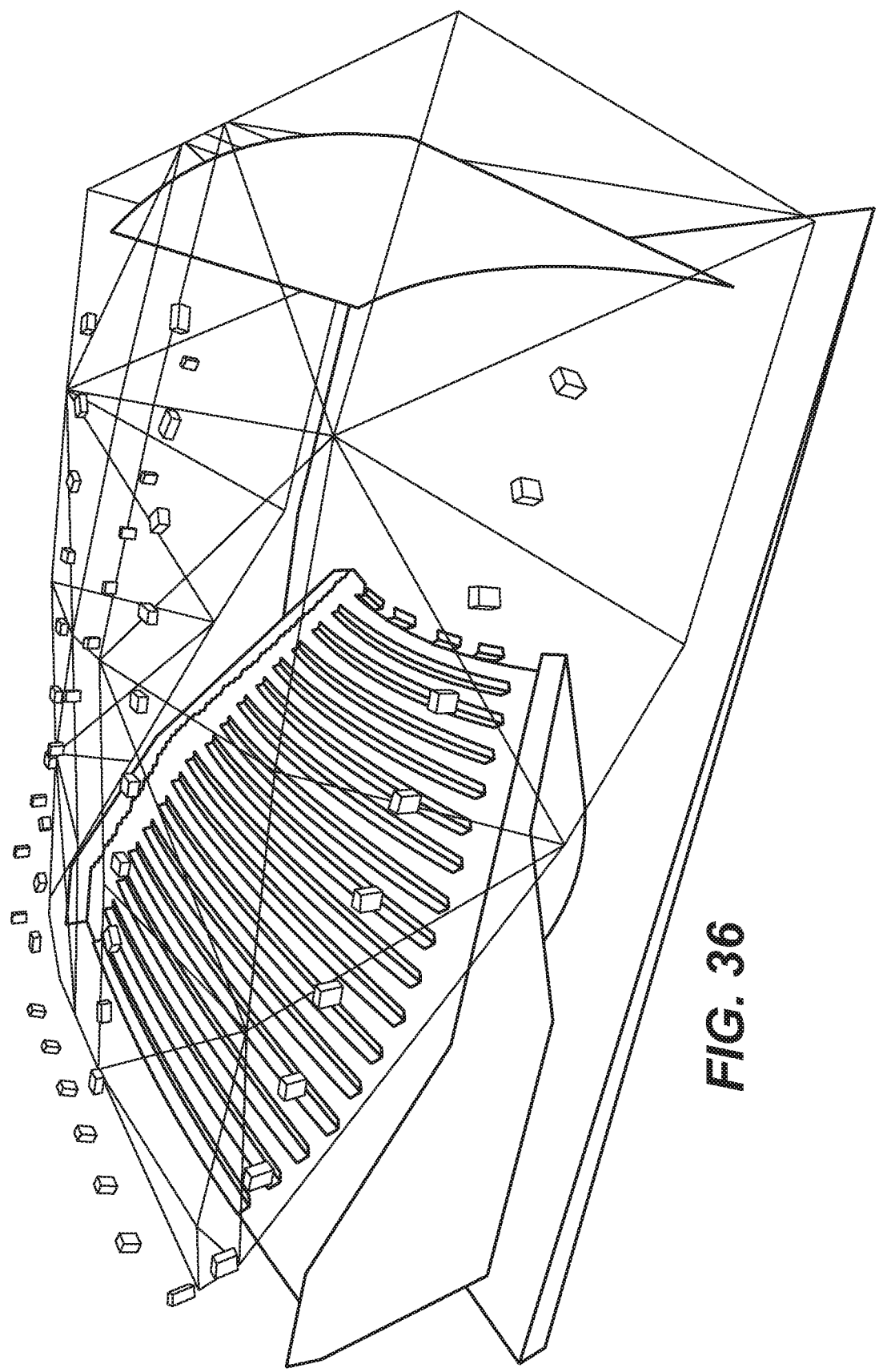
FIG. 36 is a perspective view of theater seating area capped by panels and speaker locations.
Figure 37:
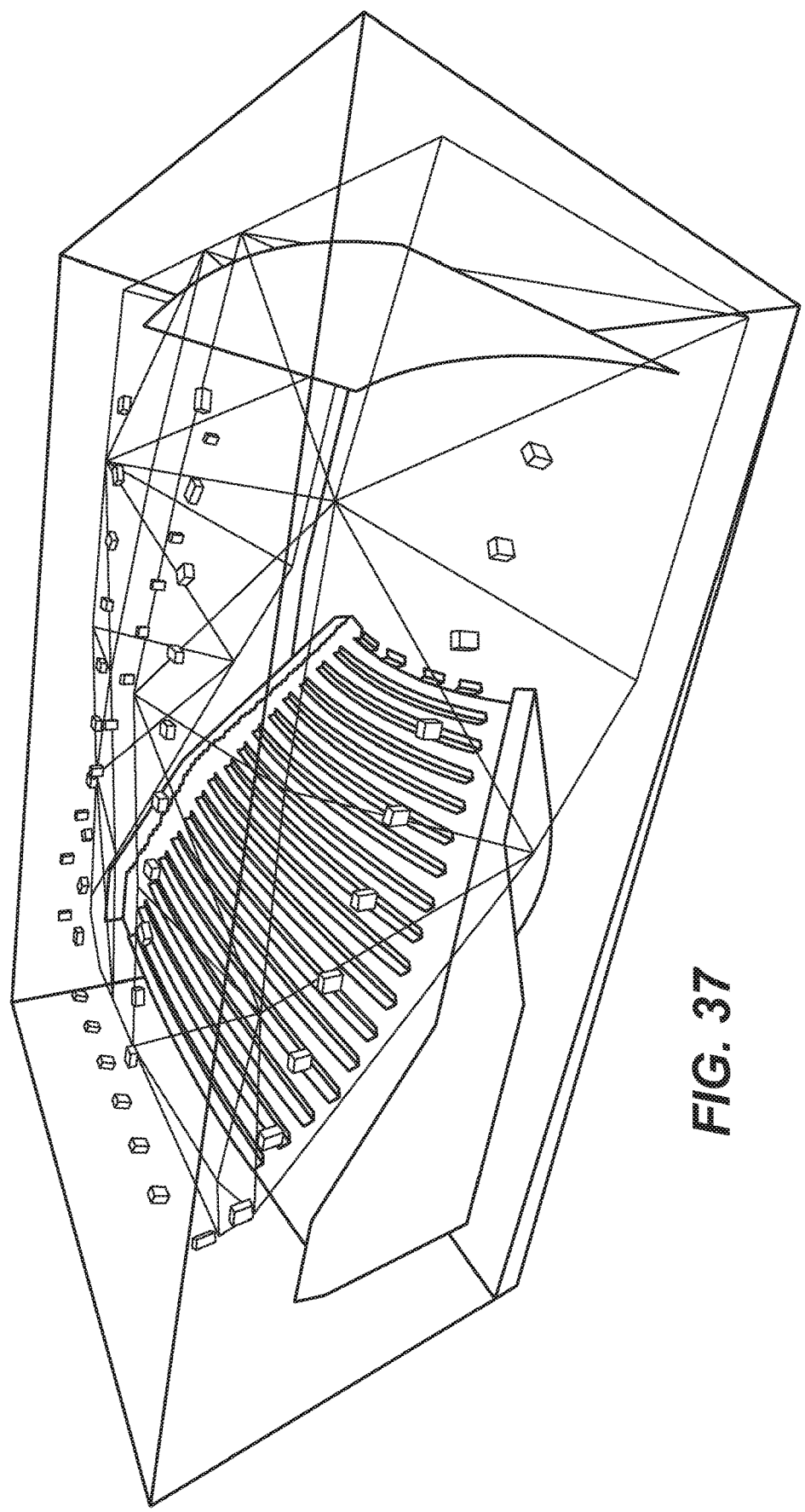
FIG. 37 is another perspective view of theater seating area capped by panels and speaker locations.
Figure 38:
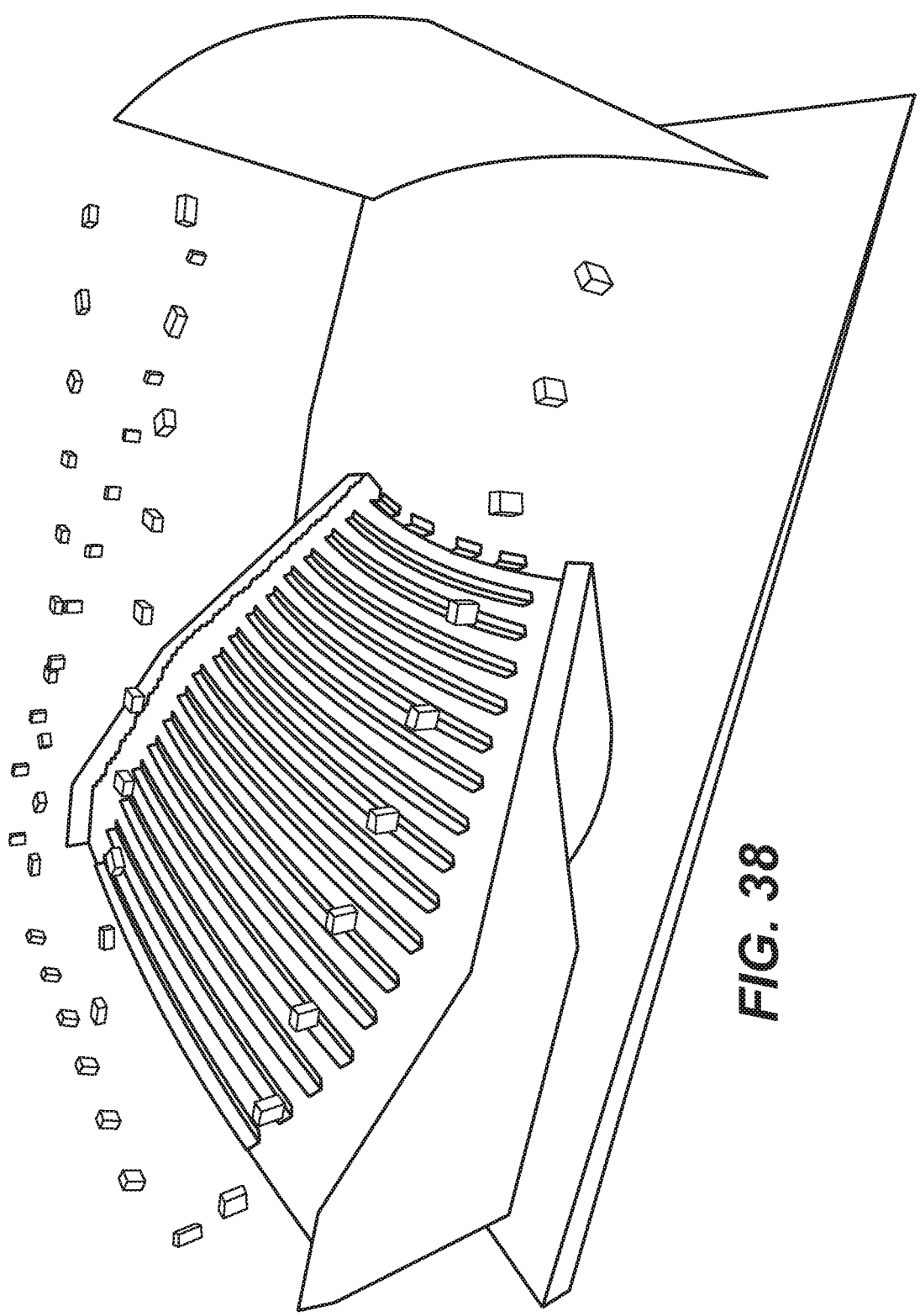
FIG. 38 is a perspective view of a theater seating area and speaker locations.
Figure 39:
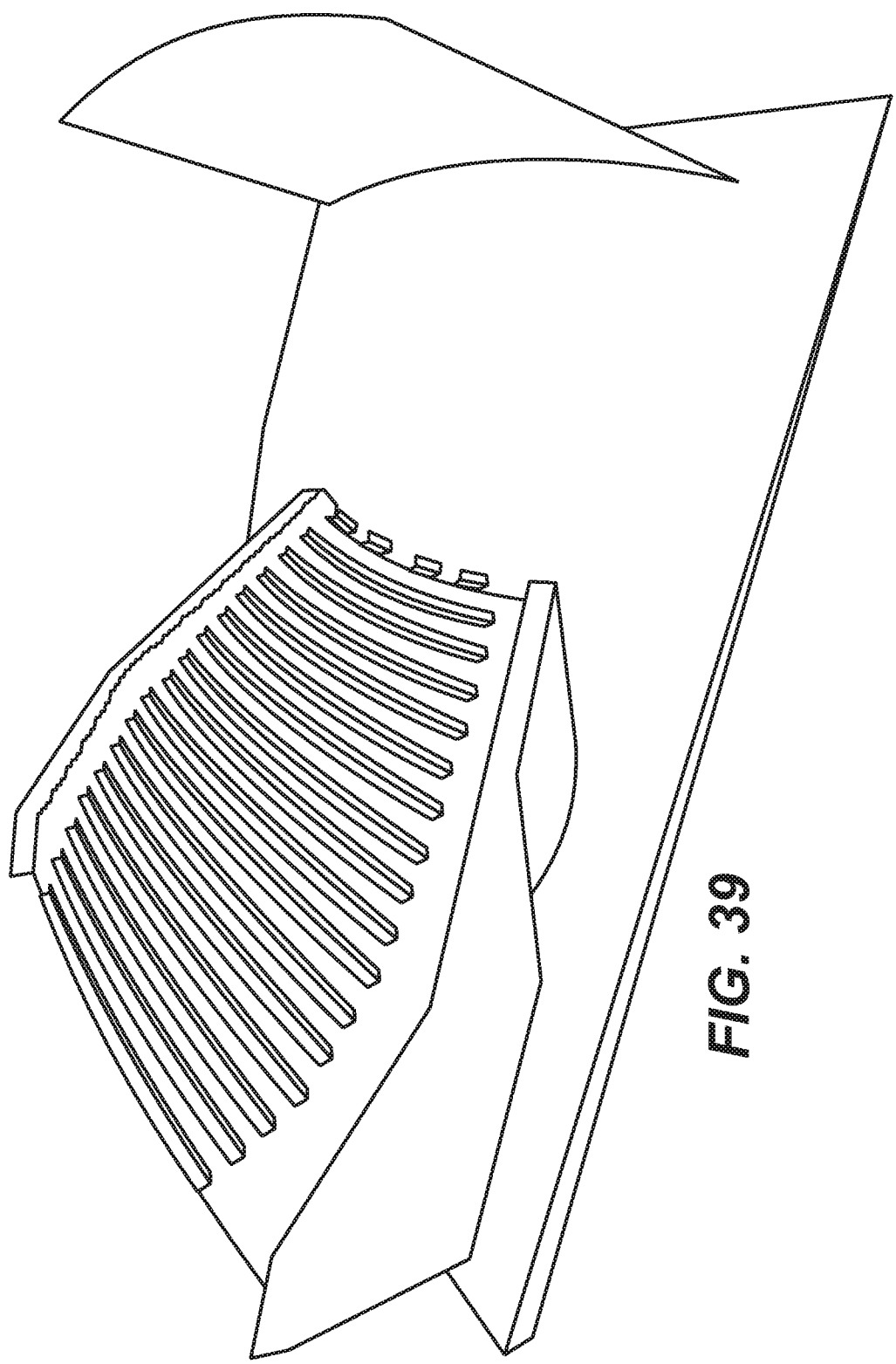
FIG. 39 is is a perspective of a theater seating area.

Various figures illustrate various embodiments of a curved video wall displaying images relating to a scene, motif, theme of the motion picture oblivion. Note that while vibrant, the setting is subdued and enticing. The curved video wall may be configured or as shown to be "dropping off" at a horizon on the video wall that occurs because of its curvature. The opposing wall is inwardly curved and includes highlighting that is continuous into the theater and connects with highlighting in other pathways and to the theater interior. FIG. 35 illustrates connecting highlighting in the rear of the theater. The curved video wall may be for example less than an semi-circle, or "D" shaped, or other curvatures, and may be more tightly curved in entrances with less available floor space, or expanded in larger venues.

FIGS. 21-26 illustrate designs of a cocoon type structure (also shown in part in other figures) that can, in some embodiments be described as a cap which encloses the theater and which removes reference points to the speakers overhead (and above the cocoon structure. Speaker locations illustrated in several of the figures include linear arrayed speakers, and which may alternatively be placed in staggered or quincunx formations, utilize floor mounted speakers in the theater, and may also include seating level speakers, and/or floor corner speakers (where a wall intersects with the theater floor). All such speakers are integrated via wiring or other connections to a server (e.g., cinema sound server) that processes object based sounds and send appropriate signaling to each speaker—ultimately forming an enveloping sound within the cocoon that travel to and from any part of the theater to another. Such sound may include, for example, Dolby Atmos®. Other object oriented sound and multi-directional, or spatialized sound and sound placement systems, although less preferred may also be utilized.

Figure 56:
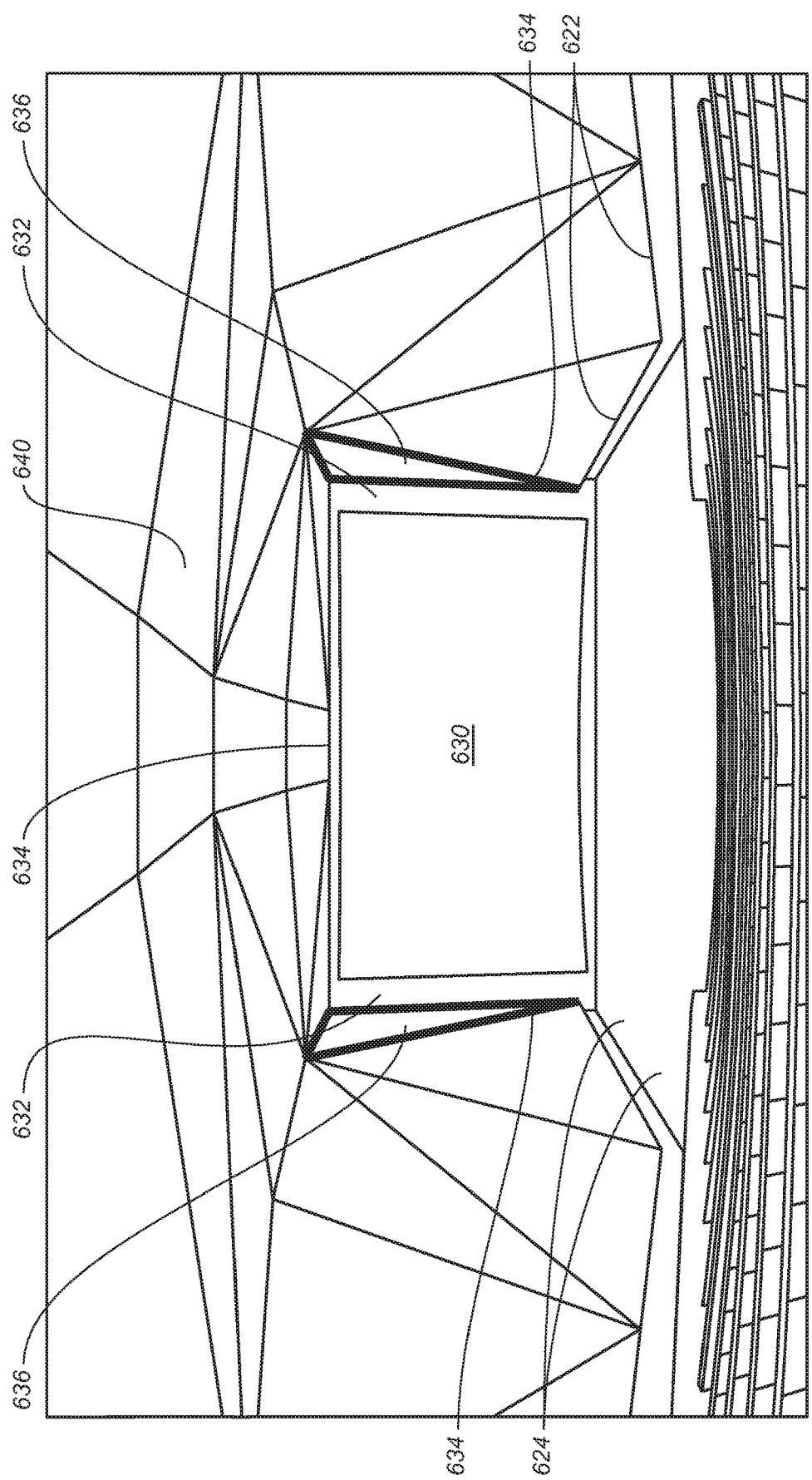
FIG. 56 is a view of an embodiment of a theater seating area.
Figure 57:
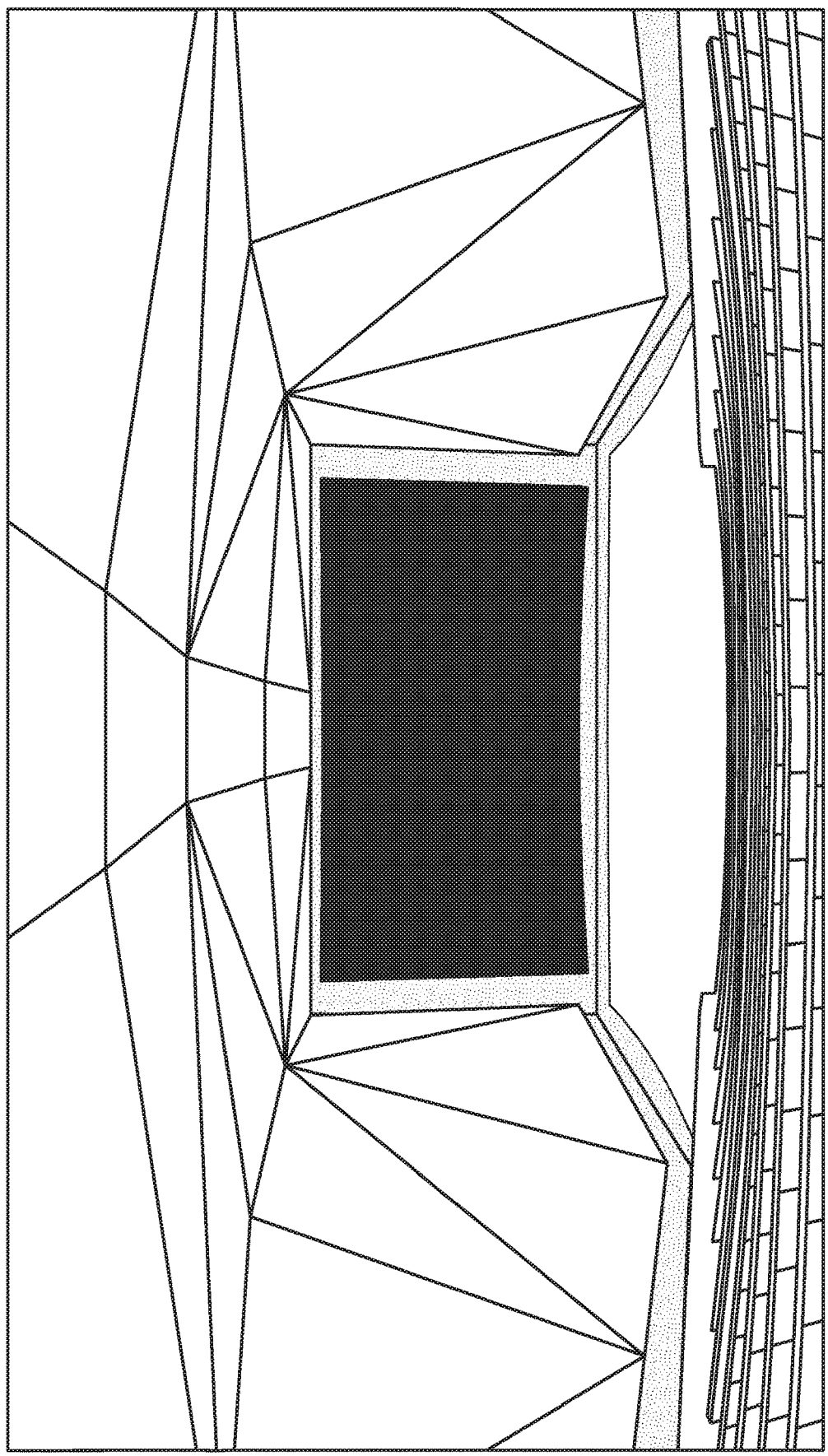
FIG. 57 is an image of a theater seating area corresponding to FIG. 56.
Figure 58:
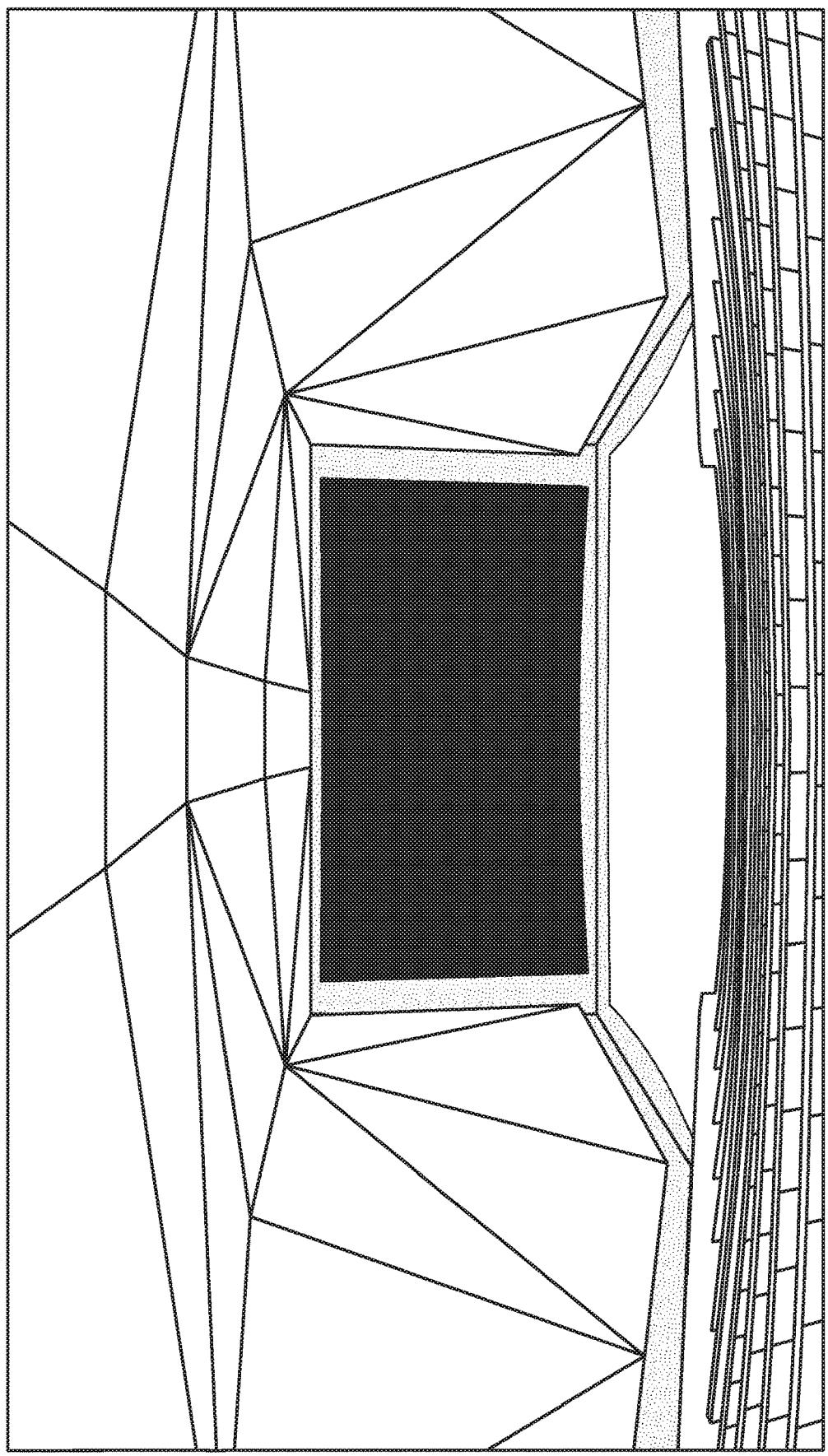
Figure 59:
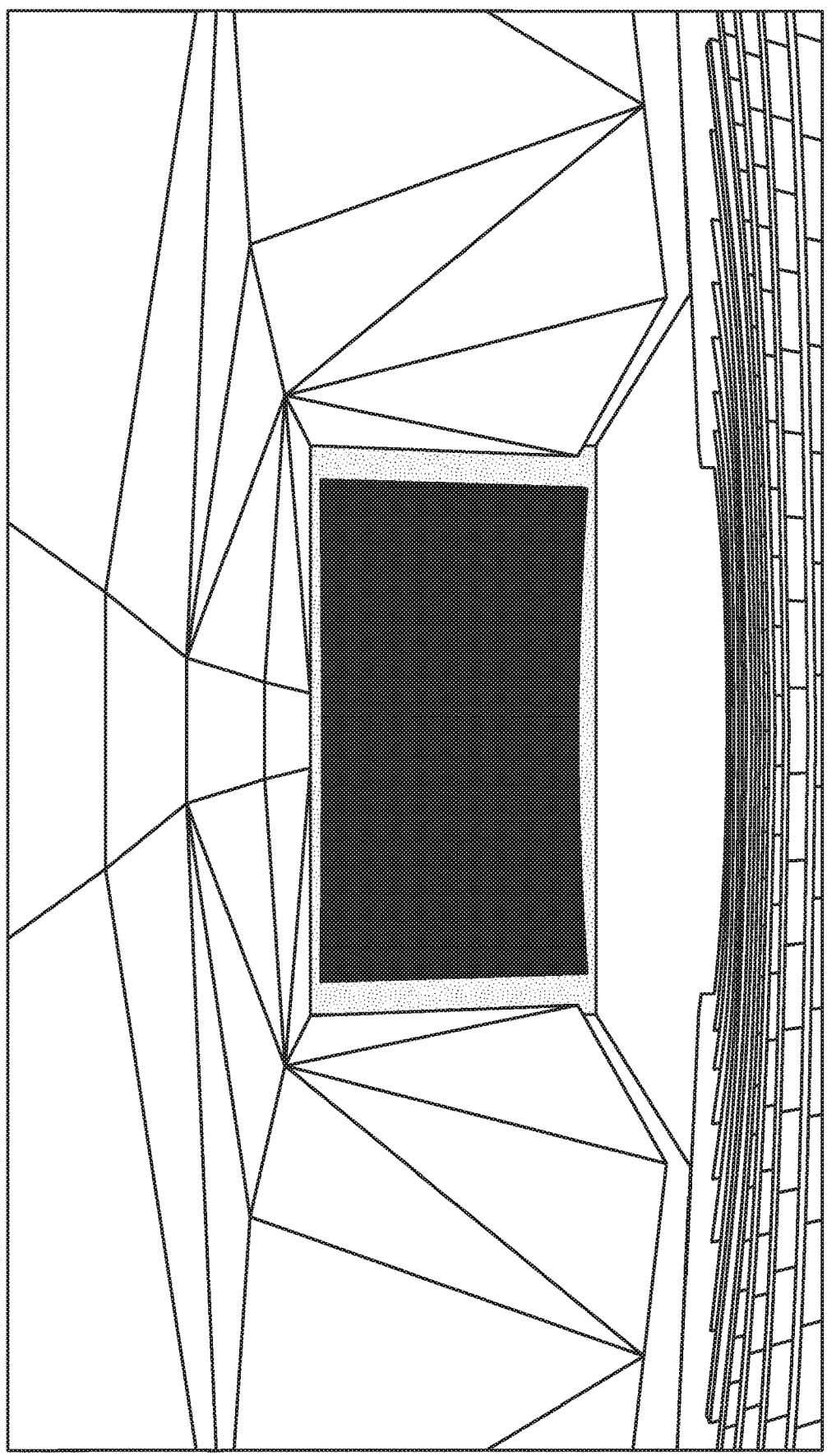
Figure 60:
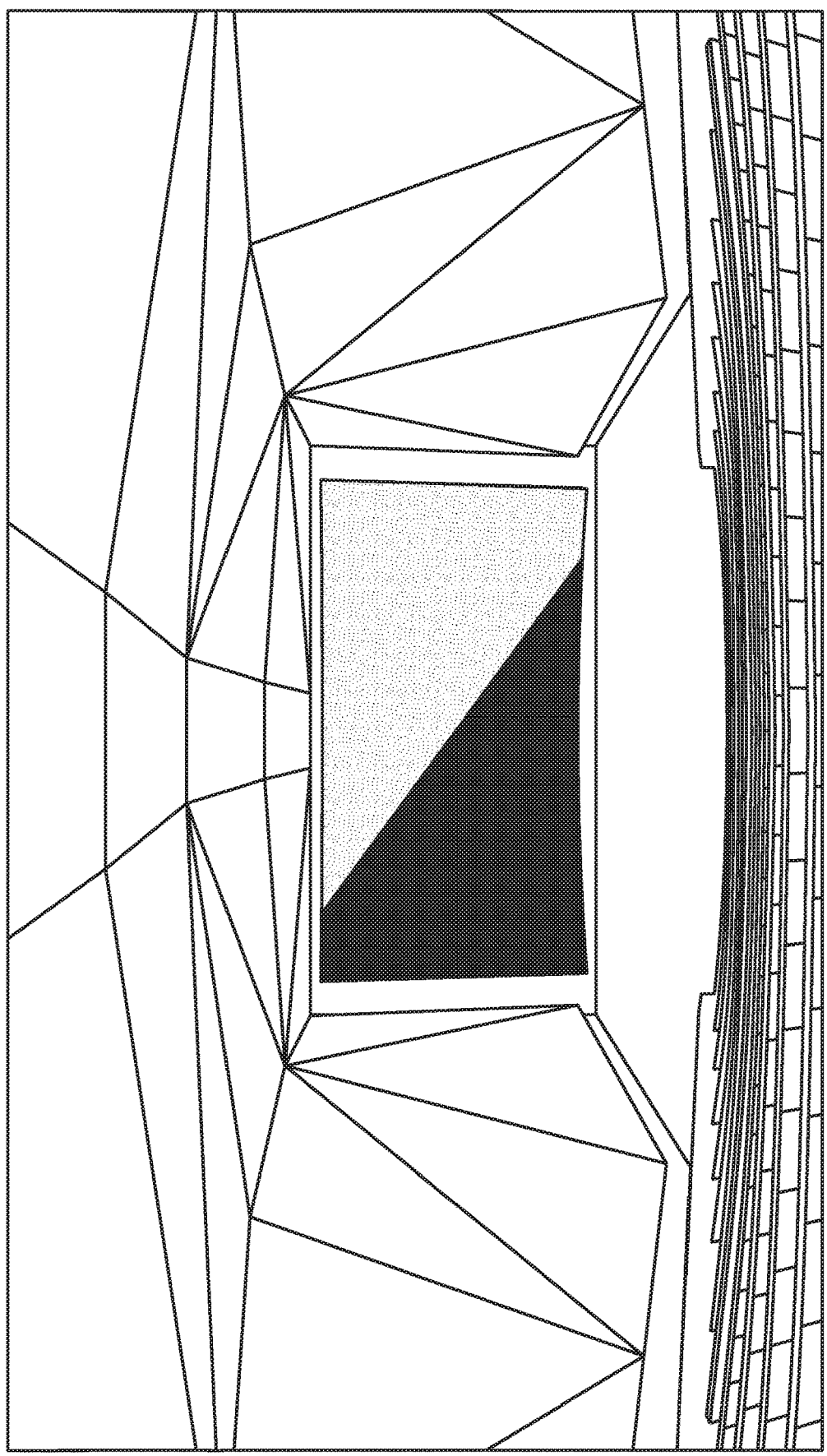
FIG. 60 is an image of a theater seating area corresponding to FIG. 56 showing a movie with a "half" bright screen and highlighting off.
Figure 61:
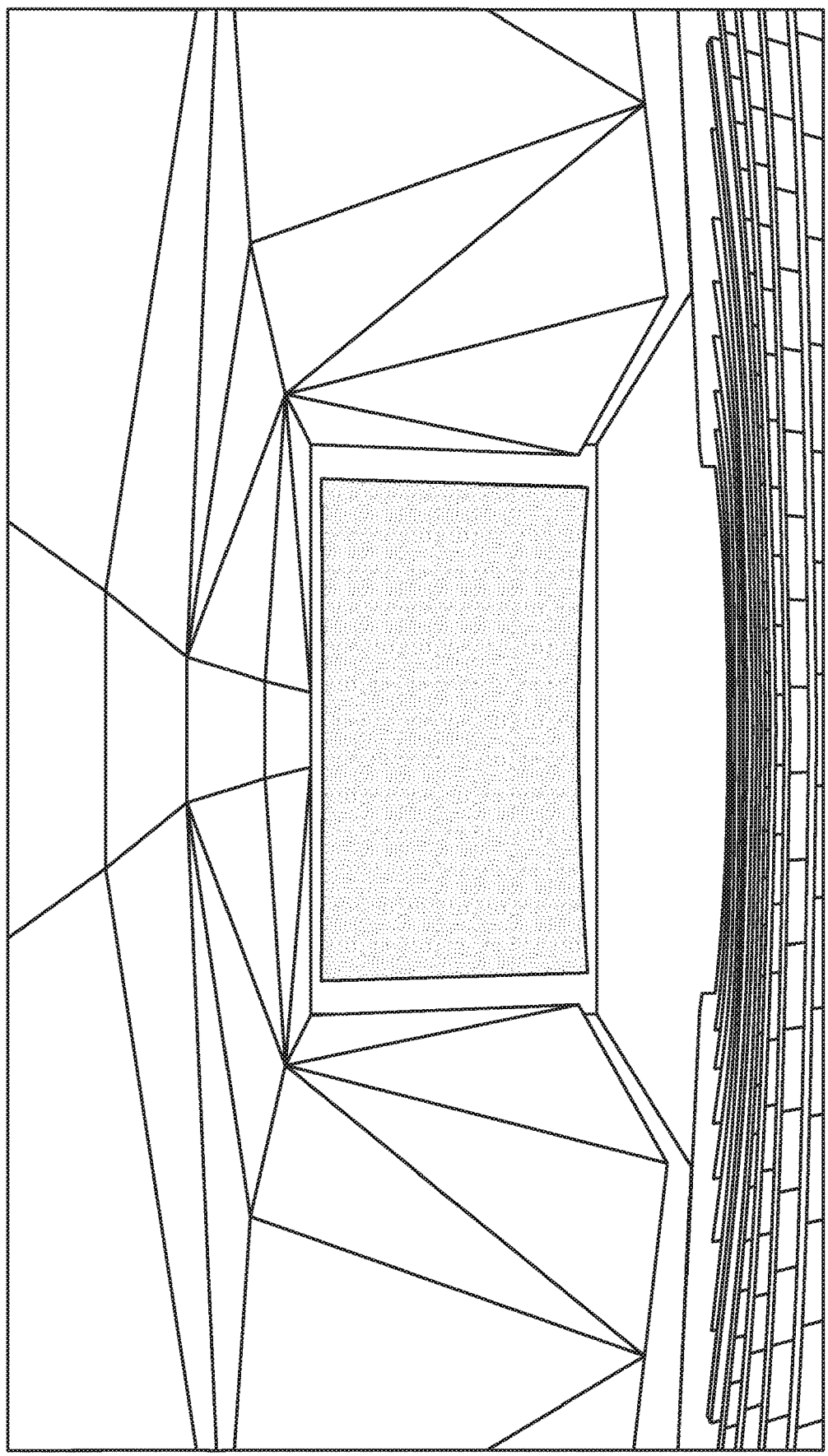
FIG. 61 is an image of a theater seating area corresponding to FIG. 56 showing a movie with a "full" bright screen and highlighting off.
Figure 62:
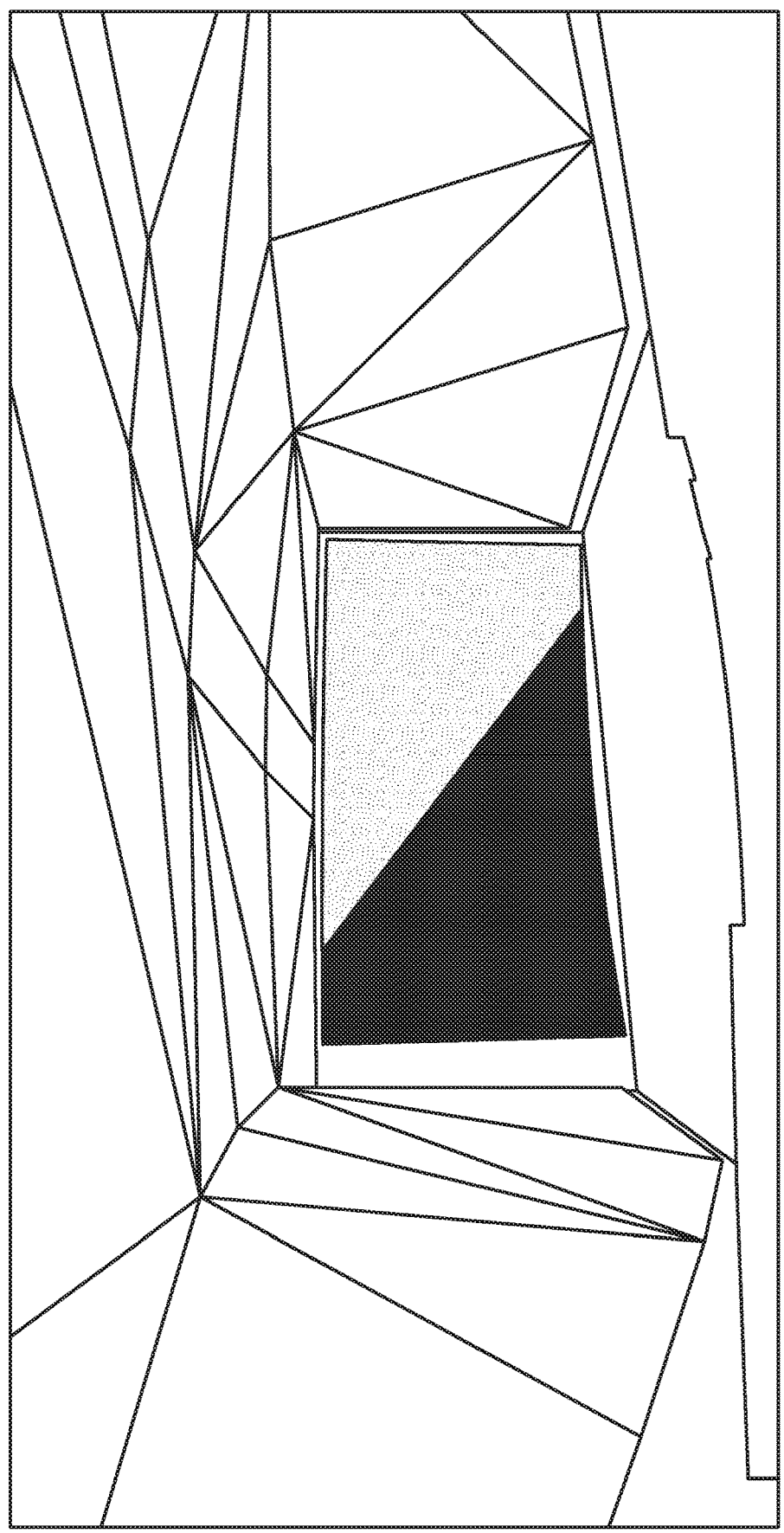
FIGS. 62 and 63 are perspective views of "half" and "full" bright screen respectively.
Figure 63:
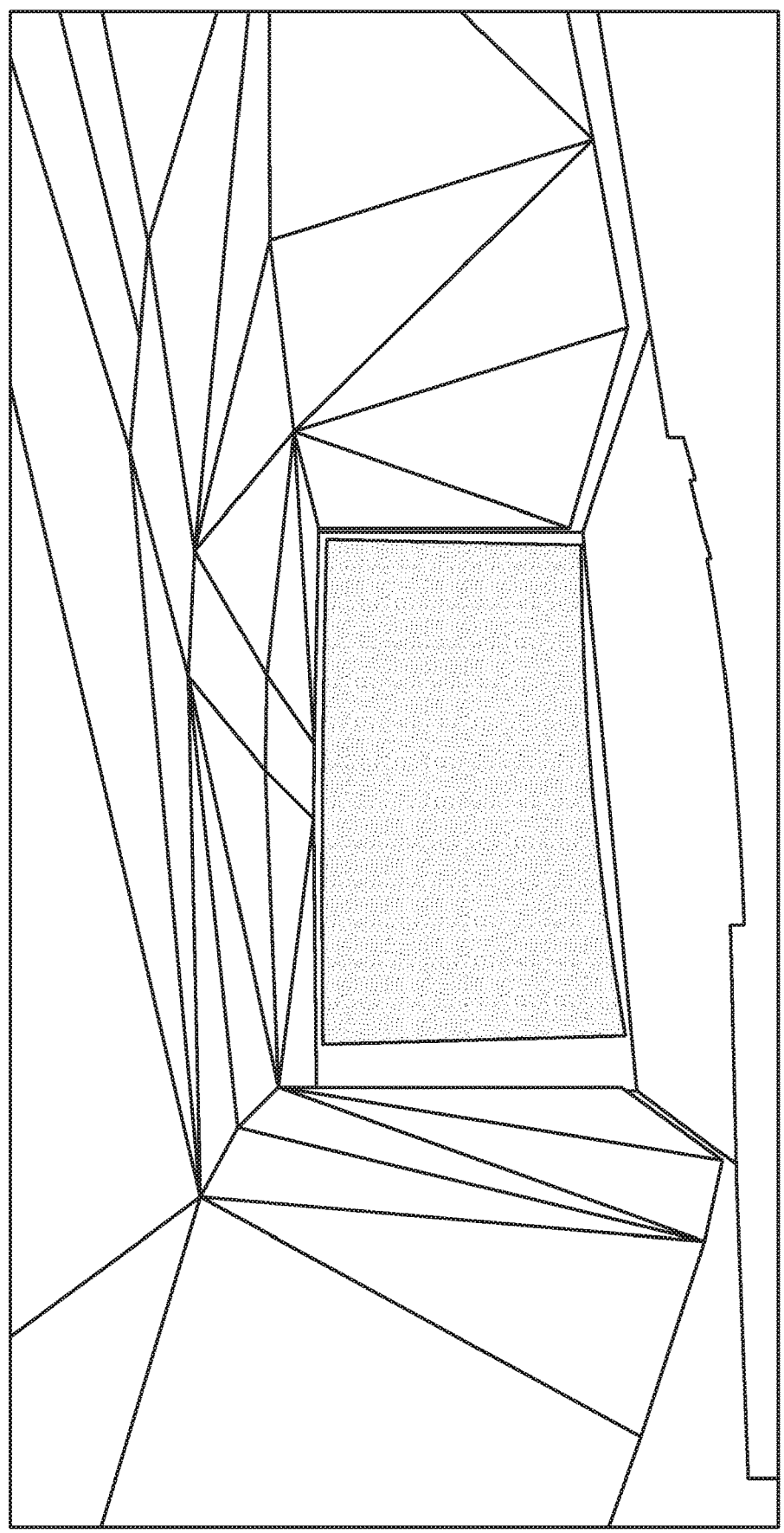
Figure 64:
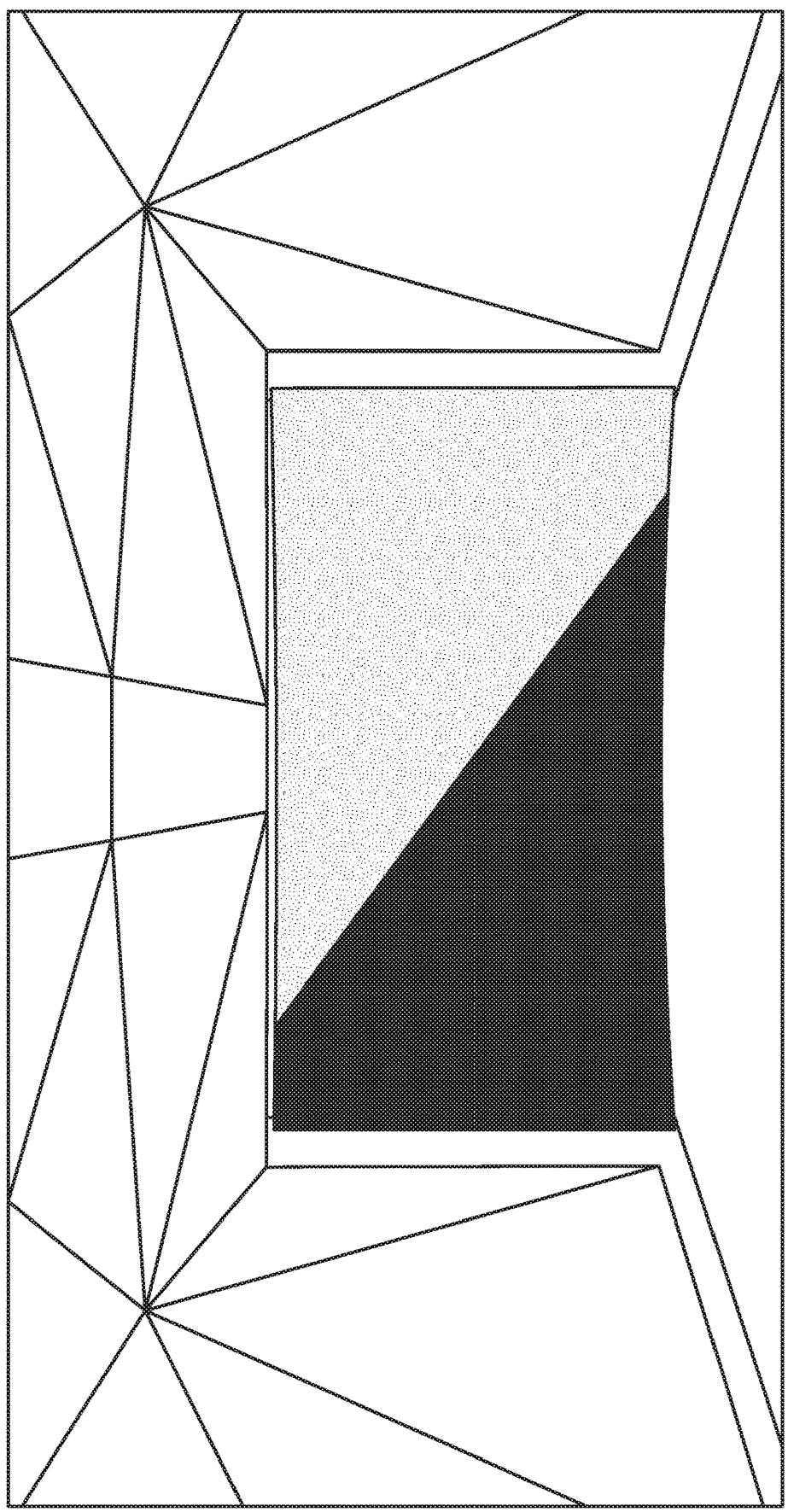
FIGS. 64 and 65 are close-ups of FIGS. 60 and 61.
Figure 65:
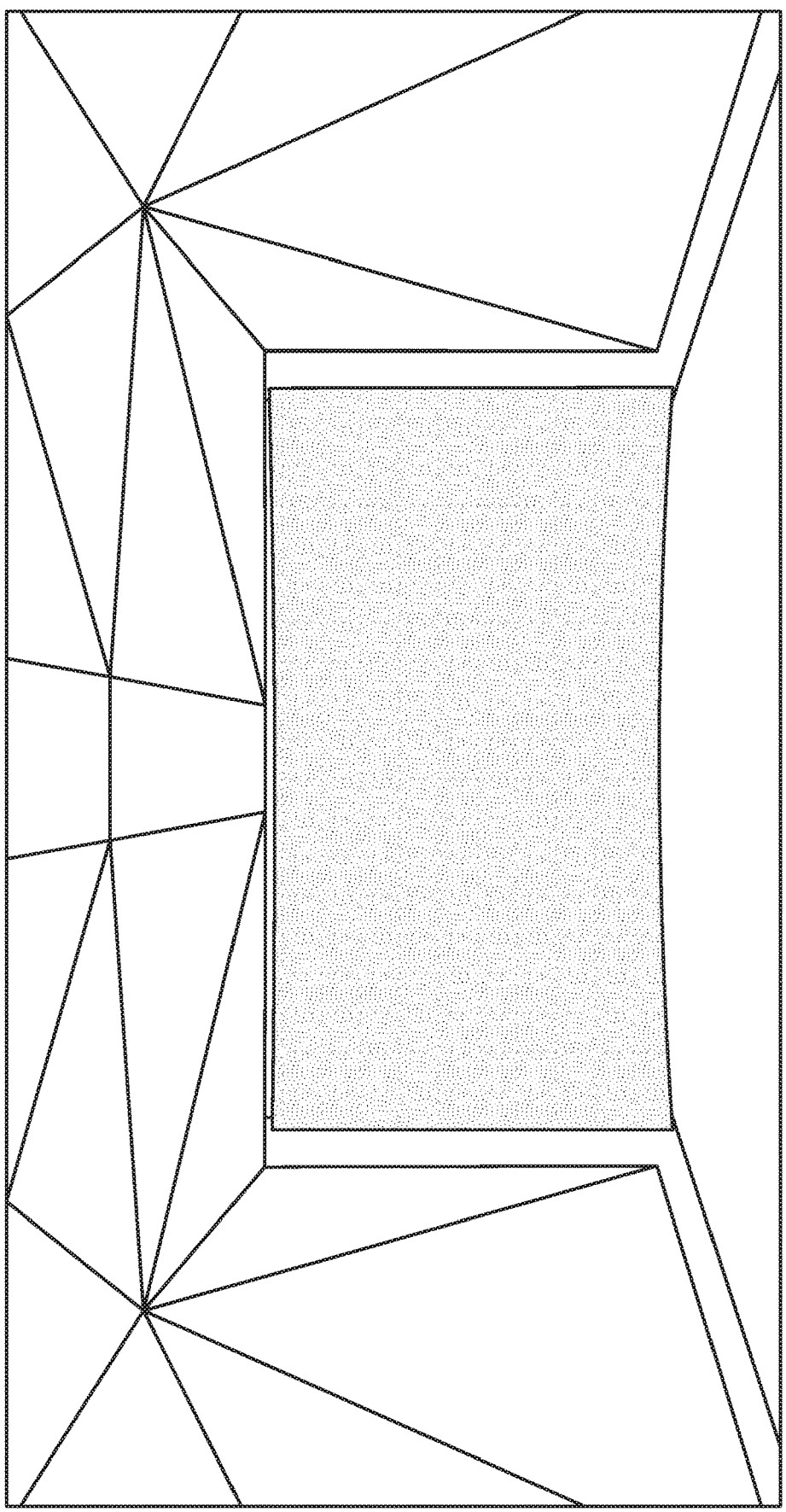

FIG. 56 provides on example which combines the features (and different colors) provided in original figures A30 et al. FIG. 56 shows, highlight lighting around a screen 630 that is "floating." The screen position is out and away from the wall and highlight lighting 632 surrounding the screen. This is utilized, for example, prior to any programming being displayed (previews, advertisements, video games, social media, etc.). In some embodiments, the highlighting is maintained for some preshow activities such as gaming, social media, and advertising, for example. In one embodiment, cameras are located in the curved entryway to record patron reactions and interactions (if any) with the curved video wall. The recorded reactions are replayed in pre-show time on the screen 630.

The around screen highlighting 632 is connected to, for example, other highlighting such as walkway highlighting 622/624 as shown. The walkway highlighting runs longitudinal from the back of the theater to the screen creating a fully enveloped mood within the theater and drawing attention to the screen. Use of high dynamic range and/or high brightness projectors allows for adequate illumination on the screen to display social media, gaming, advertisement, or pre-show shorts while the highlighting is on. The highlighting may be, for example, colors from LED or other illumination sources that are programmable as to color or changing brightnesses and which may include patterns. The dolors. Patterns, or brightness are, for example, consistent with a Motif, or look and feel, of a particular engagement, such as one associated with a movie, promotion (e.g. advertisement), or corporate colors consistent with an event at the theater or matching certain advertising. Preferably, the Motif or look feel is projected by the lighting to set a mood consisebnt with the main event, motion picture, sporting event (e.g., Team Motif when playing a live or closed circuit of a sporting event—football, basketball, soccer, college, Olympic, professional, etc.) to be played on the theater screen. Most importantly and preferably the motif sets the mood in the theater for a motion picture.

The highlighting is shown in two parts including sharp cut-offs at ledges (e.g. 622) at the upper bounds of the directly highlighted areas (e.g. at the walkways), and more diffuse lighting 624 on the walkways under the ledges. Wall construction including surfaces are highly anti-reflective near the screen as shown by darkened areas 636 near but outside the screen highlighting. Panels from which the theater interior are constructed are placed at angles that reduce reflection when the screen is in operation.

Original figures A30 et al show some diffusion of light 640 which may be of the various colors (e.g., orange A33, blue A34, white A30, pink/purple A31). Obviously, other colors or combinations of color may be utilized (e.g., programmable colored LEDs, for example). The highlighting is, for example, symmetrical around the seating area.

Various social media aspects of the present invention already discussed may be intergrated into the cinema server (e.g., Dolby or doremi cinema servers), or may be operated separately and then transmit content when necessary for interface or display on the curved video wall and/or theater screen.

Further social media and other features of the invention will now be discussed in terms of a Cinema Application Framework (CAF). The Cinema Application Framework (CAF) is a combination of on-premise hardware and software, and cloud services to support third party developed value-added applications and services that contribute to the movie watching experience. Though optimized for cinema playback use cases (in a theatrical environment shared with other people), it can also be applied to playback in the home, or on mobile devices.

One purpose of the CAF, and/or associated system is to facilitate coordinated playback of multi-sources of content in a multi-device environment. Primary content is played back through a primary device (projector, screen, curved video wall, surround sound or ATMOS® system in the case of a theatre environment) and secondary content (audio, video, images, text, application) can be synchronized with the primary content and played back on other devices (in-seat speakers, mobile devices, auxiliary displays). For example, in one embodiment, secondary content is provided (e.g., downloaded, streamed to a user's mobile device) to provide advertising or enhance the primary content displayed on the video wall as the user enters the theater. GPS data or other cues may be used to synchronize the secondary content. Such secondary content may elicit interaction from the user for comments, game playing, purchases, social media posts, etc.

Some of the possible use cases when the primary and secondary content is produced by the same source and is specifically designed to complement the primary content experience (e.g., Motion picture primary content, secondary content by the same studio):

Enhanced audio: audio soundtrack includes auxiliary content played on speakers installed in seats in the auditorium of via open ear headphones.

Personalized audio: audio played through headphones (likely best with audio blocking design) on mobile device in theatre provides control over volume, loudness leveling, dialog enhancement.

Alternative language: via headset (from mobile device or headset connected to audio output from the seat), alternate languages can be selected and played back.

Complementary content: rather than regular soundtrack, director's narration or other commentary could be played via headphones.

Interactive content: content is directed to users phone during movie to share information on screen based on action going on in the movie.

User participation: audience votes for outcomes and determines what plays next.

Many use cases exist that combine the secondary material produced by secondary sources generating content independently:

Advertising: expanded information on product placement or other contextually relevant information.

Social sharing: audience posts comments with timestamp metadata. This feed is available to other users watching same move at another time in other locations.

User generated content: content designed to replace the audio of the primary content (via headphones) or displayed on a secondary screen and be played in sync with primary audio. This could be a movie critic commenting on the movie as it plays.

Figure 67:
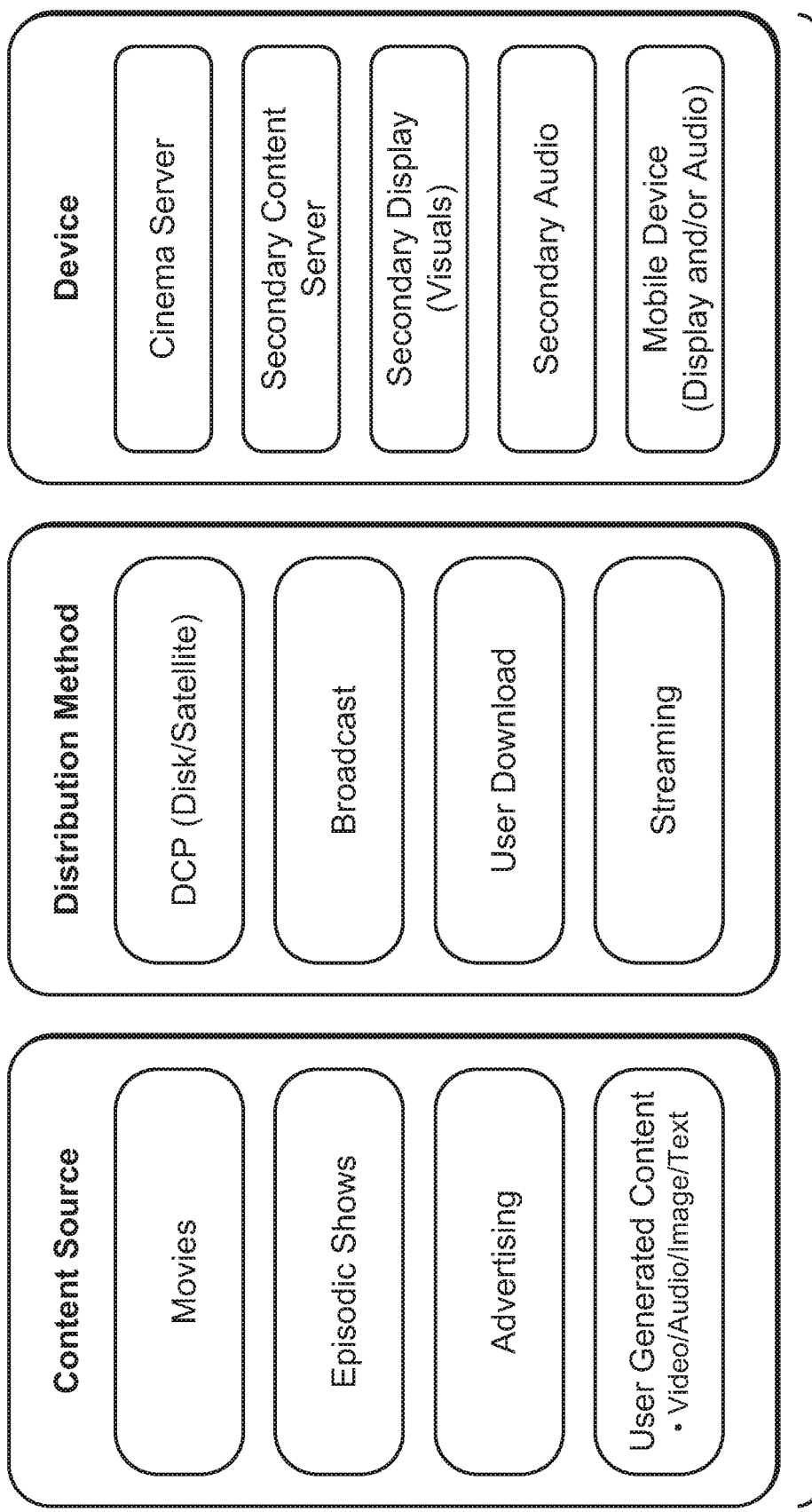
FIG. 67 provides examples of an embodiment for each of content source, distribution method, and devices, in corresponding columns.
Figure 68:
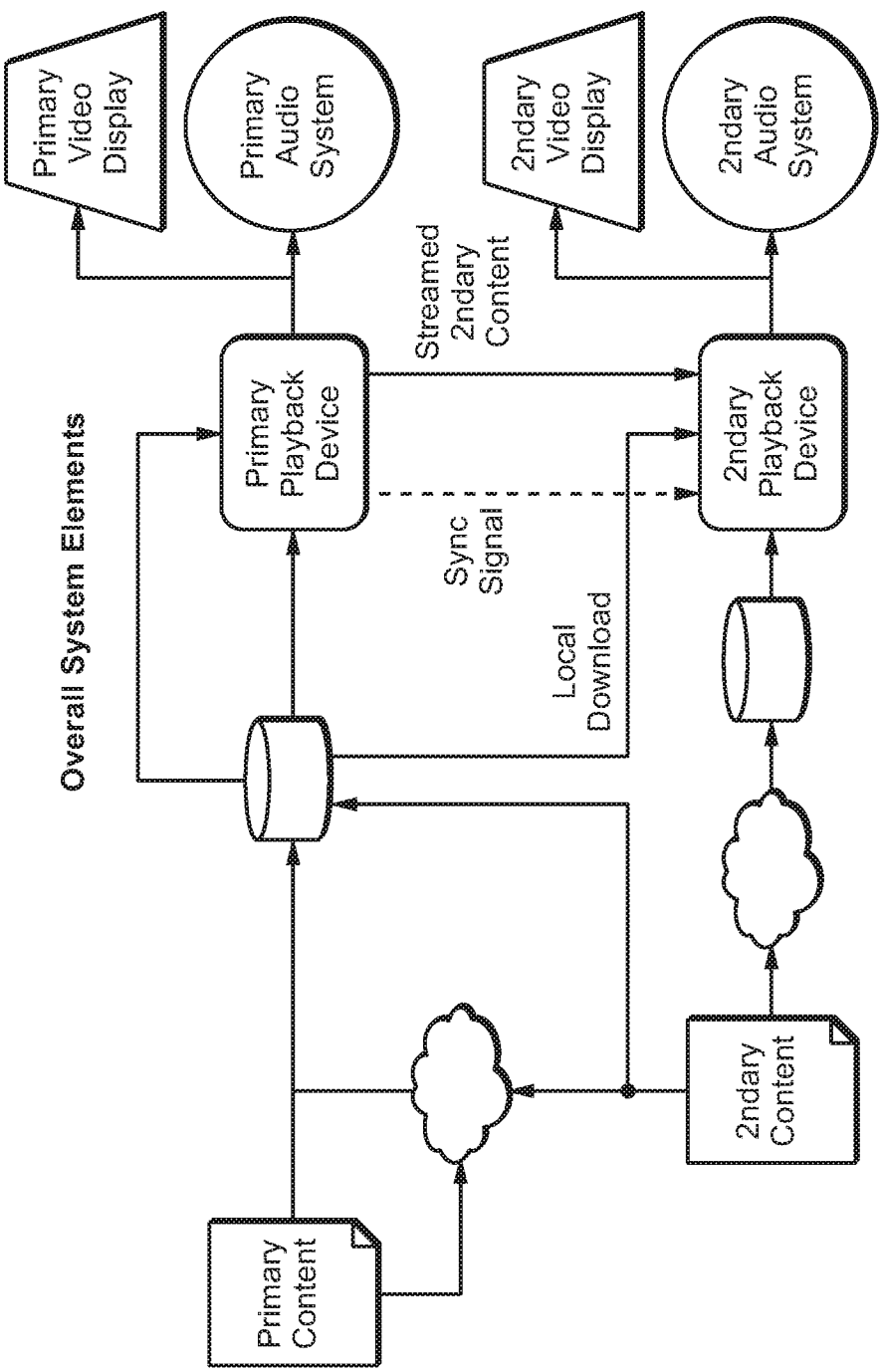
FIG. 68 provides an exemplary arrangement of elements.

A conceptualized system design includes key elements which include, for example, primary content and metadata, and playback system for primary content. The playback system may include, for example, a Player (server in case of theatrical environment); a Video display (or projector/screen), an Audio system, and an effects system (air bursts, spray, odor, movement/vibration). Further elements include any one or more of a sync signal generated and made available by primary playback device, a secondary content, a playback system for secondary content (could be same system as for primary content or a 2nd system). The playback system includes, for example, any or all of a centralized or distributed player (e.g, server or mobile device), an auxiliary screen (mobile device, secondary display(s), projector), auxiliary speakers (headphones, mobile device speakers, in-seat), and/or an effects system (air bursts, spray, odor, movement/vibration). Yet further additional elements may include, for example, any one or more of a management system, a system supporting business rules, a system for security protocols, a collection/payment system, and a use tracking and reporting system, for example. FIG. 67 provides examples for one embodiment for each of content source, distribution method, and devices, in corresponding columns. FIG. 68 provides an exemplary arrangement of elements.

Content flow and playback for cinema use cases may be such that the primary content is delivered to cinema theatres in the form of a DCP on hard disk, satellite download, or terrestrial Internet delivery depending on the country and type of content. For advertising or content other than the main feature, formats and delivery methods might be different. Regardless, the main content is delivered to the main playback device, and may be performed per industry standard methods now in place new methods, or a combination of methods.

Primary and secondary content may be delivered together (before playback). For example, secondary content can be delivered with primary content (e.g., on the same hard drive as the main feature) and sent to the primary playback system. The primary playback system could include a content storage library or distribution system as separate from the primary playback device.

Secondary content could be distributed from the library to the secondary playback device (usually prior to play time), or it could be streamed to the secondary device from the primary playback device as it plays the primary content.

Secondary content may be delivered separately from primary content (before playback). For example, secondary content produced by the same team that made the primary content or from a completely unrelated source can be distributed directly to the secondary playback device via any of the same methods as primary content, or other more consumer friendly methods (e.g., download from an app store).

Figure 69:
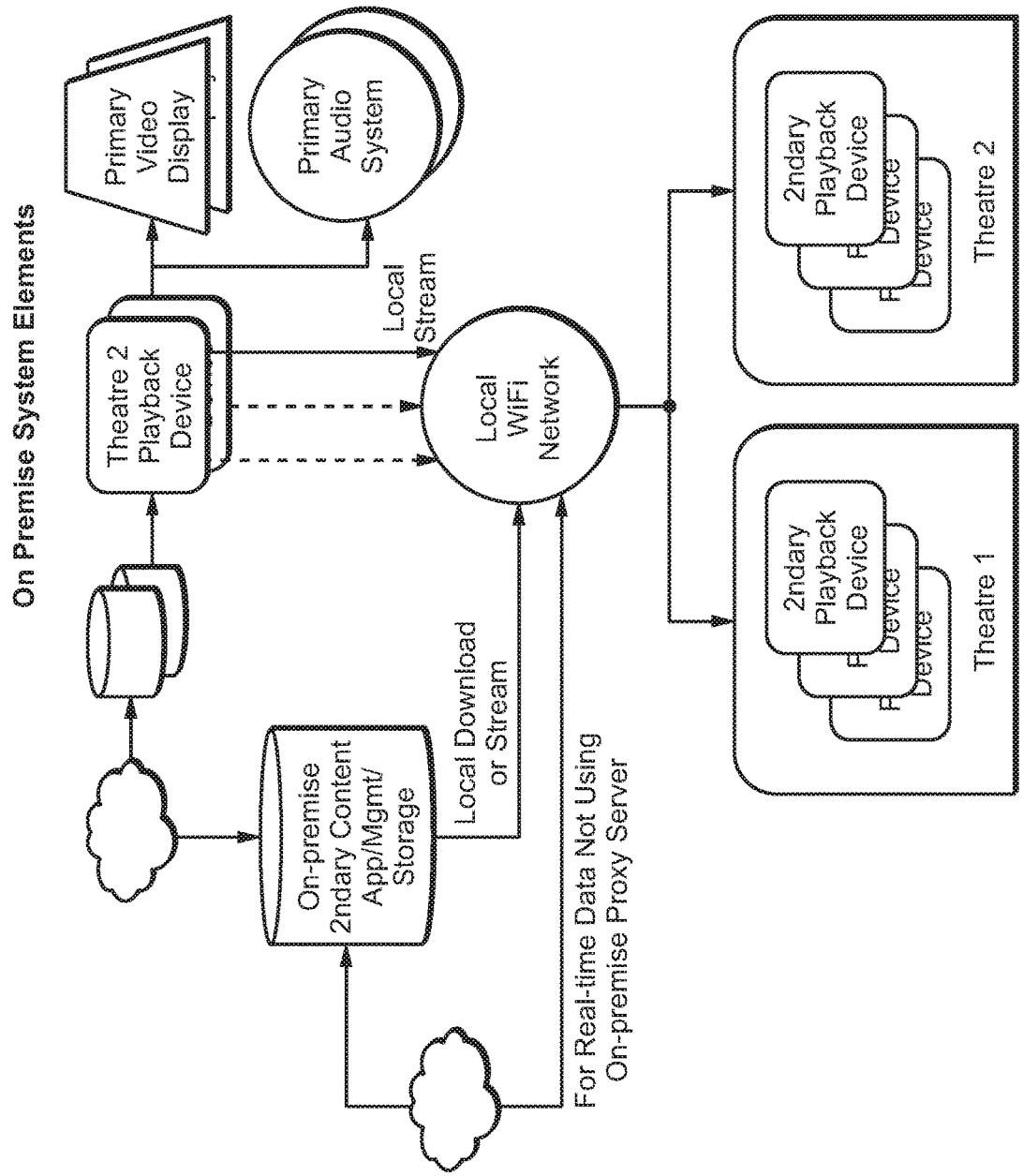
FIG. 69 is another example of elements according to an embodiment.

The secondary content may be preloaded and synchronized with primary content during playback. In yet another embodiment, secondary content may be delivered in real time from a cloud-based server (or delivered from the cloud based server through the cinema server). Secondary content may be generated in real-time (e.g., some interactions with the user which affect the secondary content) and may not be able to be stored locally on premise or pre-installed on the secondary device. Social media postings are an example of real time data that would need to be delivered directly from a cloud server. Each mobile device could have it's own connection but for best reliability and performance, the secondary content server could act as a proxy. FIG. 69 is another example of elements according to an embodiment of the invention.

The present invention, or inventions described herein include several embodiments that individually or together form a theater or aspects of a theatrical (motion picture or other venue) environment. For example, in one embodiment, a theater entrance, comprising a lobby, a vestibule having an entryway, an inner wall, and an end, a first outer wall that separates said vestibule from said lobby, a convexly curved image projection wall that is visible from said vestibule and said lobby. The theater entrance may include border lighting along an edge of at least one of said inner wall and said outer wall, and/or wherein a path formed in the vestibule between said inner wall and the image projection wall leads to an entrance of a seating area of a theater, the image projection wall has a curvature that forms a horizon on the image projection wall from a patron's perspective when walking along the path toward the seating area entrance, and the curved image projection wall ending past the horizon and at the seating area entrance.

The seating area entranceway may comprise, for example, a walkway at said end of said vestibule, and/or where the vestibule is connected to a viewing area by said walkway. In one alternative, the vestibule may be connected to the walkway by a doorway and/or the walkway between said vestibule and said viewing area is curved.

Figure 40:
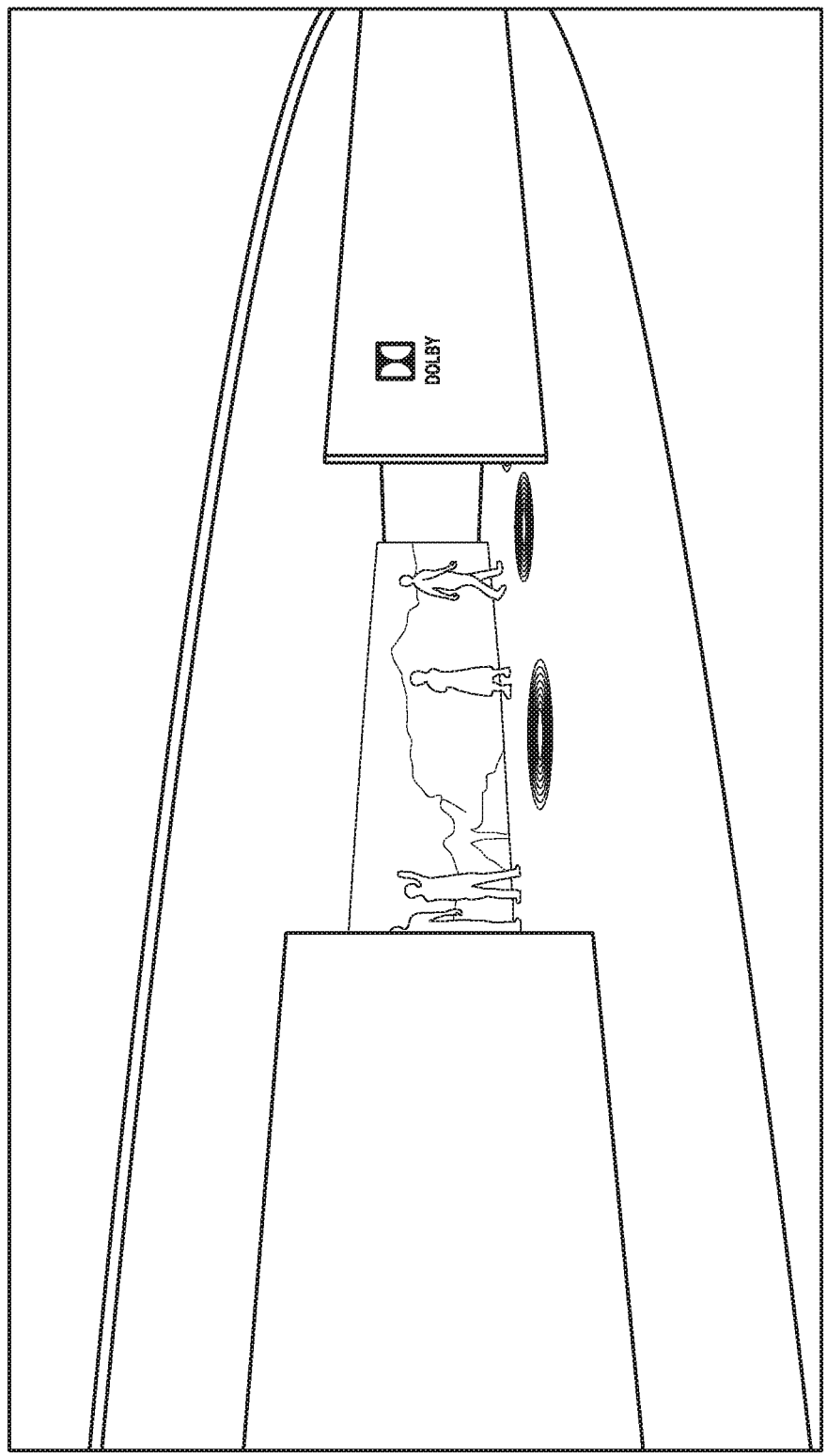
FIG. 40 is a view of a theater entrance according to various embodiments, illustrating an entryway and an embodiment of a curved video (or image) wall.
Figure 41:
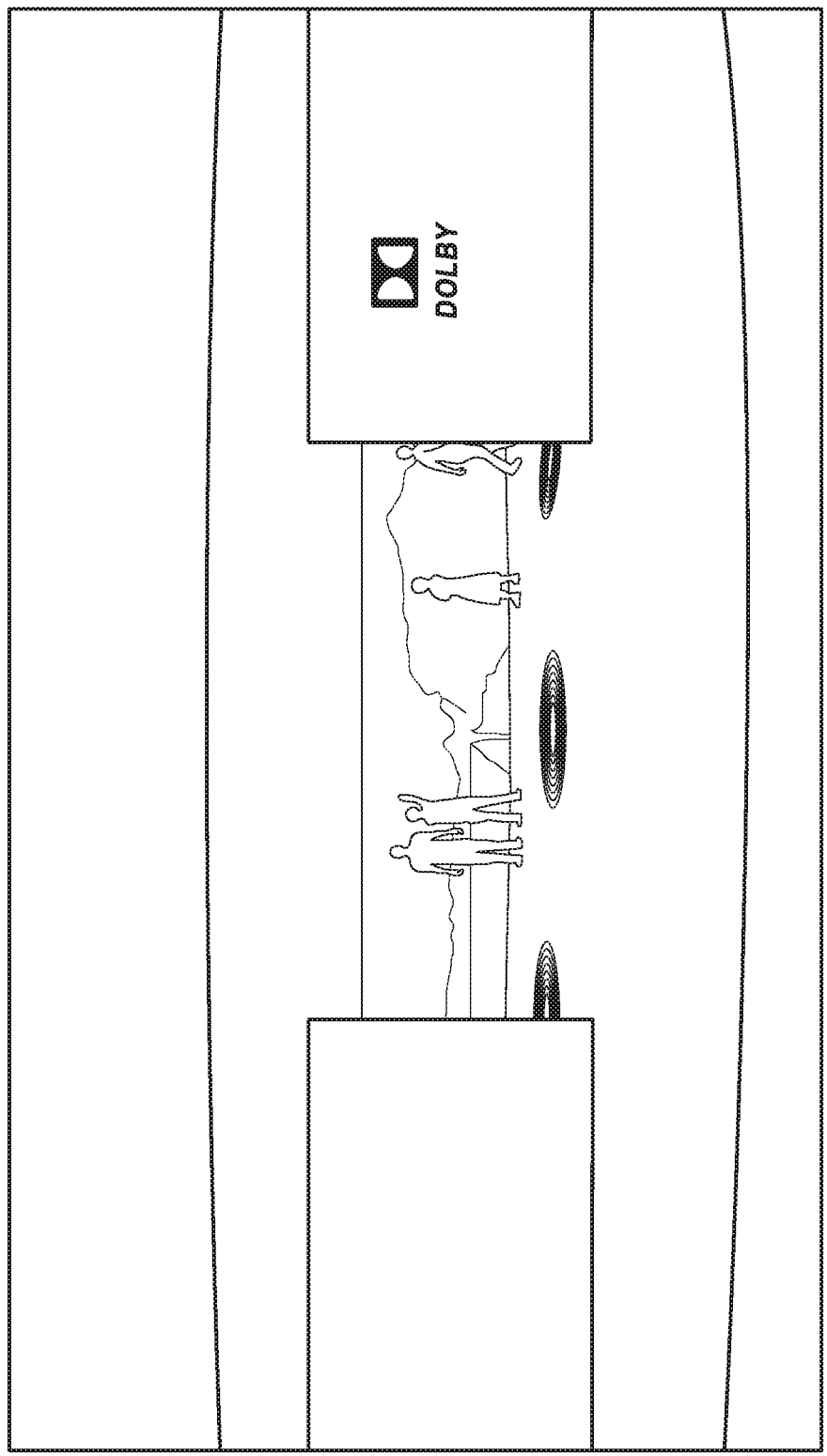
FIG. 41 is a view of a theater entrance according to various embodiments, illustrating an entryway and an embodiment of a curved video (or image) wall.
Figure 42:
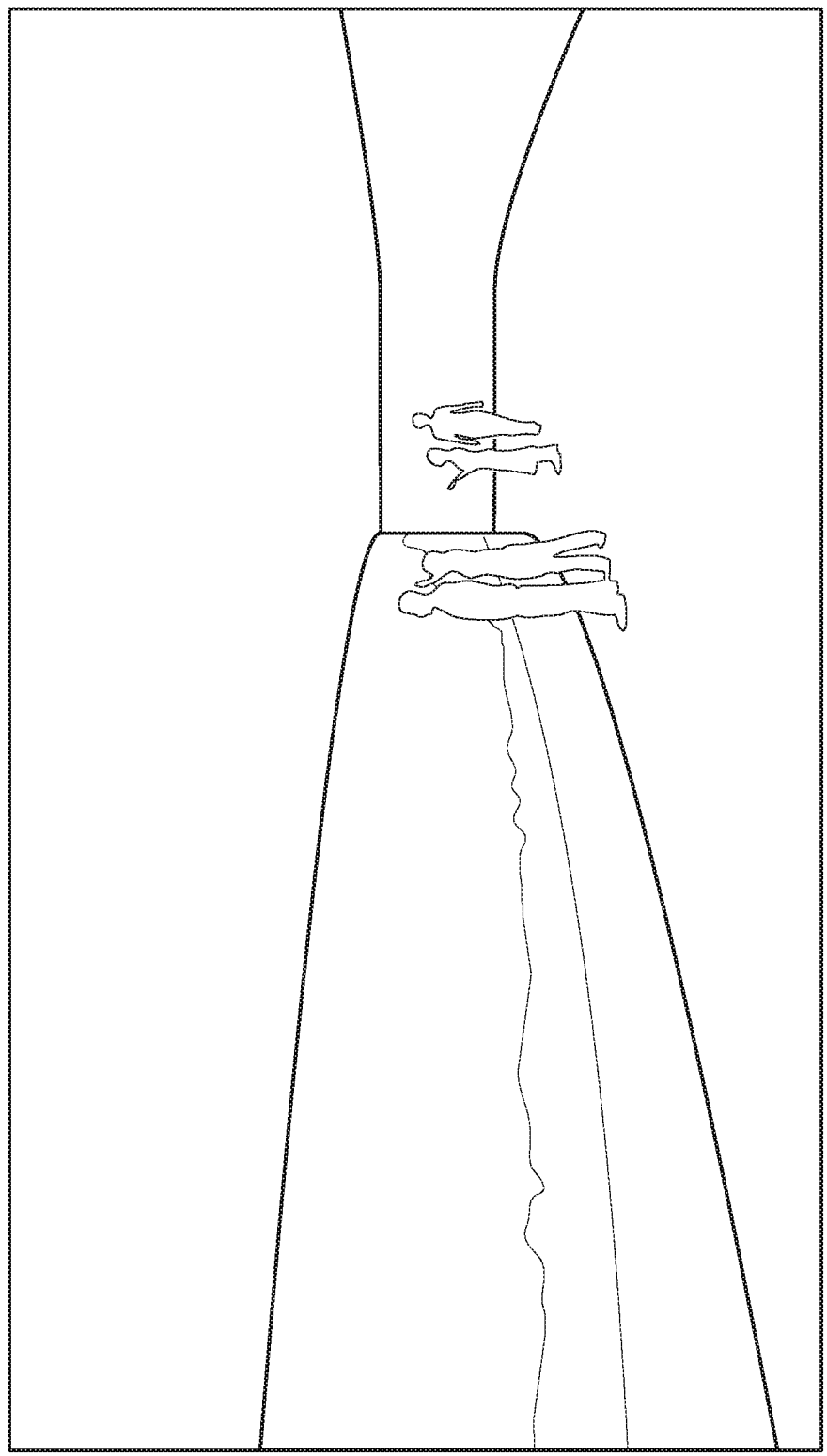
FIG. 42 is a view of a an embodiment of a curved video (or image) wall and illustrating an embodiment of a vertically oriented "horizon" on the video wall.
Figure 43:
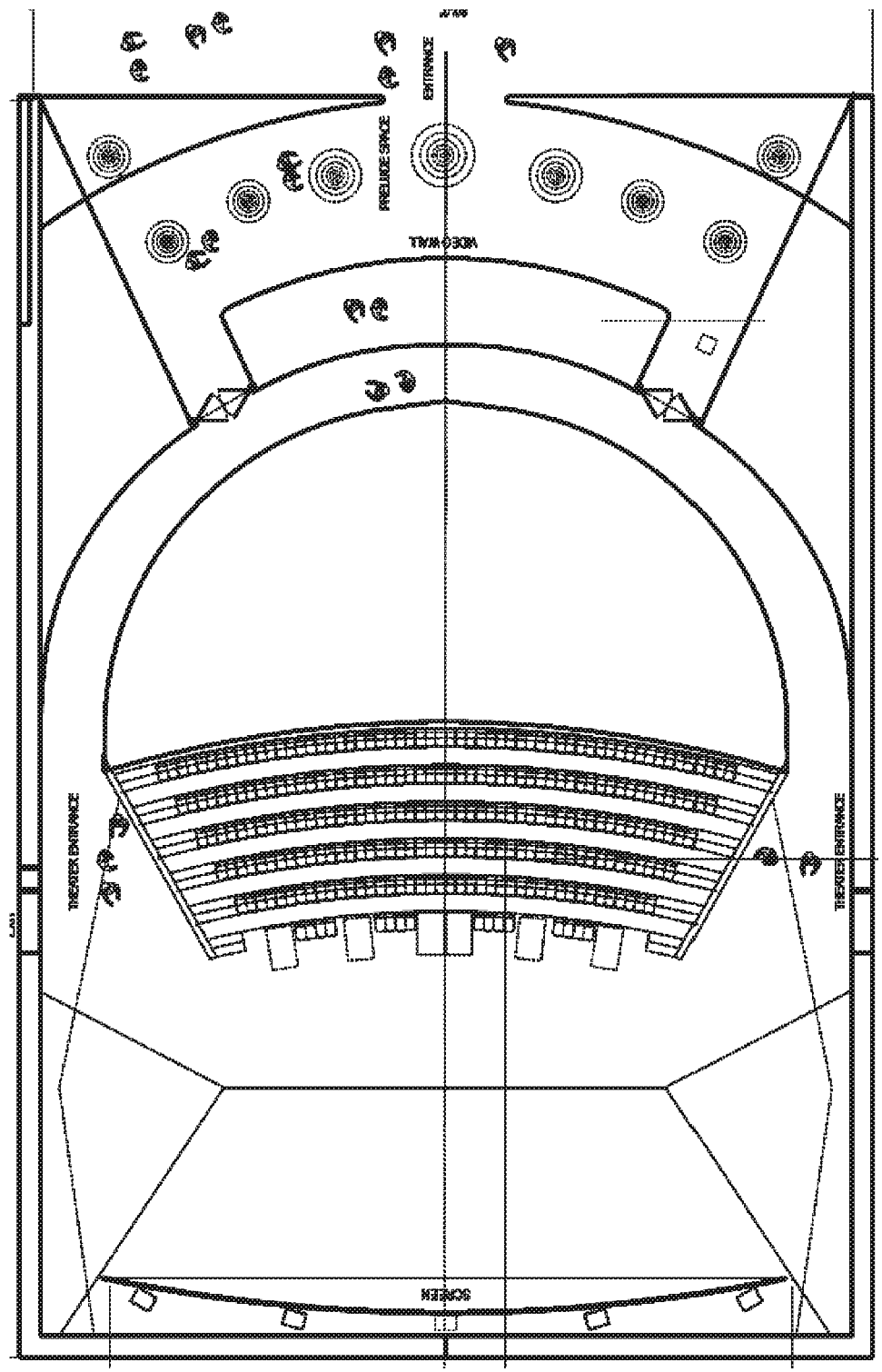
FIG. 43 is a top view of an embodiment of a theater entrance comprising a prelude space or curved video wall pathway leading to a theater seating area.
Figure 44:
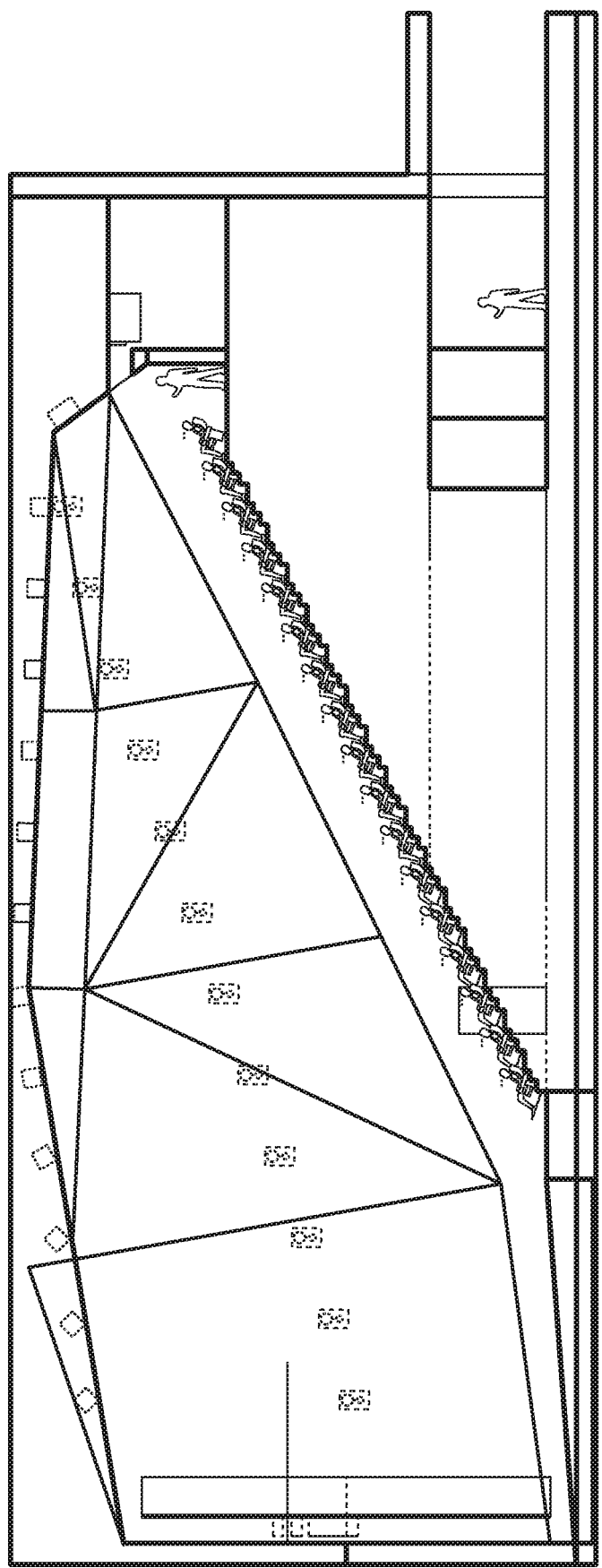
FIG. 44 is a side view of a theater entrance comprising a prelude space or curved video wall pathway leading to a theater seating area.
Figure 45:
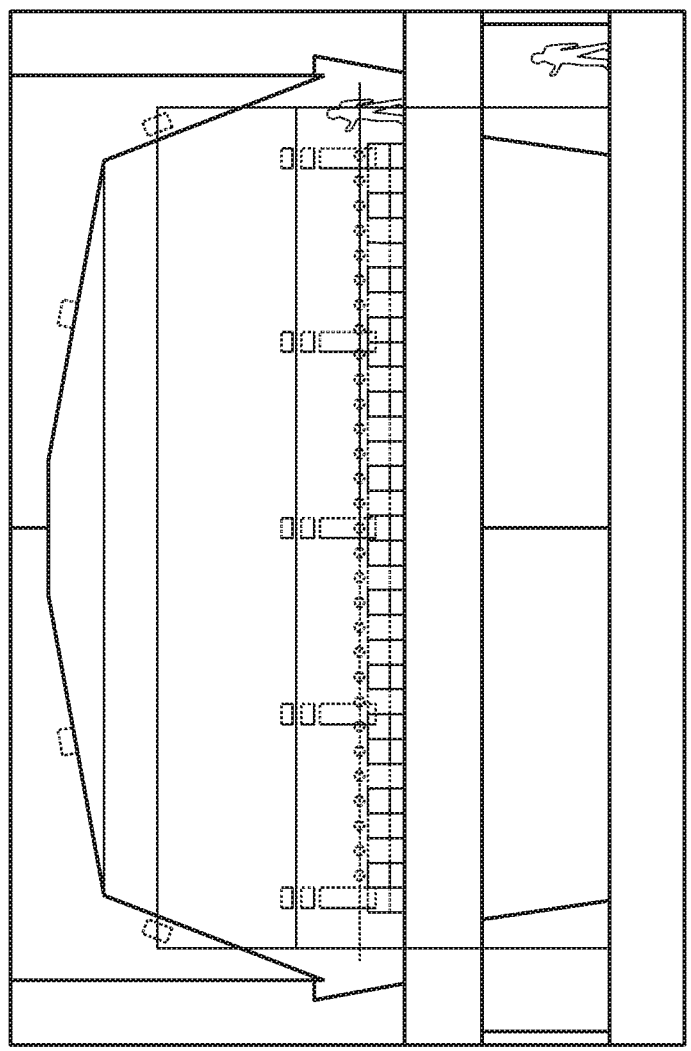
FIG. 45 is view of a theater entrance leading to a theater seating area.
Figure 46:
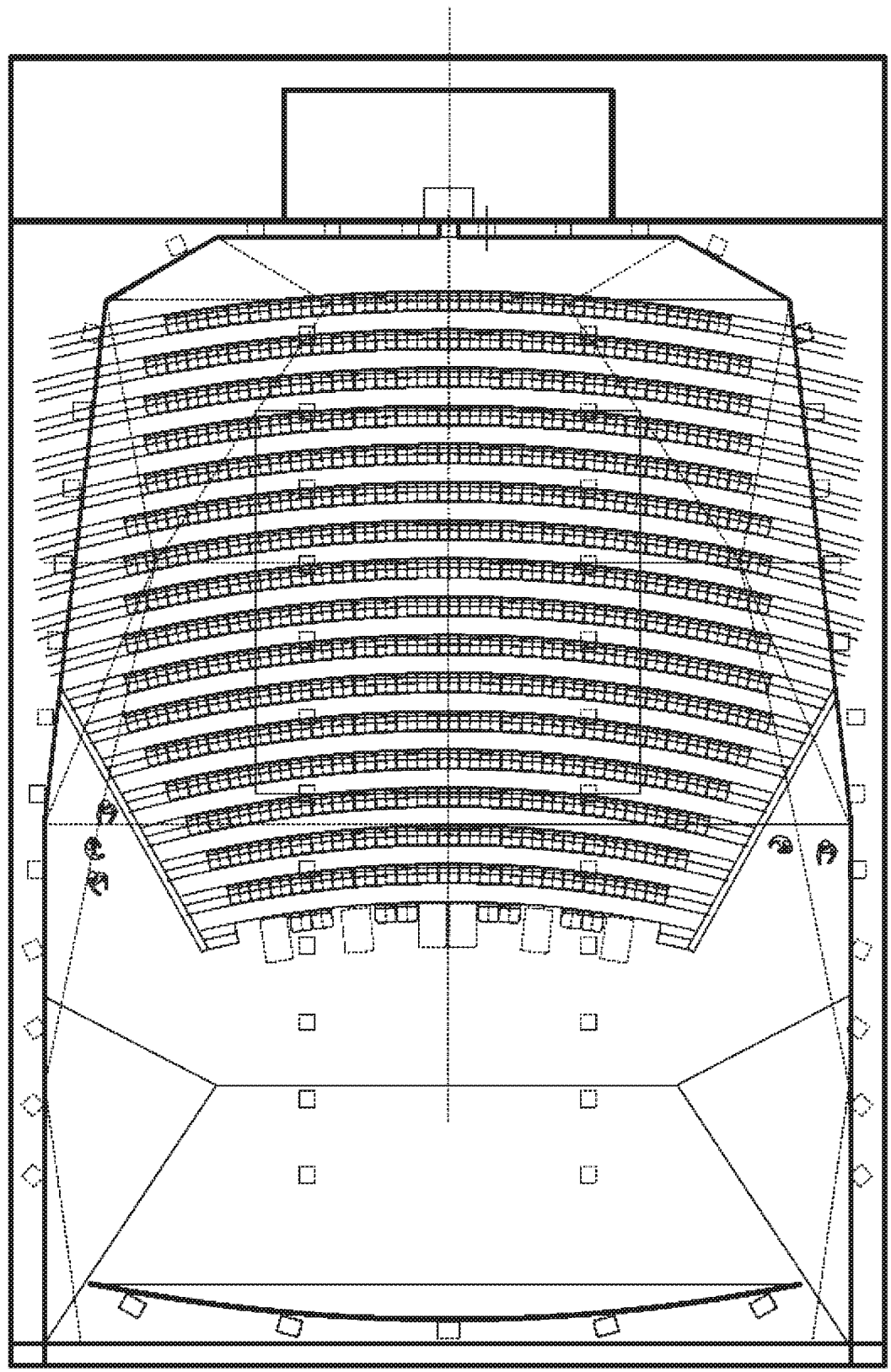
FIG. 46 is a top view of an embodiment of a theater seating area and adjacent areas.
Figure 47:
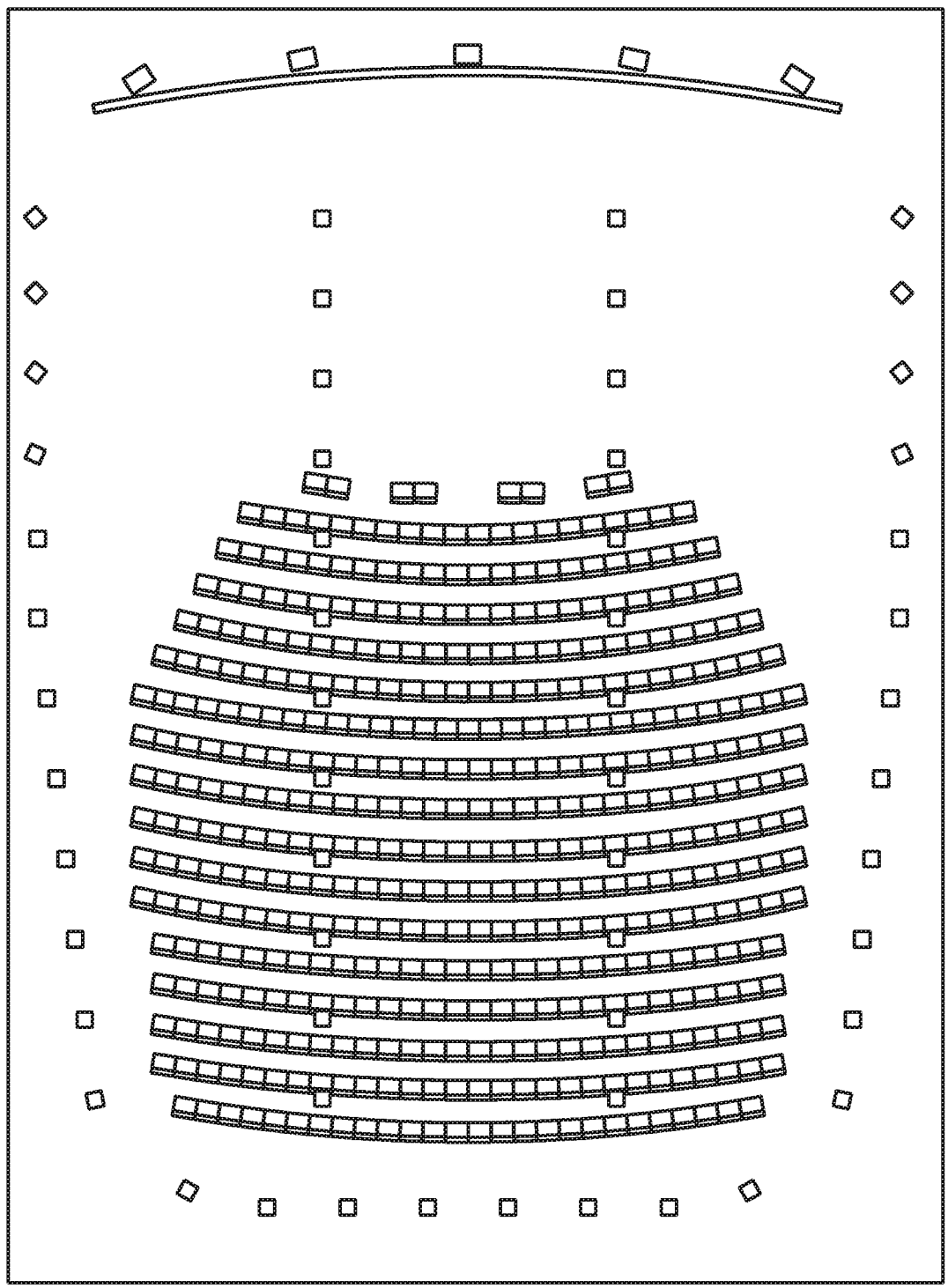
FIG. 47 is a diagram illustrating seating and speaker placements in a theater seating area.
Figure 48:
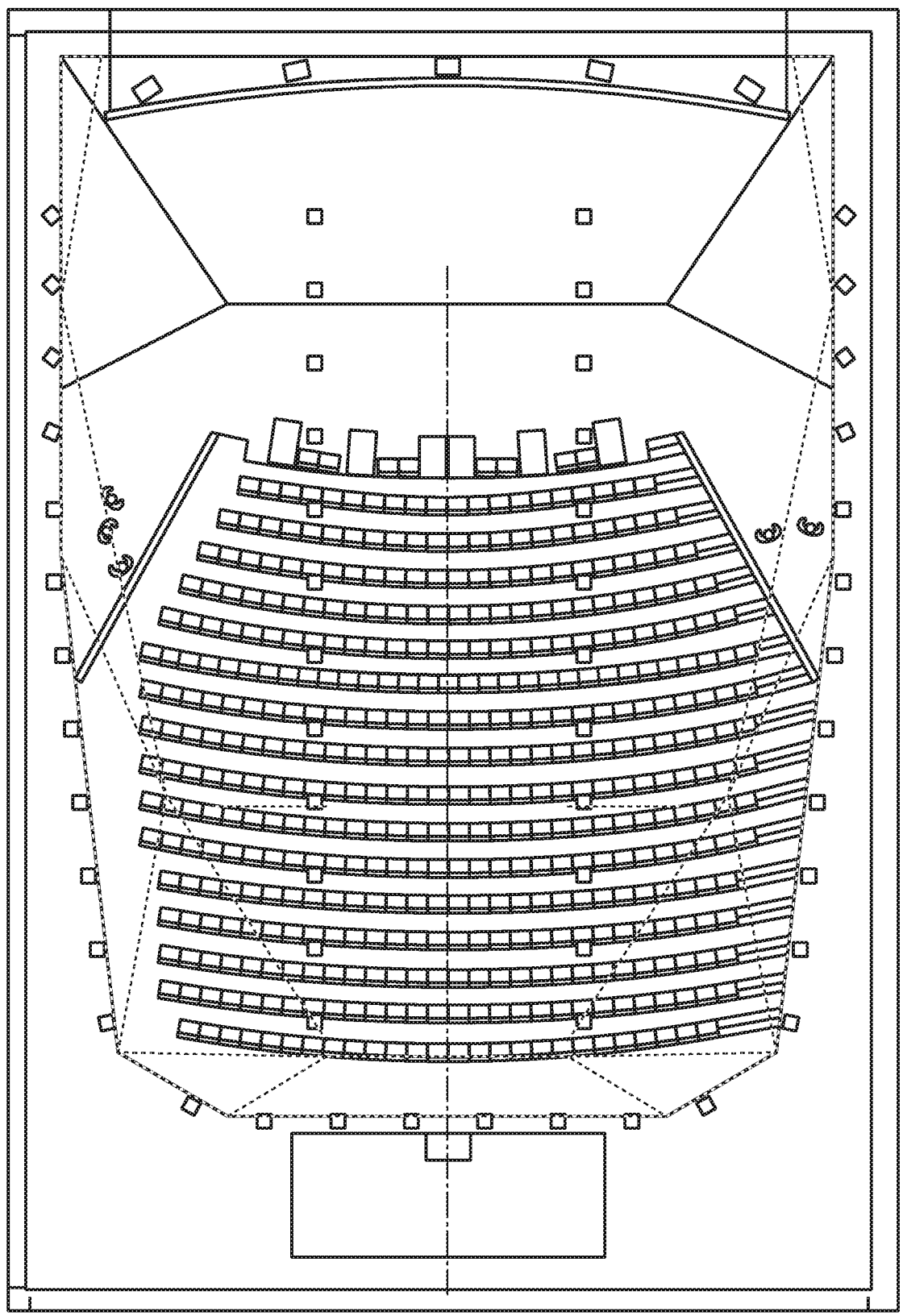
FIG. 48 is a top view illustrating seating and speaker placements in a theater seating area.
Figure 49:
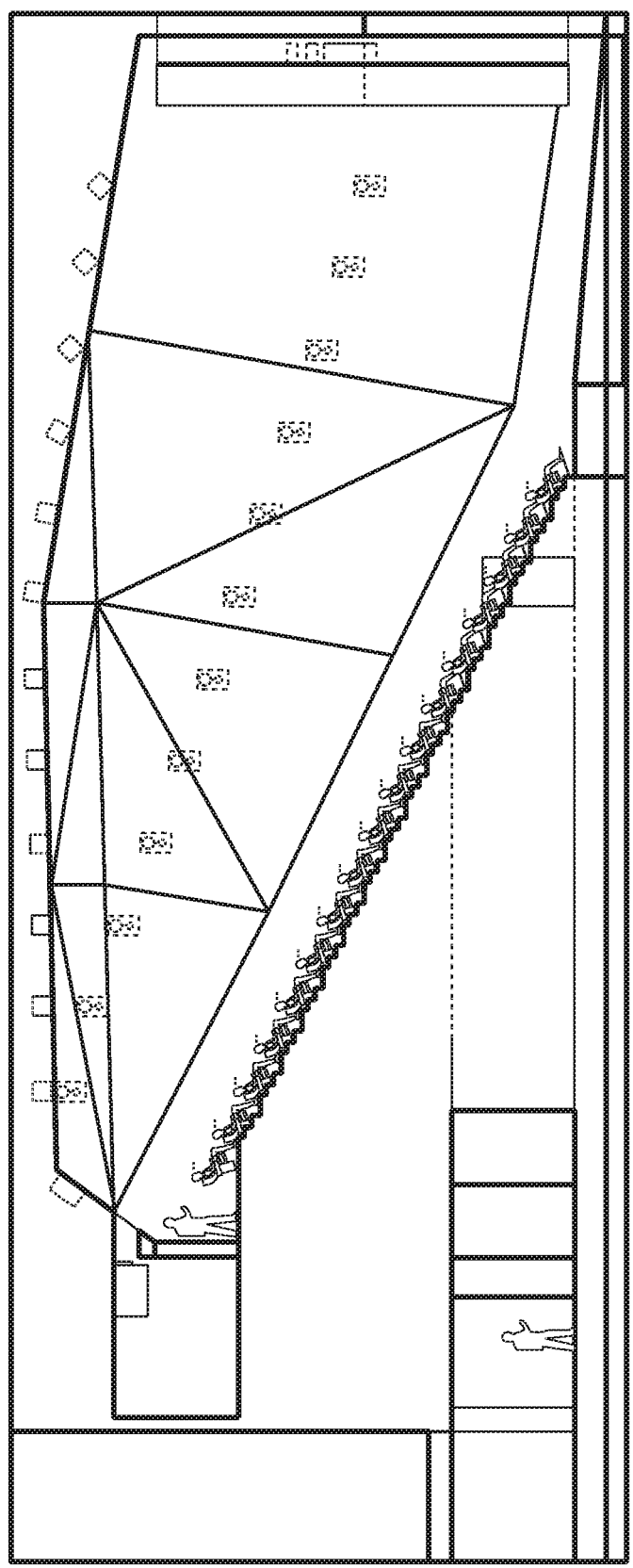
FIG. 49 is a side view illustrating seating and speaker placements in a theater seating area.
Figure 50:
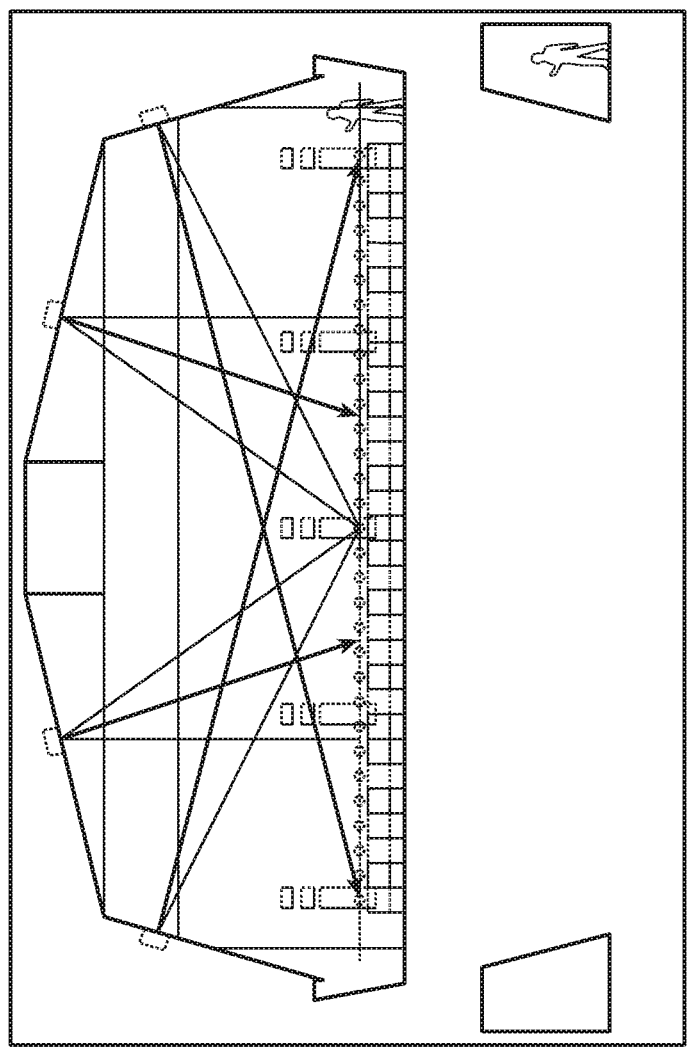
FIG. 50 is a rear view illustrating some seating and speaker placements and the cap of the seating area formed by geometric panels.
Figure 51:
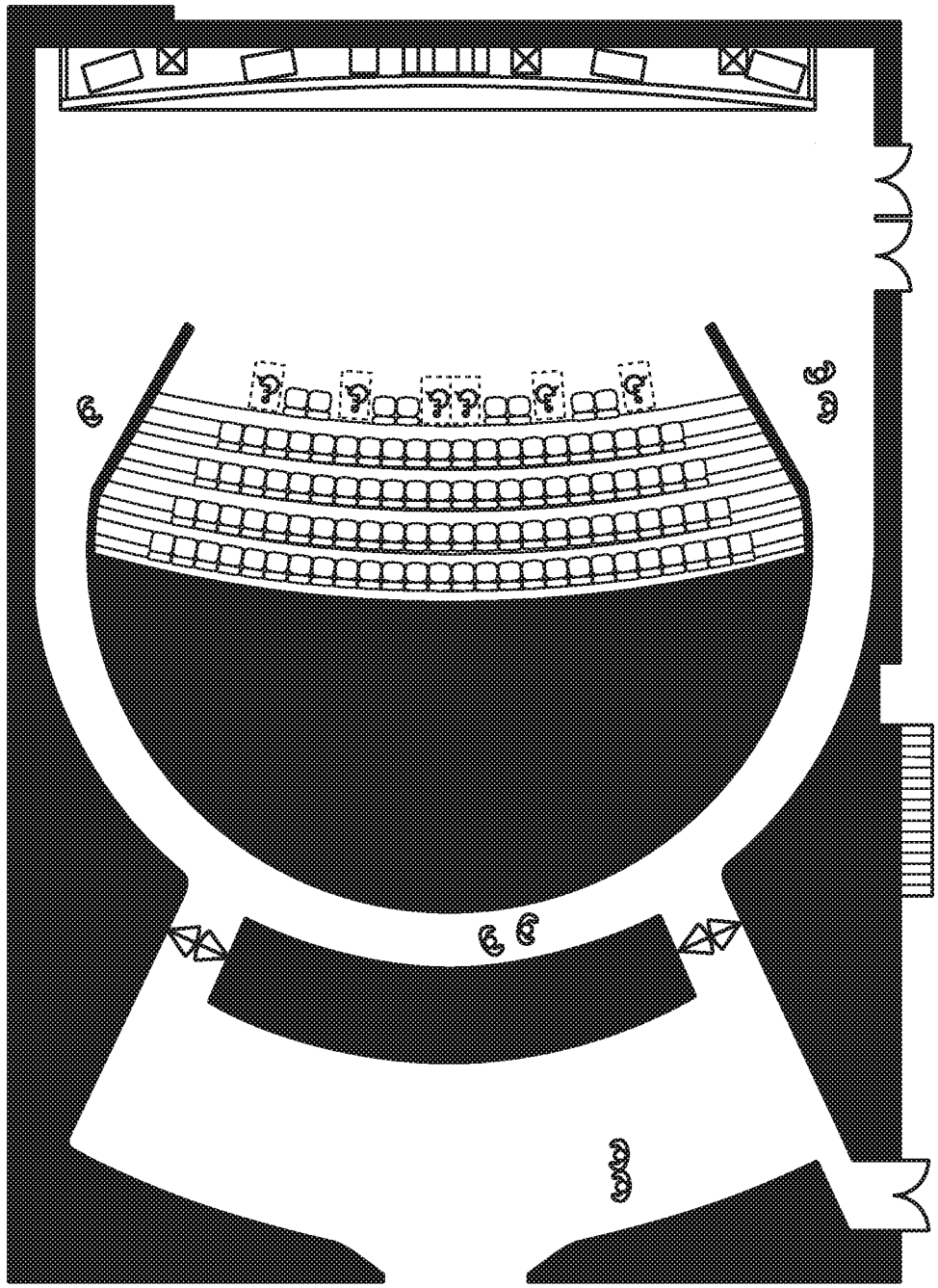
FIG. 51 is a top view of an embodiment of a theater layout.
Figure 52:
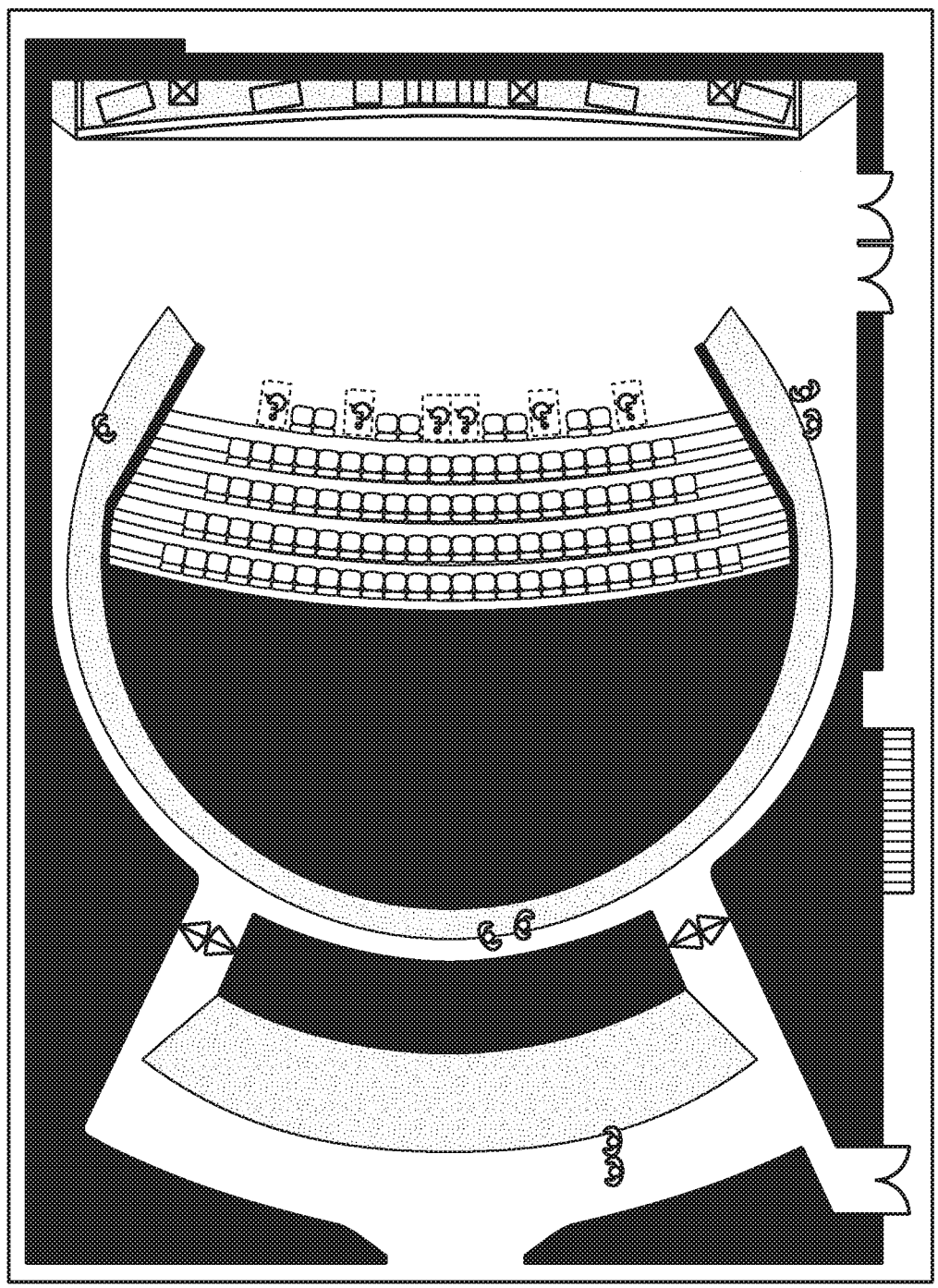
FIG. 52 is a top view of an embodiment of a theater layout.
Figure 53:
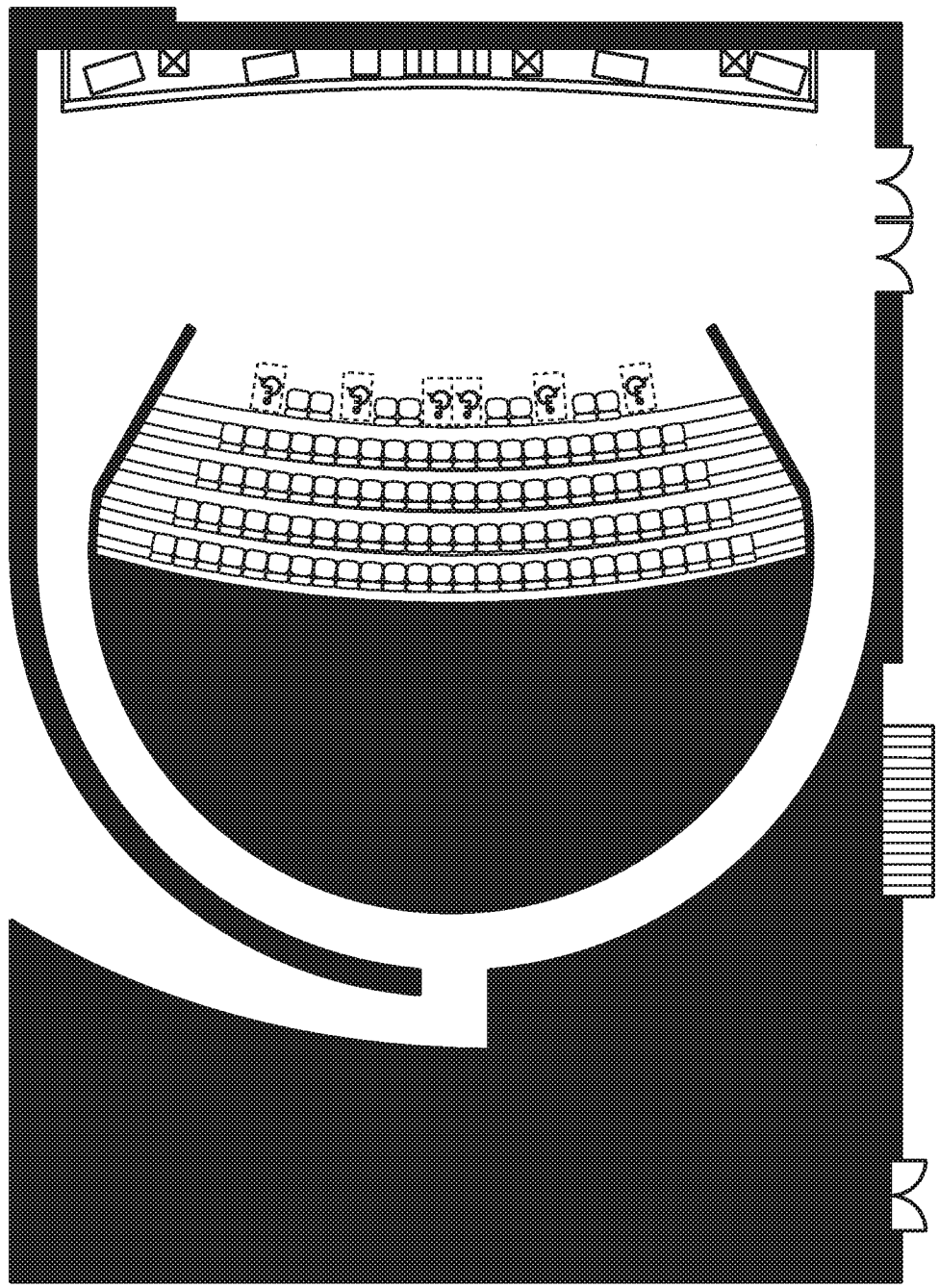
FIG. 53 is a top view of an embodiment of a side entrance theater layout.
Figure 54:
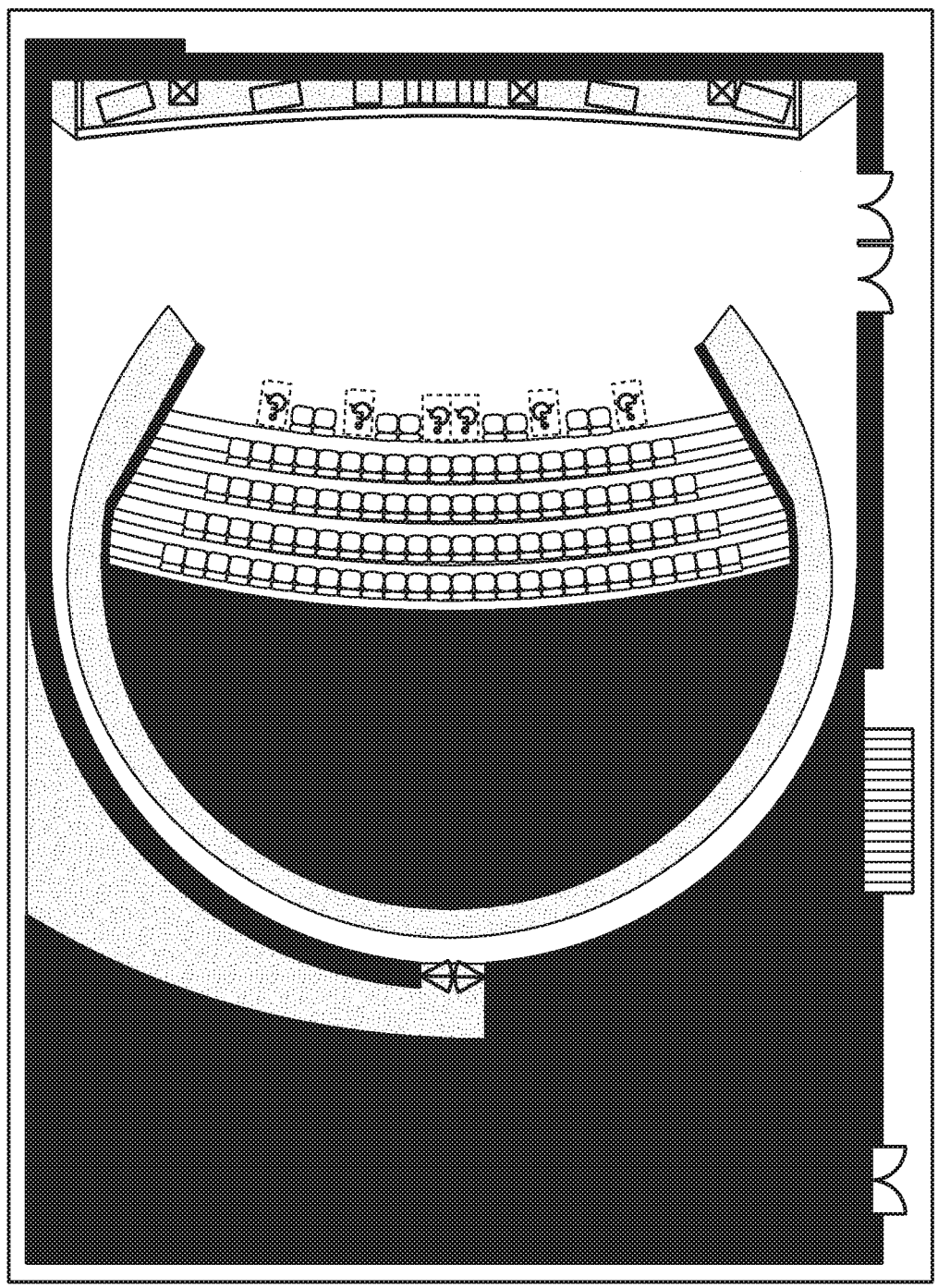
FIG. 54 is a top view of an embodiment of a side entrance theater layout.
Figure 55:
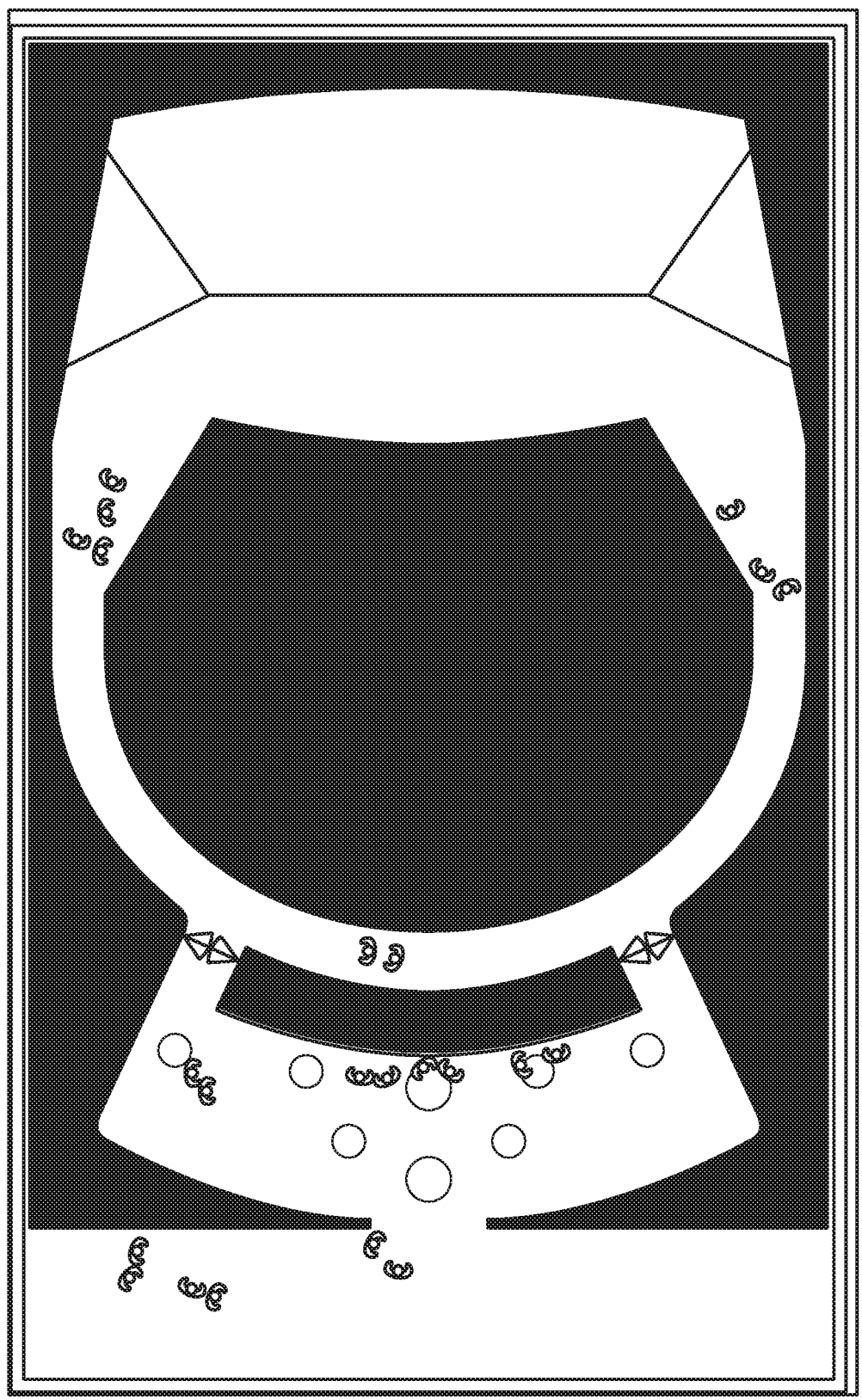
FIG. 55 is a top view of an embodiment of a theater layout.

In one embodiment, a theater entrance comprises a curved and mostly enclosed entrance way configured such that patrons entering thereby have only one or two paths from an opening into the entrance where the path or paths lead via a curved video capable wall to a seating area of the theater (e.g., a doorway, aisle, arch, seating area entryway, or other division between the entrance proper and the seating area). The curved wall, upon entry to the theater entrance may comprise a curvature that sets up a vertically oriented "horizon" in a direction toward the entryway of the seating area. Preferably, in various embodiments, the path(s) include subdued ambient lighting and video or other images on the curved wall setting a mood for an event (motion picture). In one example, a scene or a terrain either from or matching a motif of the event is displayed on the wall. For example, as shown in FIG. 40 for the motion picture Oblivion. The video wall may display still images or motion, and may include spatialized sound synched with motion across the video wall. In one embodiment, motion on the video wall and spatialized sound lead patrons (e.g., move in a direction) toward the "horizon" and theater seating area.

The theater entrance may include an inner wall (e.g., curved video wall) having the border lighting is at an upper edge of the inner wall and/or at a lower edge of said inner wall. Ceiling lighting may project patterns or diffuse lighting on spots along the path(s).

In one embodiment, the theater entrance includes a second outer wall, and wherein the entryway is substantially centered between said first and second outer walls and one side of the vestibule left of the entryway is essentially a mirror image of its opposing side of the vestibule right of the entryway, each side of the curved image wall leading to separate entrances to the seating area, and wherein the curved image wall is contiguous starting at one seating entrance to the other seating entrance. The image projection wall may be positioned opposite said entryway and spanning approximately 180 degrees. The vestibule may be connected to the walkway at two locations at opposing ends of said vestibule. The entryway may be centrally located or may be positioned at one end of the vestibule. Preferably, the image projection wall is positioned adjacent to said entryway. The vestibule may be connected to the walkway at one location at an end of said vestibule that is opposite the entryway.

In another alternative embodiment, a theater comprises an entrance having a lobby, a vestibule having an entryway, a floor, and a ceiling. A first outer wall, for example, may separate the vestibule from the lobby, and a convexly curved image projection wall is placed within the vestibule, s image projection wall having both a top and bottom edge that substantially extend between said floor to said ceiling of said vestibule. In one alternative, the image projection wall inside the vestibule forms an enclosed path from said entryway toward a seating entranceway, and/or the image projection wall having sufficient curvature to obscure said seating entryway from patrons' viewpoints upon entry of said vestibule. Again, border lighting may be positioned between said bottom edge of said image projection wall and said floor of said vestibule and/or above the wall. In one alternative, as shown in the figures, the video wall is set out from the wall in a manner that obscures view of the highlight lighting.

The theater entrance may further comprise two doorways, one located at each end of said vestibule and adjacent to an area on each far end of the image projection (or curved video) wall. The doorways (which may be traditional doors, room dividers, hallway directional change, arch, etc.) are entrances into a seating area. The entryway is, for example, centered with respect to the image projection wall.

In another alternative embodiment, a new theater entrance, comprising a lobby, a vestibule having an entryway, an inner wall, an outer wall and an end essentially comprising an entranceway to a theater seating area, a first outer wall that separates said vestibule from said lobby, and a convexly curved image projection wall that is visible from said vestibule and said lobby, wherein the image projection wall has a curvature that forms a horizon on the image projection wall from a patron's perspective when walking along the path toward the seating area entranceway located "below" the horizon.

In yet another alternative, a theater entrance having an entryway into a hallway leading to a seating area of the theater, the hallway having a curvature essentially matching a curved wall of the hallway, wherein the curved wall has a curvature that forms a vertically oriented "horizon," on the curved wall from a patron's perspective when walking along the path toward the seating area. Preferably, the seating area (or entryway to the seating area) is located "below" the "horizon" of the curved wall. As shown in the various figures, the curved wall may also include a video display or projection screen having a curvature matching (but preferably set out from) the curved wall (video wall). An opposing wall in the hallway may include a similar curvature. As noted in the figures and elsewhere herein, the video wall is configured to display a setting, mood, or theme of an event such as a motion picture to be viewed by patrons in the seating area. The video wall may include one or more (e.g., one, any combination, or none) of the interactive, connected, social media, or gaming aspects discussed elsewhere herein. Such content or interation may be operator selected and then provided by a cinema server or via the secondary content server.

In another alternative, a theater having a lobby, a vestibule having an entryway, an inner wall, and an end comprising an entranceway to a theater seating area; a first outer wall that separates said vestibule from said lobby; a convexly curved image wall that is visible from said vestibule and said lobby; and a curved path following the curvature of the image wall such that a patron upon entering the vestibule is drawn down a continuously curved path adjacent the image wall toward and then to the seating area entranceway.

As shown in the various figures, an embodiment includes a theater, comprising, an auditorium having a screen, seating, and an entrance. The theater further comprising a corridor connecting said auditorium to the entrance, wherein the corridor is curved whereby a patron entering the auditorium traverses a curved path from the entrance to the auditorium. The seating may be stadium style seating, and said screen comprises a large format screen. The corridor preferably includes at least one smoothly curved wall. Alternatively, the corridor may comprise first and second side walls, each of which are curved, and at least partially opposite each other. The smoothly curved wall may include accent lighting for highlighting said corridor, which may include upper and lower accent lighting. The accent lighting may be "behind" a portion of the wall that is set out. The auditorium may comprise first accent lighting for highlighting the interior of said auditorium, which may be upper and lower accent lighting. The theater may further comprise at least one walkway connecting said corridor to said auditorium, and wherein said auditorium comprises at least one side wall and the first accent lighting may be embodied as substantially uniform and continuous highlighting of said walkway along said side wall to said screen.

Other alternatives include where the corridor includes a curved wall (comprising, for example, the set-out [portion of the wall) that includes second accent lighting for highlighting said corridor.

Yet other alternatives include where the first and second accent lighting, for example, may substantially match each other. The second accent lighting may comprise upper and lower accent lighting, and, for example, the entrance may include third accent lighting that substantially matches the first and second accent lighting, whereby a patron entering the theater is guided by said highlighting of said first, second and third accent lighting from said entrance, through said corridor, to said auditorium, and said screen.

As shown in the various figures, the screen is, for example, set out from the wall on which it is attached so as to visually appear to be floating. This creates, for example, an indented area around the screen which includes, for example, light absorbing material, such that the areas around the screen most susceptible to adverse reflections are most absorptive reducing the adverse effects of screen lighting reflecting from those areas toward the audience. In one embodiment the surfaces of the indented area are angled such that direct reflections to the audience are reduced or eliminated. The light absorptive material may be tuned to match and be most absorptive in wavelengths of a projector, or laser light modules utilized in the projector of the theater. With or without such angulation or specially absorptive materials the indented areas make natural areas for high lighting and tend to reduce reflections to the audience during a movie or other projection when, normally, the highlighting is off or dimmed.

In various embodiments, the auditorium may includes a front area and a curved rear wall, and further comprising a walkway connecting said curved rear wall to said front area. The corridor, and the walkway may include accent lighting which may be embodied as foot area highlighting near the floor or foot and head or foot and handrail level highlighting, or any of the highlights shown in the figures. The brightness of said highlighting may be varied in said auditorium, said corridor, said entrance, and said walkway. For example, the highlighting may continuously darken or brighten as a patron progresses from the entrance, along the curved wall, and into the seating area. Pre-show activities and screenings may include a small amount of highlighting around the screen which is extinguished for special previews or the main show.

In various curved rear wall embodiments, the accent lighting may comprise substantially continuous highlighting around said screen along said walkway and across said rear curved wall. For example, in one embodiment, the corridor comprises curved walls, and said accent lighting comprises substantially continuous highlighting around said screen along said walkway along said rear curved wall, and along said curved walls of said corridor, whereby a patron would be naturally led by said highlighting through said corridor, said walkway, said screen, and to said seating.

As shown in the various figures, the entrance may include an entryway and a curved wall for displaying images. The curved wall of the entrance may be curved such that a distal end of the wall is not visible to a patron at said entryway. The images may be, for example, video images related to subject matter being or to be projected onto the screen. For example, the images may correspond to one or more selected from the group consisting of a scene, characters, the environment, location, and setting, all related to the subject matter being/ to be projected onto said screen. In another example, the images may be a setting related to the subject matter to be projected onto said screen.

Preferably, the theater seating comprises stadium seating having a plurality of rows of seats, each of said rows being curved and elevated over rows closer to said screen, wherein each of said rows further from said screen have more seats than rows closer to said screen.

In yet another alternative, a theater, comprising an auditorium having a screen for displaying motion pictures, a rear portion, walls, seating with a plurality of rows of seats, an entrance, a pathway extending from the entrance to said auditorium, the pathway including a walkway between the rear portion of the auditorium to the front row of said seats, and substantially continuous accent lighting from said rear portion along said walkway to said screen to provide highlighting of same. The accent lighting may be variable and includes accent lighting surrounding the screen. The accent lighting may extend in a substantially continuous band of highlighting around said rear portion of the auditorium. Preferably, the accent lighting projects said highlighting from recessed areas both above and below said walls and around said screen. The pathway further includes a curved corridor extending between the entrance and the walkway. The curved corridor may be substantially continuously curved. The entrance may further comprise a curved video wall. Preferably, the entrance includes an entryway, the video wall visible from the entryway. In various embodiments, the entryway is positioned opposite a central portion of the curved video wall. The pathway may include a curved corridor extending between the entrance and the walkway, and the curved video wall is located between the entrance and the curved corridor. As noted in other embodiments, the curved video wall may be configured to display video images related to the subject matter being projected onto said screen, such as, for example, one or more selected from a group consisting of a scene, characters, the environment, location, and setting, all related to the subject matter being projected onto said screen. Additionally, as discussed in other embodiments above, advertising, social media, gaming, and/or interactive content may also be displayed. The additional content may be of a general nature or specifically keyed (targeted) to a user/patron traversing the curved corridor and may be displayed on top of, along with, or instead of the setting relate display.

In yet another embodiment, a theater, venue or theme park attraction comprising a venue viewing area (e.g., auditorium, theme park attraction ride area, etc.), a prelude space having an entryway, said prelude space leading to the venue viewing area and including a curved video wall that displays images related to the subject matter being shown in the venue (or theater, attraction, etc), and a corridor connecting the prelude space to the auditorium/venue viewing area, the corridor being curved substantially similarly to the curved video wall (and may include a curvature such that it sets up a "horizon" that attracts patrons toward the venue viewing area). The prelude space may further include accent lighting as described herein and/or as shown in the figures.

The accent lighting may included recessed lighting both at foot level and overhead level. The auditorium/venue viewing area may include additional accent lighting that substantially matches said accent lighting in said prelude space and said corridor. The additional accent lighting may included recessed lighting both at foot level and overhead level. The auditorium/venue viewing area (vva) may further include a screen and seating, and said additional accent lighting surrounds said screen and said seating. The additional accent lighting may extend in a substantially continuous band of lighting around the auditorium/vva and the screen. The accent lighting may be located both above and below the curved video wall. The prelude space may yet further include a second curved wall opposite to said curved video wall, said second curved wall being illuminated by more accent lighting that matches said accent lighting above and below said curved video wall. The accent lighting and the more accent lighting may be recessed both above and below said curved video wall and said second curved wall. The prelude space and the corridor may be connected through at least one opening without a door. The theater or venue may include a second opening without a door. In various embodiments, the at least one opening and the second opening are located on opposite ends of said curved video wall.

Alternatively, the prelude space and the corridor may be connected through at least one opening having a door. The theater may further comprise a second opening having a door. The at least one opening and said second opening may be located on opposite ends of said curved video wall.

In either embodiment(s) or alternatives, the curved video wall is curved in such a manner that a distal end of said wall is not visible to a patron at said entryway. The curved video wall is configured to display images that correspond to one or more selected from the group consisting of a scene, characters, the environment, location, and setting, all related to the subject matter being projected onto said screen. The video wall preferably displays images that capture a mood related to the subject matter being projected onto said screen and may include alternative content discussed above.

In all the various theater related embodiments and alternatives, seating specifications or viewing angles are preferably as specified as in at least one of table 1, table 2, table 3, and table 5.

In all the various theater related embodiments and alternatives, a Dolby-Vision enabled high contrast ratio projector is preferably configured to illuminate the screen in the theater seating area with content. In all the various theater related embodiments and alternatives, a projector capable of 1,000,000:1 contrast ratio is preferably configured to illuminate the screen in the theater seating area. Such projectors are also suitably configured for illuminating screen based versions of the curved video wall and may be front or rear projections onto the wall.

In all the various theater related embodiments and alternatives, a video projection system incorporating feedback from a patron's mobile device that affects a video displayed by the projection system may be utilized. The video display may include advertising, social media, gaming or other content. Such content may be served via a primary cinema server or a secondary content server.

In all the various theater related embodiments and alternatives a theater or other venue may be provided with a motif similar to that described in any of figures presented in the present application.

In one embodiment, as shown in the various figures including FIGS. 21-31, 36-38, 44-46, and 49, the present invention(s) include a theater design comprising geometric panels fitted in a cap formation capping a seating area. Speakers are installed in places hidden from view of patrons seated in the theater, such as, as shown in the figures (e.g., FIGS. 36 and 37), namely behind the geometric panels. The panels capping the theater provide a serene acoustical environment from which sound emanates without visual reference to the sound source. The present invention includes presentation of movies without visual reference to movie sound sources (e.g., speakers). The speakers include a continuous placement of speakers front to back left to right overhead and side speakers, and may optionally include floor and/or seat mounted speakers, wherein all such speakers are related in an object based spatialized sound system. Speaker locations may roughly correspond to the physical shape of the cap (e.g., either speakers of panels will outline the cap). Such sound system may, for example attribute a majority of any sound object to a speaker or set of speakers in varying amounts and in a sequence matching a director's intent. Such sound may attribute increasingly smaller quantities of a sound object to any one or more other speakers including any set, sets, or all of the additional speakers.

Obviously, numerous modifications and variations of the present invention are possible in light of the above teachings. It is therefore to be understood that within the scope of claims to be included in this or any subsequently filed patent application, and that the invention may be practiced in other combinations of the elements or otherwise than as specifically described herein which will be apparent to the skilled artisan upon review of the present disclosure.

What is claimed is:

1. A theater, comprising:
   an entrance;
   an auditorium having a main screen and seating;
   a corridor connecting said auditorium to said entrance;
   wherein said corridor is curved whereby a patron entering the auditorium traverses a curved path from said entrance to said auditorium;
   wherein said corridor includes at least one curved wall and the at least one curved wall comprising a curved screen; and
   an image is formed upon the curved screen by a plurality of image projectors positioned in the corridor such that when patrons enter the corridor, the patrons have a partial view of the image up to a first line and do not have a view of the remaining portion of the image beyond the first line.

2. The theater of claim 1, wherein said seating is stadium style seating, and said main screen comprises a screen sized to afford viewing to all patrons in the seating.

3. The theater of claim 1, wherein said at least one curved wall is recessed and highlighted above and below the curved screen.

4. The theater of claim 1, wherein said corridor comprises first and second side walls, each of which are curved.

5. The theater of claim 3, wherein said at least one curved wall includes accent lighting for highlighting said corridor.

6. The theater of claim 5, wherein said accent lighting comprises upper and lower accent lighting.

7. The theater of claim 1, wherein said auditorium further comprises first accent lighting for highlighting the interior of said auditorium.

8. The theater of claim 7, wherein said first accent lighting comprises upper and lower accent lighting.

9. The theater of claim 7, further comprising at least one walkway connecting said corridor to said auditorium, and wherein said auditorium comprises at least one side wall.

10. The theater of claim 9, wherein said first accent lighting comprises a substantially uniform and continuous highlighting of said walkway along said at least one side wall to said curved screen.

11. The theater of claim 7, wherein said corridor includes a second curved wall that includes second accent lighting for highlighting said corridor.

12. The theater of claim 11, wherein said first and second accent lighting guide a patron through said corridor into said auditorium.

13. The theater of claim 12, wherein said second accent lighting comprises upper and lower accent lighting.

14. The theater of claim 13, wherein said entrance includes third accent lighting whereby a patron entering the theater is guided by said highlighting of said first, second and third accent lighting from said entrance, through said corridor, to said auditorium, and said screen.

15. The theater of claim 1, wherein said auditorium includes a front area and a curved rear wall, and further comprising a walkway connecting said curved rear wall to said front area.

16. The theater of claim 15, wherein said auditorium, said corridor, and said walkway include accent lighting for highlighting the areas thereof.

17. The theater of claim 1 wherein the curved screen having a horizon drop-off for display of content.

18. The theater of claim 17 wherein the drop-off of the curve screen is affected by the curvature of the curved screen.

19. The theater of claim 17 wherein the content displayed on the curved screen comprises content related to a motion picture shown in the theater.

20. The theater of claim 19 wherein content displayed on the curved screen is interactive with the patrons.

21. The theater of claim 1 wherein curved screen displays moving objects that are synchronized with sounds that are spatially associated with the moving objects.

\* \* \* \* \*